United States Patent [19]
Kubo

[11] Patent Number: 5,422,470
[45] Date of Patent: Jun. 6, 1995

[54] SYMBOL INFORMATION READING APPARATUS

[75] Inventor: Mitsunori Kubo, Tokyo, Japan

[73] Assignee: Olympus Optical Co., Ltd., Tokyo, Japan

[21] Appl. No.: 111,670

[22] Filed: Aug. 25, 1993

[30] Foreign Application Priority Data

Aug. 31, 1992 [JP] Japan ................... 4-232499
Mar. 17, 1993 [JP] Japan ................... 5-057231

[51] Int. Cl.⁶ .............................................. G06K 7/10
[52] U.S. Cl. .................................................. 235/462
[58] Field of Search ............................. 235/462, 472

[56] References Cited

U.S. PATENT DOCUMENTS

| | | | |
|---|---|---|---|
| 5,134,272 | 7/1992 | Tsuchiya et al. | 235/462 |
| 5,138,140 | 8/1992 | Siemiatkowski et al. | 235/462 |
| 5,155,343 | 10/1992 | Chandler et al. | 235/462 |
| 5,296,691 | 3/1994 | Waldron et al. | 235/462 |
| 5,304,787 | 4/1994 | Wang | 235/462 |
| 5,319,181 | 6/1994 | Shellhammer et al. | 235/462 |

FOREIGN PATENT DOCUMENTS 0385478 9/1990 European Pat. Off. .
2-268383 11/1990 Japan .

Primary Examiner—Donald Hajec
Assistant Examiner—Michael G. Lee
Attorney, Agent, or Firm—Frishauf, Holtz, Goodman & Woodward

[57] ABSTRACT

A bar code symbol imaged by a two-dimensional imaging apparatus is stored in a frame memory. A data processing apparatus estimates the position of each code in the bar code symbol projected onto the photoelectric conversion plane of the two-dimensional imaging apparatus and checks to see if the position of each code word is within the screen. Whether or not decoding is possible is determined by judging whether or not the number of code words estimated to be outside the screen has exceeded the number of codes restorable. Only when it is judged that decoding is possible, pieces of information on the bar code symbol are read in sequence from the frame memory to restore the original information.

5 Claims, 43 Drawing Sheets

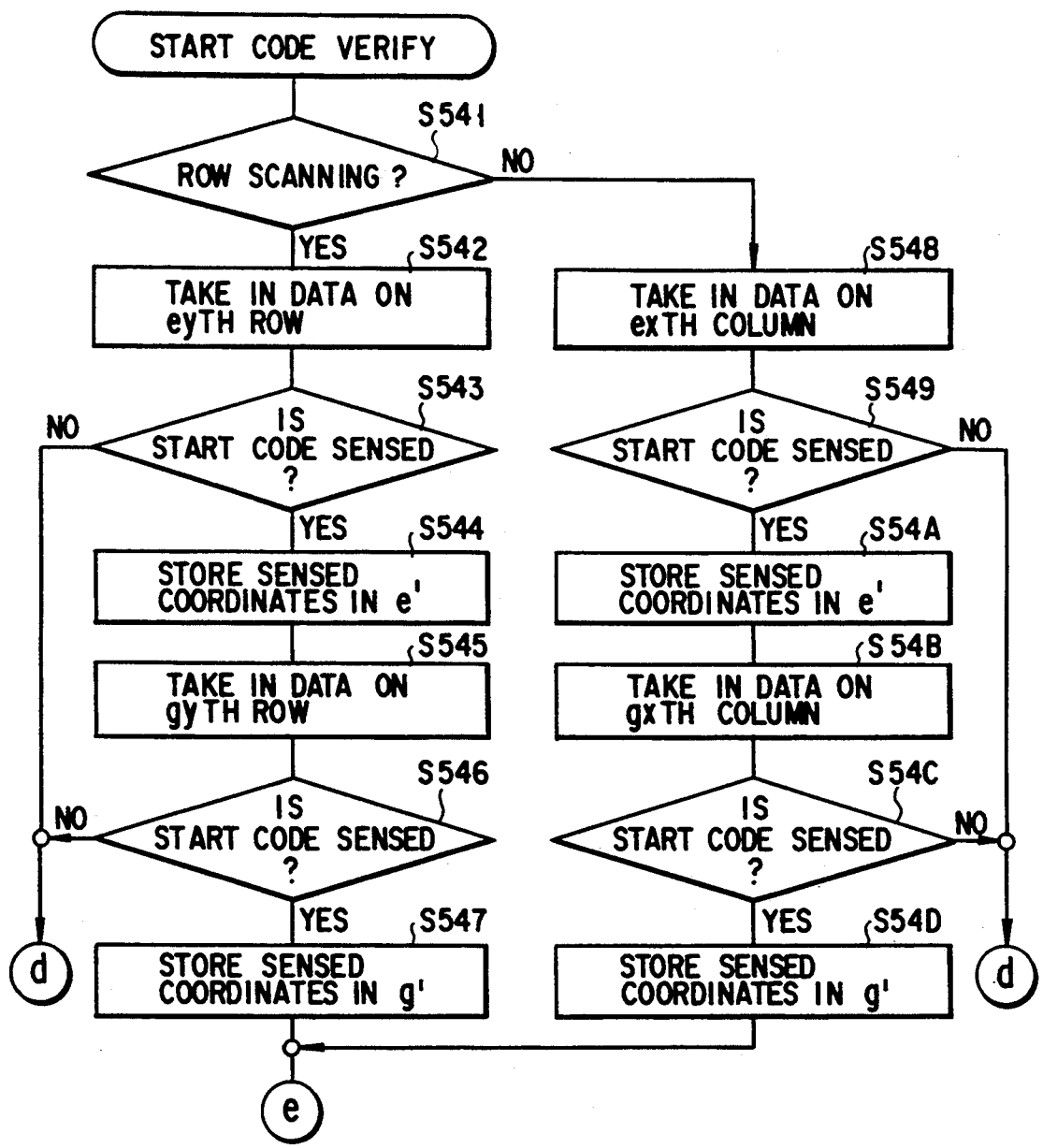
F I G. 16A

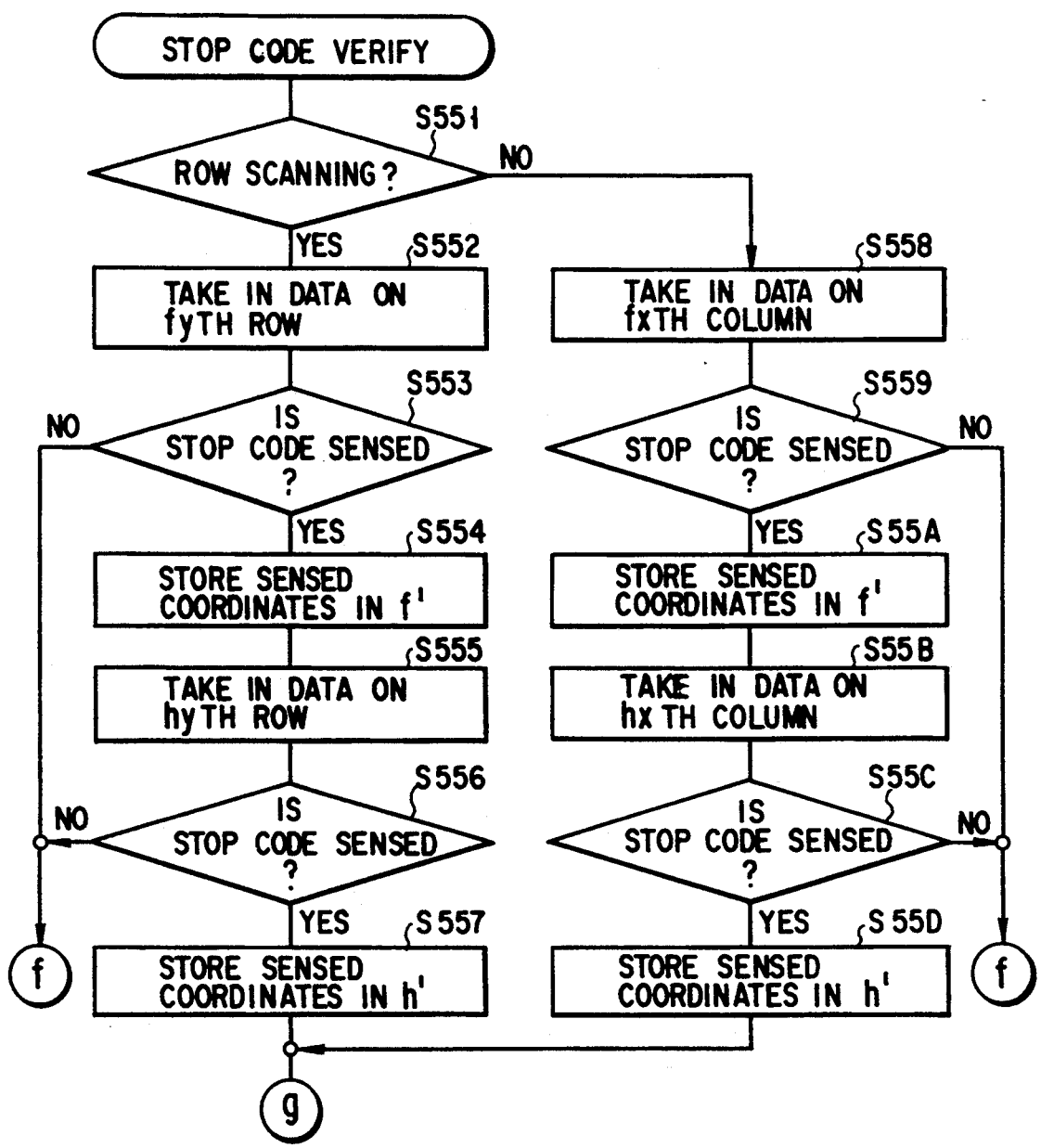
F I G. 17A

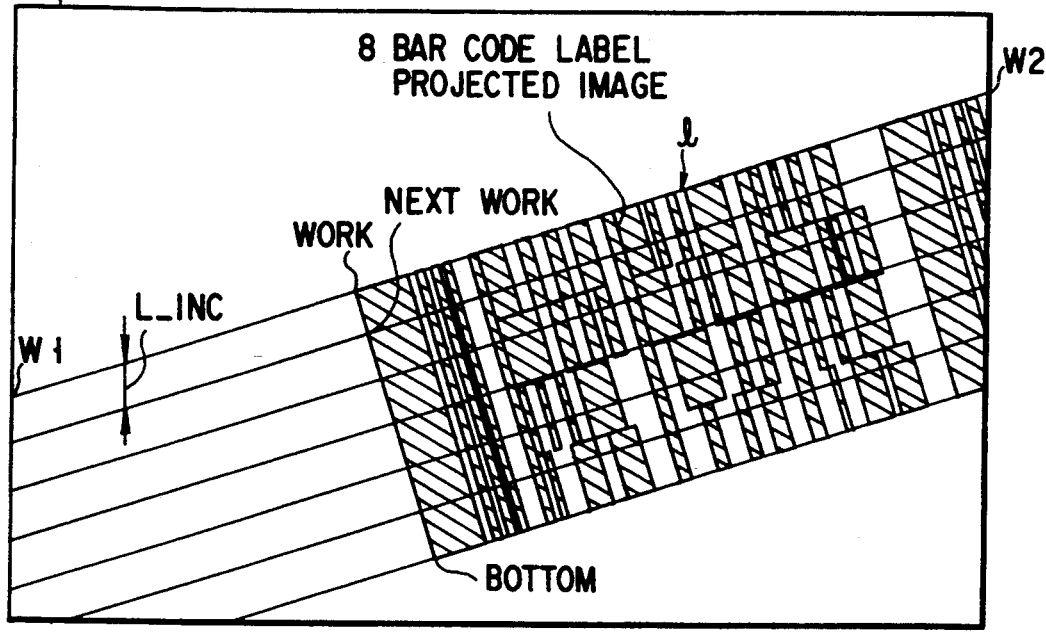
F I G. 22
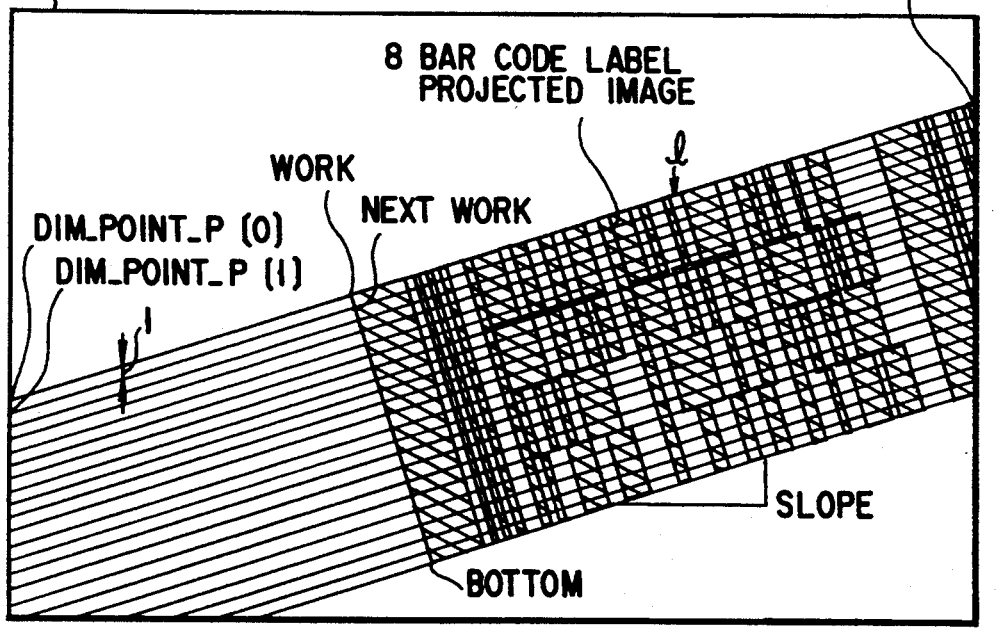
F I G. 24

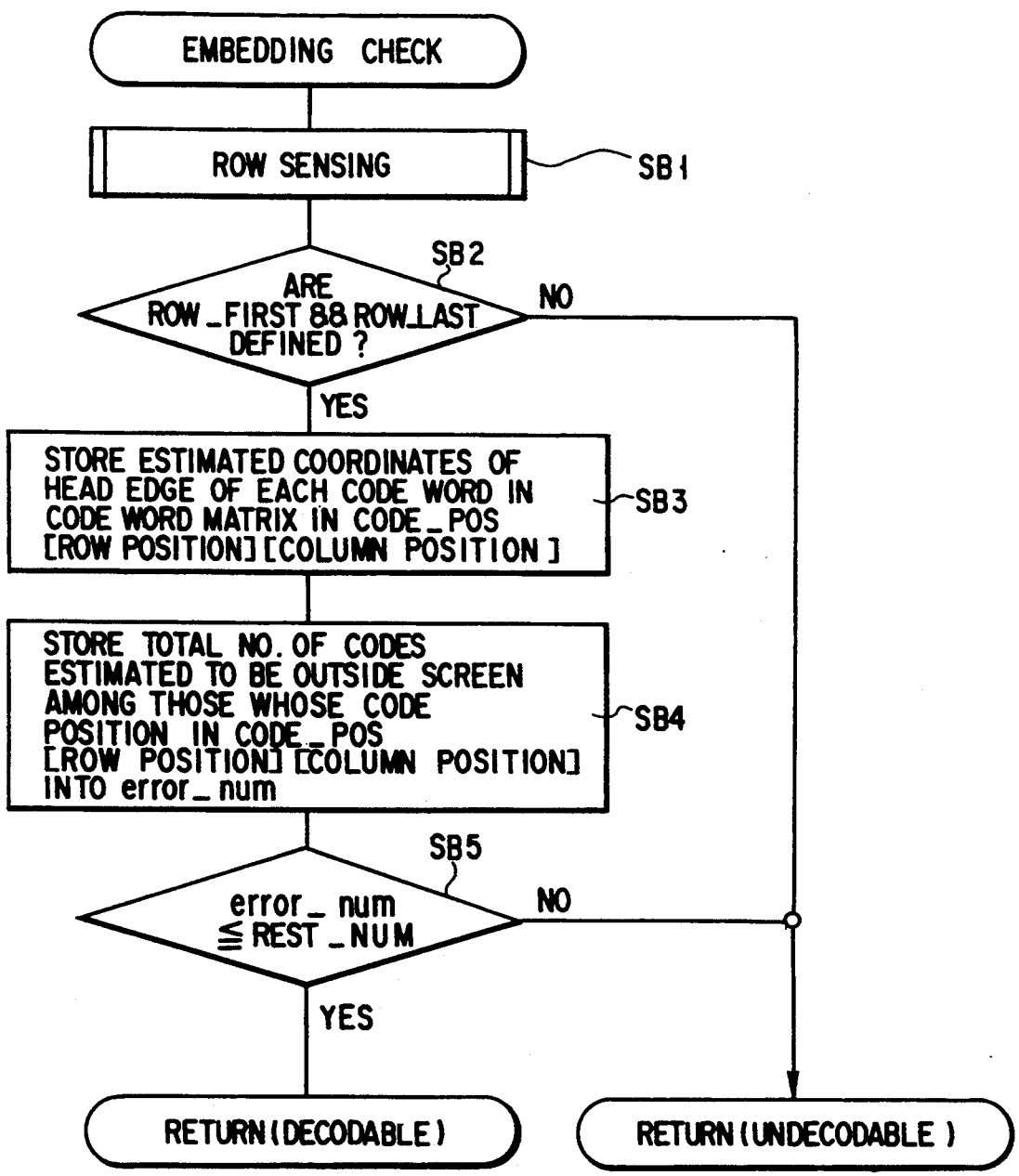
F I G. 25

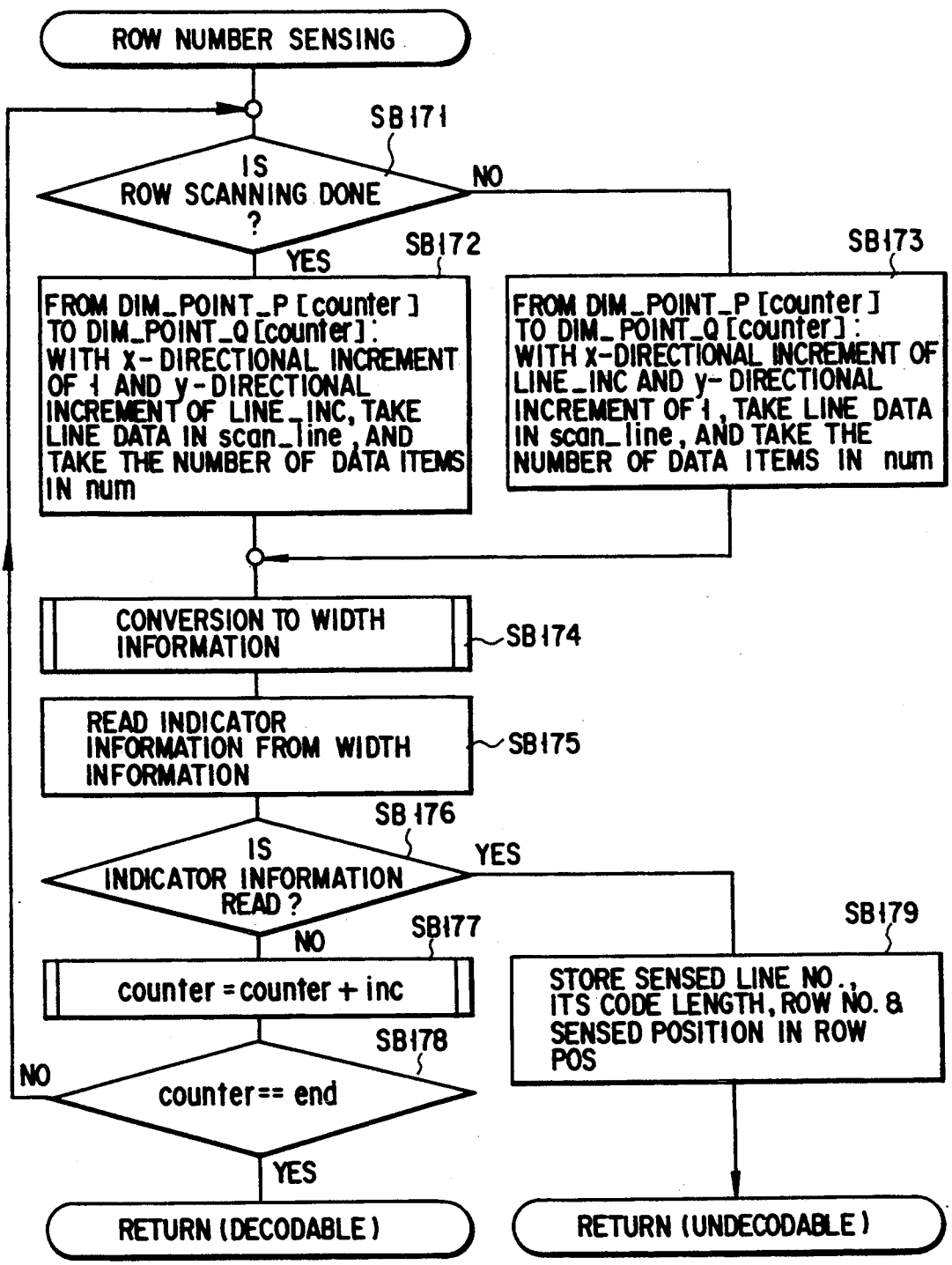
F I G. 28

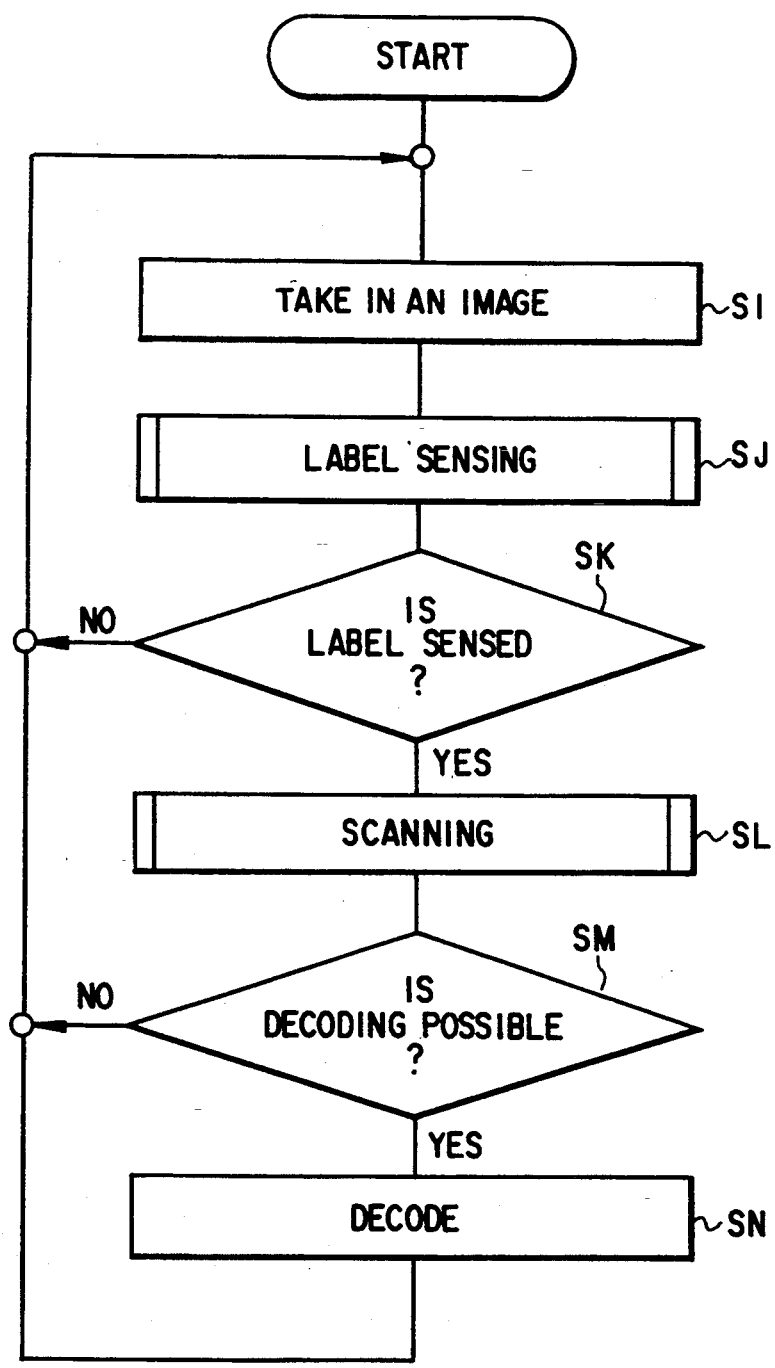
F I G. 35

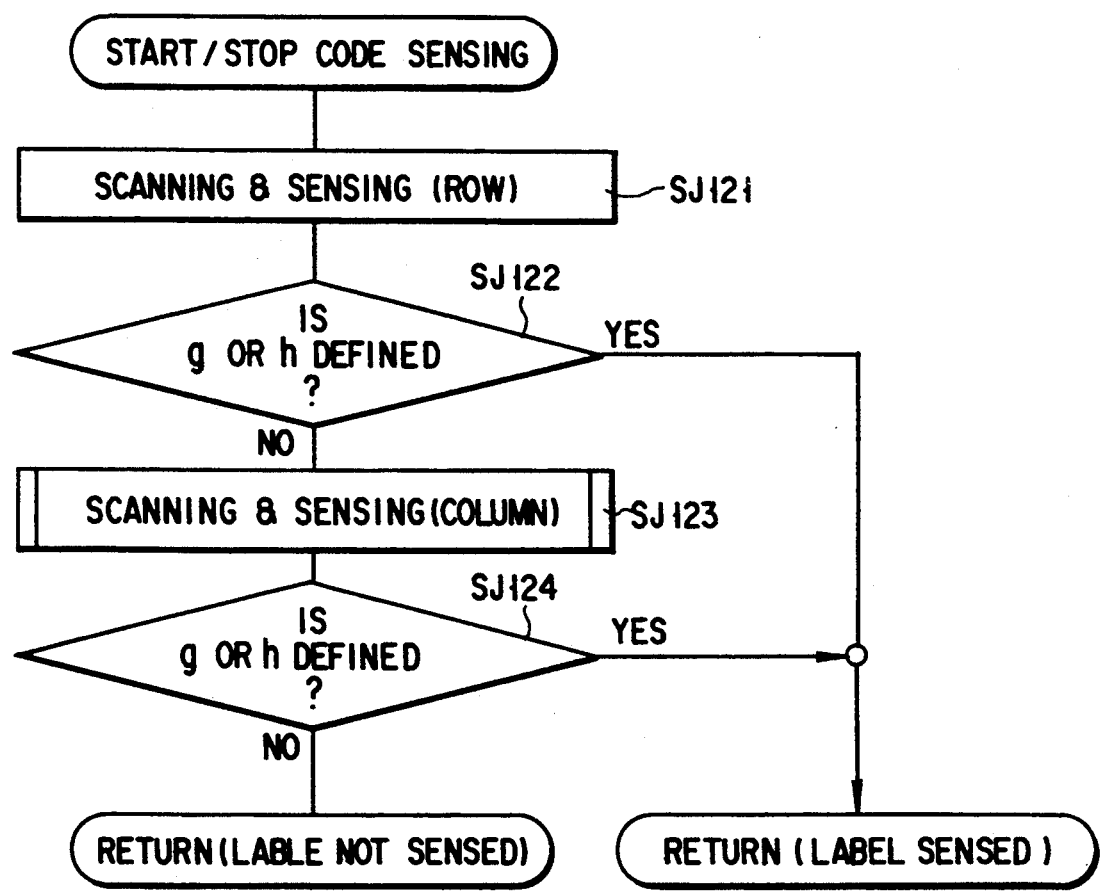
F I G. 38

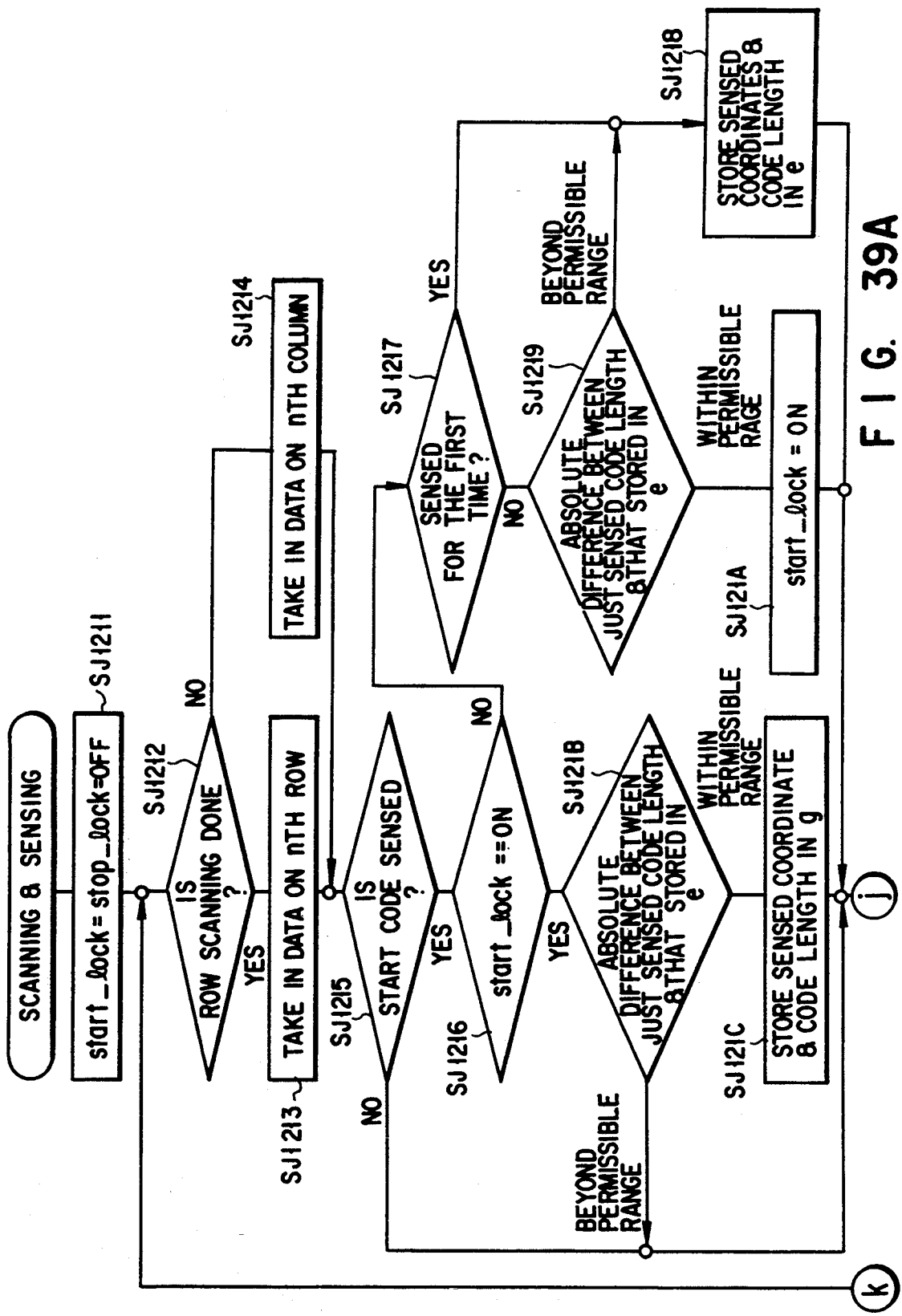

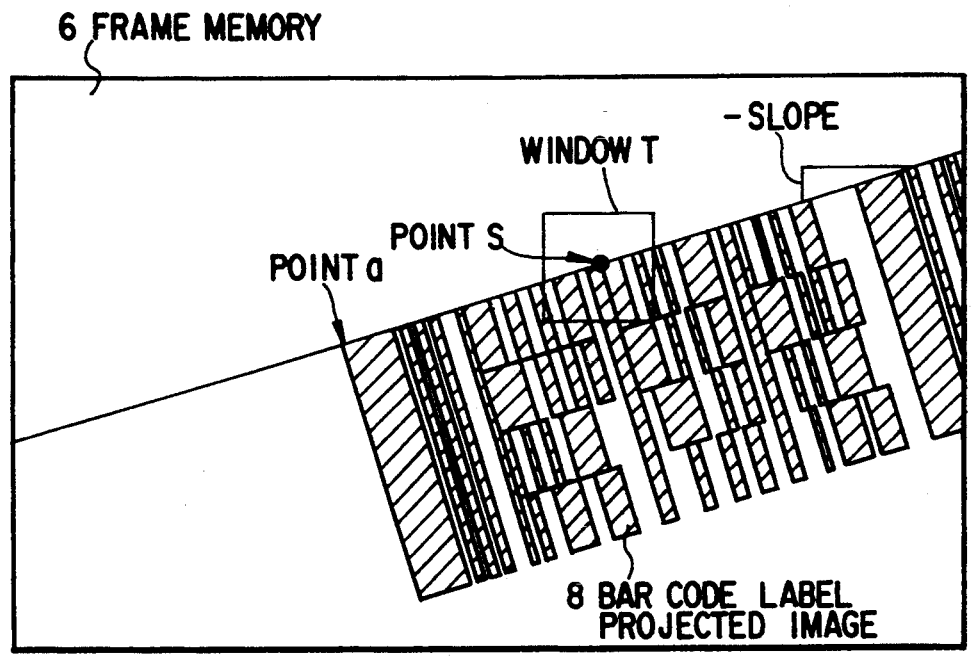
F I G. 42A
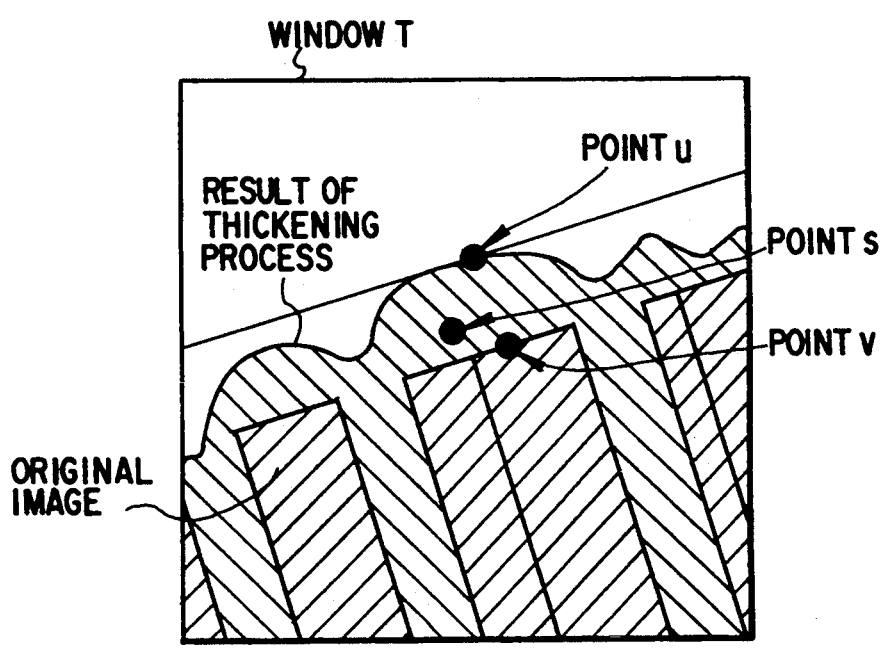
F I G. 42B

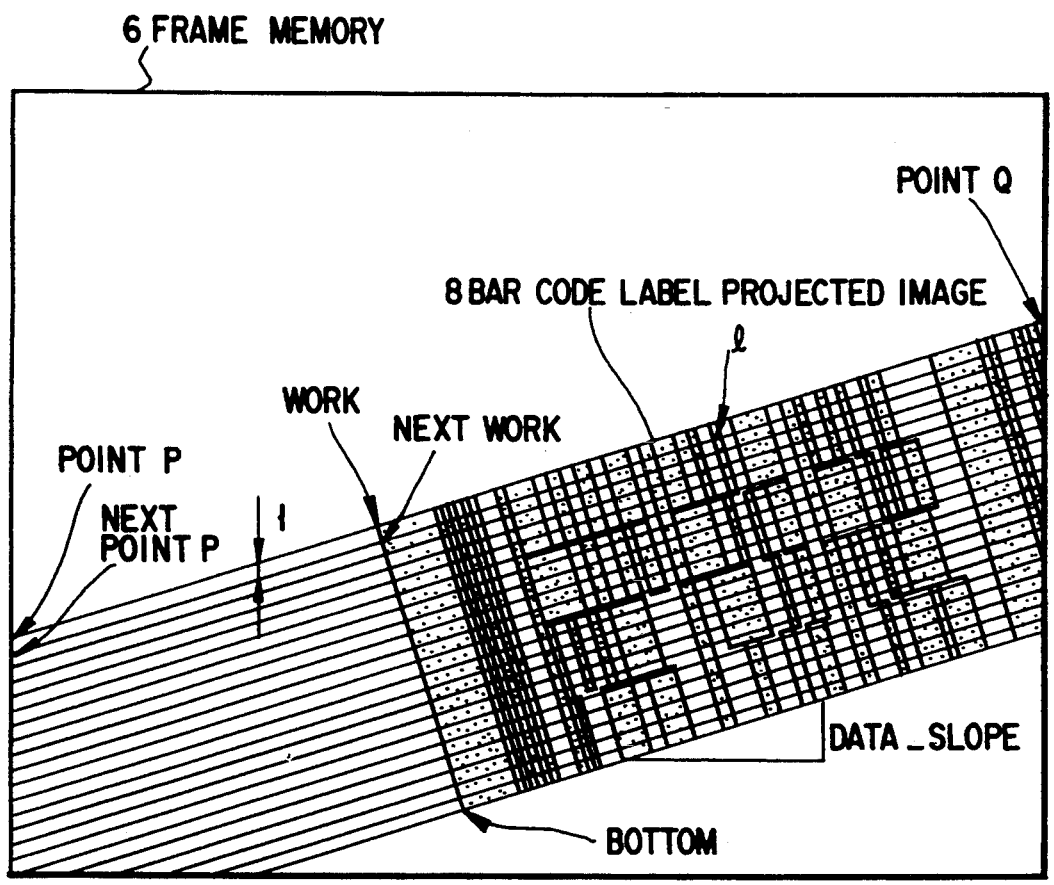
F I G. 44

SYMBOL INFORMATION READING APPARATUS

BACKGROUND OF THE INVENTION

1. Field of the Invention

The present invention relates to a symbol information reading apparatus for reading symbol information such as bar codes.

2. Description of the Related Art

With the remarkable spread of POS (Point Of Sale) systems in recent years, bar codes have become familiar to the public. A bar code is a symbol consisting of bars and spaces combined in parallel to form a single bar code character. If necessary, character groups including check digits are added in parallel to the bar code character; for example, unique patterns of start and stop characters are appended before and after the bar code character to indicate the beginning and ending of a bar code symbol.

JAN (Japan Article Number) is a standardized bar code system widely used in Japan for general consumer goods. Another application of bar codes is as distribution material symbols which are such that a distribution identification code of one or two digits is placed before the JAN code to form one symbol.

Any bar code symbol of the above bar code systems is called a one-dimensional bar code. The amount of information that those bar code systems can handle is several tens of bytes at most.

Recently, however, there has been a strong demand for a bar code containing a greater amount of information. To meet the demand, various symbol systems called two-dimensional bar codes have been proposed.

With these symbol systems, a remarkably large amount of information can be coded as compared to the one-dimensional bar code systems. In one of two-dimensional systems, the amount of information is increased by stacking one-dimensional bar codes. The symbols of these system are called stacked bar codes. This type of stacked bar codes system includes a system called PDF-417.

A known symbol information reading apparatus for reading stacked bar codes is a laser scan type apparatus. According to this apparatus, a laser beam scans two-dimensionally, thereby reading and decoding the information contained in stacked bar codes.

Furthermore, Jpn. Pat. Appln, KOKAI Publication No. 2-268383 disclosed an apparatus wherein a bar code is taken by a two-dimensional imaging apparatus, the image data of the bar codes is stored in a memory, and the bar code symbol information is decoded on the basis of the image data stored in the memory.

However, the problem with these conventional bar-code symbol information reading apparatuses is that it is very time-consuming because the decoding process of bar-code symbol information obtained by scanning or imaging always takes place even when information necessary for decoding cannot be adequately obtained, or even when it is evident that decoding cannot provide the desired result. When decoding cannot be effectively performed, the bar code to be read must be scanned or imaged again to obtain the bar-code symbol information. In practice, however, the decoding process is always carried out, regardless of whether decoding is possible or not. Since this is not known immediately after the bar code has been scanned or imaged, time is wasted while waiting.

SUMMARY OF THE INVENTION

The object of the present invention is to provide a symbol information reading apparatus which eliminates the wasteful time in reading bar-code symbol labels, especially stacked bar-code labels.

The foregoing object is accomplished by providing a symbol data reading apparatus, comprising: imaging means for imaging a bar code composed of bars and spaces in the form of a two-dimensional image; memory means for storing the information from the imaging means; position estimating means for estimating a code position of the bar code on the basis of the information stored in the memory means; and decodability estimating means for estimating the possibility that the bar code is decoded, on the basis of the code position estimated by the position estimating means.

According to a symbol information reading apparatus of the present invention, the information which the imaging means gathered from imaging a bar code composed of bars and spaces in the form of a two-dimensional image, is stored in the memory means. The decodability estimating means estimates the possibility that the bar code will be decoded on the basis of its code position of the bar code, which is itself estimated by the position estimating means according to the information stored in the memory means. Therefore, when a bar code is scanned or imaged, it is readily understood whether decoding can be achieved or not, and thus helps to eliminate the wasteful waiting time. To achieve this, the information stored in the memory means is decoded only when the estimation result of the decodability estimating means shows that decoding is possible.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 8, for describing the label sensing method, shows the contents of a frame memory when an image of a bar code label of the PDF-417 code system has been taken in;

FIG. 9, for describing the method of finding the slope of the label, shows the contents of a frame memory when an image of a bar code label of the PDF-417 code system has been taken in;

FIG. 16A and FIG. 16B are flowcharts for illustrating the start code verify routine in FIG. 15;

FIG. 17A and FIG. 17B are flowcharts for illustrating the stop code verify routine in FIG. 15;

FIG. 19, for describing the threshold sensing line, shows the contents of a frame memory when an image of a bar code label of the PDF-417 code system has been taken in;

FIG. 22, for describing the method of determining the row and the column number, shows the contents of a frame memory when an image of a bar code label of the PDF-417 code system has been taken in;

FIG. 24, for describing the method of calculating the start point column and end point column, shows the contents of a frame memory when an image of a bar code label of the PDF-417 code system has been taken in;

FIG. 25 is a flowchart for illustrating the embedding check routine in FIG. 4;

FIG. 28 is a flowchart for illustrating the ROW number sensing routine in FIG. 27;

FIG. 30, for describing the optimal scanning method, shows the contents of a frame memory when an image of a bar code label of the PDF-417 code system has been taken in;

FIG. 35 is a flowchart for explaining the general operation of a symbol information reading apparatus according to a second embodiment of the present invention;

FIG. 38 is a flowchart for illustrating the start/stop code sensing routine in FIG. 37;

FIG. 39A and FIG. 39B are flowcharts for illustrating the scanning & sensing routine in FIG. 38;

FIG. 42A and FIG. 42B are views for illustrating the method of estimating and sensing a slope;

FIG. 44 is a view for describing the scanning operation.

DETAILED DESCRIPTION OF THE PREFERRED EMBODIMENTS

Embodiments of the present invention will now be described, referring to the accompanying drawings.

Figure 1:
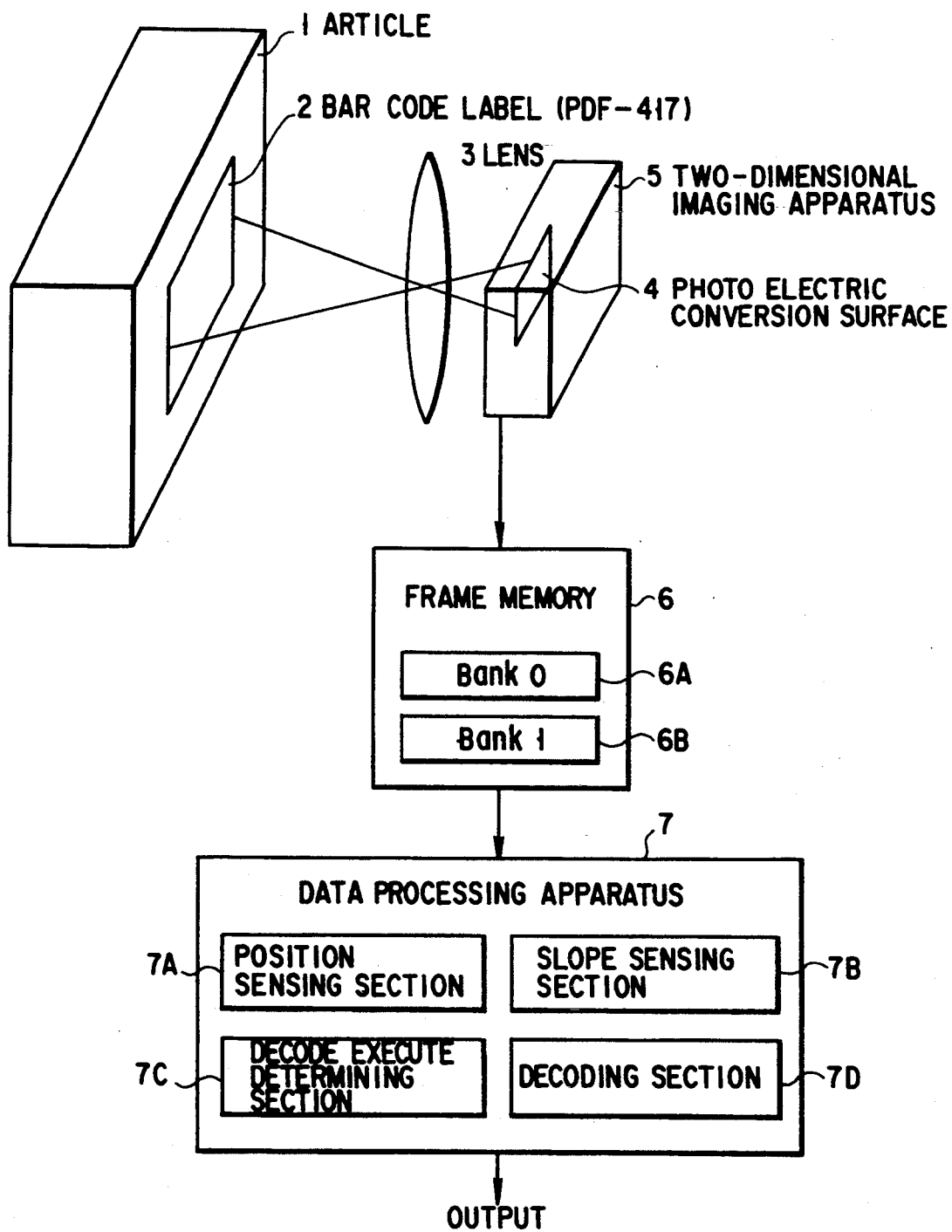
FIG. 1 shows the structure of a symbol information reading apparatus according to a first embodiment of the present invention.

FIG. 1 shows the structure of a symbol information reading apparatus according to a first embodiment of the present invention. The symbol information reading apparatus comprises an image forming lens 3, a two-dimensional imaging apparatus 5, a frame memory 6, and a data processing apparatus 7. The data processing apparatus 7 comprises, for example, a CPU and a memory (both not shown), and contains the functions of a position sensing section 7A and a slope sensing section 7B, both for estimating bar-code position information, a decode execute determining section 7C for deciding on the basis of the estimated code arrangement whether decoding should be done, and a decoding section 7D for decoding the bar code according to the decision result. The memory in the data processing apparatus 7 is made up of various registers for storing constants and variables, as will be described later. The position sensing section 7A serves as an "in-the-field" estimating means, and the section 7C serves as a decodability estimating means, as will become clear from the following detailed description.

An image of a stacked bar code label 2 printed on an article 1, e.g. a bar code label 2 of PDF-417 format, is formed on a photoelectric conversion plane 4 mounted on the two-dimensional imaging apparatus 5 via the image-forming lens 3. Label information obtained by photoelectric conversion by the imaging apparatus 5 is time-sequentially taken in two screens (Bank0 6A and Bank1 6B) of the frame memory 6 in the form of image signals.

Figure 2:
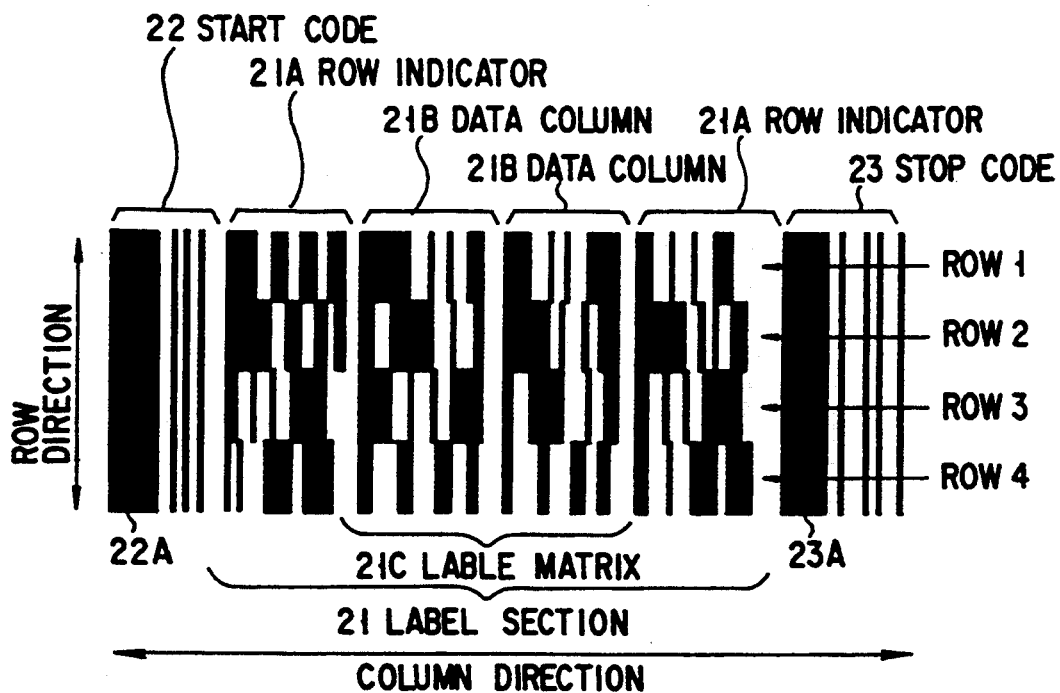
FIG. 2 shows a bar code label structure of the PDF-417 code system as an example of a stacked bar code.

FIG. 2 shows the label structure of the PDF-417 code system as an example of a two-dimensional stacked bar code. The bar code label 2 has a label section 21, which is an area of information components to be decoded and comprises bar code character groups consisting of bars and spaces, a start code 22, which serves as a start character and placed before the label section, and a stop code 23, which serves as a stop character and is placed after the label section. Each unit information is made up of four bars and four spaces, except for the stop code 23 which has an extra bar. The start and stop codes 22 and 23 begin, respectively, with thick bars 22A and 23A called big bars.

The unit information is called a character in the JAN code system and a code word (hereinafter, just referred to as a code) in the PDF-417 code system. In the PDF-417 code system, a unit information consisting of a pattern of bars and spaces is converted into intermediate information expressed by a number in the range from 0 to 928 and then decoded into a final language according to predetermined rules. As the final language, the PDF-417 code system supports ASCII characters, binary representation, and others.

The label section 21 comprises codes called row indicators 21A, one is adjacent to the start code 22 and the other is adjacent to the stop code 23, and a label matrix 21C therebetween consisting of a plurality of data columns 21B in which the actual data is written. In the row indicators 21A, the label size in the row and column directions, the security level, and other data are written. Consequently, by decoding the information in the row indicators 21A, the size of a label, the number of codes restorable and other information can be determined.

In this context, "security level" means the level of ability to restore data (or to correct an error). If the security level is n, then the number of codes restorable will be $2^{n+1}-2$. The subtrahend of 2 in the expression is used for error sensing. Specifically, the label matrix 21C always contains two error sensing codes such as known Reed-Solomon codes. In decoding, the use of the error sensing/correcting codes enables erroneously sensed data to be corrected.

FIG. 2 shows a bar code label having a 4×2 label matrix (the number of codes is therefore 8).

Figure 3:
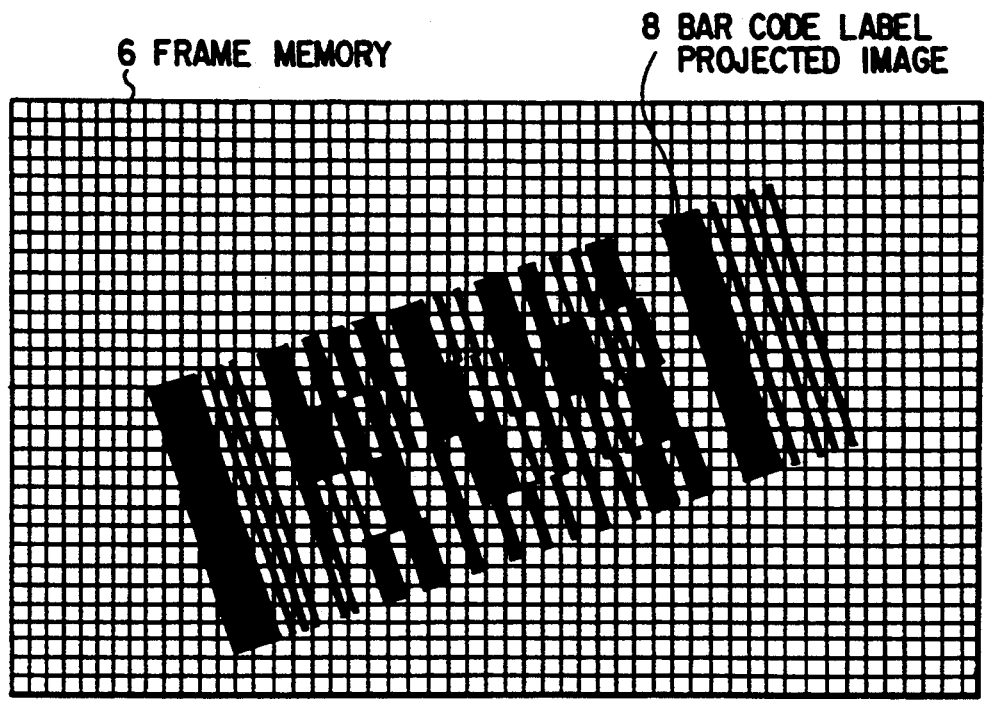
FIG. 3 is a pictorial view in which a bar code label image of the PDF-417 code system is hypothetically projected onto the pixel array of a frame memory.

FIG. 3 is a pictorial view of a label image of the PDF-417 code system having a 4×1 label matrix (the number of codes is therefore 4) hypothetically projected onto the pixel array of the frame memory 6. Here, a square in the figure represents not a single pixel but a set of n×n pixels.

The data processing apparatus 7, based on an algorithm which will be explained below in detail, senses a label, reads and decodes the label information, and supplies the decoded result to the host apparatus and other related devices (not shown).

Figure 4:
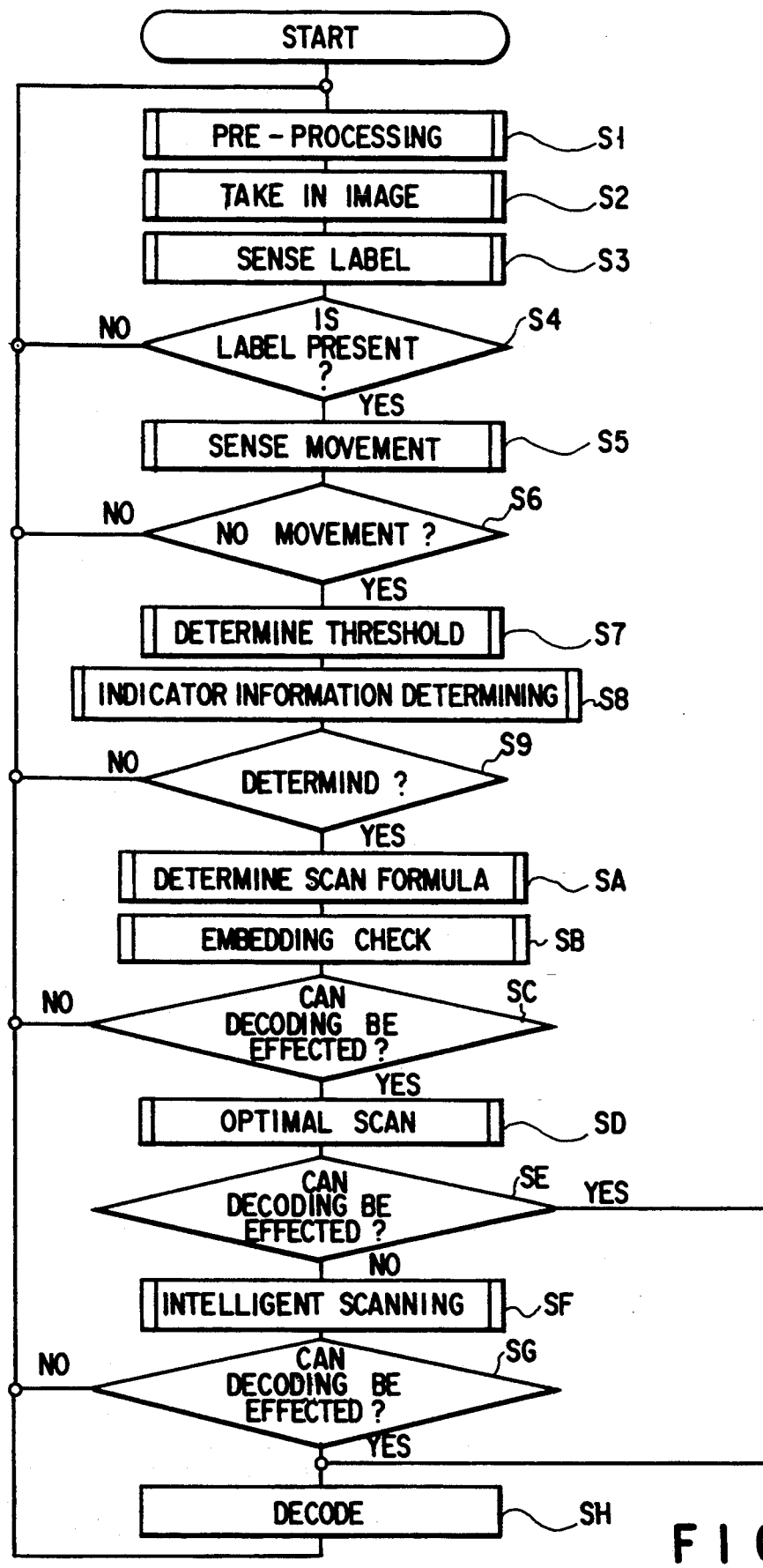
FIG. 4 is a flowchart for explaining the general operation of the symbol information reading apparatus according to the first embodiment.

FIG. 4 is a flowchart showing the general contents of the algorithm executed by the data processing apparatus 7. In this description, all the flowcharts are based on the notational convention of the C programming language.

A preprocessing routine (described later in detail) is called (step S1) and a parameter is set in a variable INC0 (actually various parameters are initially set).

Then, an image take-in routine (explained later in detail) is called (step S2) and image data are successively taken in two screens (Bank0 6A and Bank1 6B) of the frame memory 6. Here, "successively" means that the image data of one screen is stored in Bank0 6A, and then the image data of another screen is stored in Bank1 6B. In this case, after a take-in command is issued, the latest frame data is taken in Bank0 6A. After the frame data has been taken in Bank0 6A, a take-in command is issued once again and the latest frame data is taken in Bank1 6B. Consequently, a time lag in image pickup is present between the data items of the two screens (the time lag is expressed by (the time needed to store data in Bank0 6A)+(0 to 1/30 second)).

Subsequently, a label sensing routine (described later in detail) is called (step S3). Using Bank0 6A of the taken-in image data, it is determined whether a label is present or not. If a label is present, then the label information is sensed.

The result of the label sensing process in step S3 is judged (step S4). If there is no label, control is returned to step S1 and the preprocessing routine is called.

On the other hand, if a label is present, a movement sensing routine (described later in detail) is then called (step S5), thereby estimating the effect of movement in the Bank1 6B of the image data taken in step S2. In this context, the word "movement" means a movement of an image which frequently occurs when an object with the bar code label 2 is placed above the reading apparatus.

The result of the movement sensing in step S5 is judged (step S6). If a movement has occurred, control is returned to step S1 and the preprocessing routine is called.

If no image movement is sensed, then a threshold determining routine (described later in detail) is called (step S7), thereby finding a threshold (variable THRESHOLD) for use in a process of extracting inter-edge width information from line data to be processed, in an embedding check routine in step SB, in an optimal scanning routine in step SD, and in an intelligent scanning routine in step SF (all described later in detail).

An indicator information determining routine is then called (step S8), and a row indicator 21A of the label 2 is read to determine the label size, the security level, etc.

It is judged whether the label size etc. have been determined in the determining routine in step S8 (step S9). If the label size, etc. have not been determined, control is returned to step S1 and the preprocessing routine is called.

On the other hand, when the label size, etc. have been determined, a scan formula determining routine (described later in detail) is called (step SA), and various variables for scanning the entire surface of the label 2 are defined.

Next, an embedding check routine (described later in detail) is called (step SB), and the position of each code word is estimated to check to see if the position of each code word is within the screen.

Then, by determining whether or not the number of codes estimated to be outside the screen in step SB or to be illegible has exceeded the number of codes restorable, it is judged whether the decoding can be effected (step SC). If the number of codes restorable has been exceeded, it is determined that the decoding cannot be effected, and control is returned to step S1 and the preprocessing routine is called.

If the number of codes restorable has not been exceeded or it is determined that the decoding is possible, an optimal scanning routine is called (described later in detail) (step SD). Using the variables defined in step SA, the entire surface of the label is scanned at optimal intervals and the label information are read. In this context, the word "optimal scanning" means scanning at optimal intervals to obtain all label information with a minimum amount of calculations.

It is judged whether the decoding can be effected on the basis of the information read by the optimal scanning in step SD (step SE). When the decoding can be effected, a decoding process in step SH is performed.

If the decoding cannot be effected, an intelligent scan routine (described later in detail) is called (step SF). In the intelligent scanning routine, using the variables defined in step SB, the code position that could not be read in step SD is scanned to read the label information.

It is judged whether the decoding can be effected on the basis of the information read in steps SD and SF (step SG). If the decoding can be effected, a decoding process in step SH is performed.

If the decoding cannot be effected, control is returned to step S1 and the preprocessing routine is called.

In the decoding process in step SH, the information read in the optimal scanning routine in step SD and in the intelligent scanning routine in step SF is decoded, and the decoded result is output to the host apparatus and related units (not shown).

The above-mentioned various routines will now be described in detail.

Figure 5:
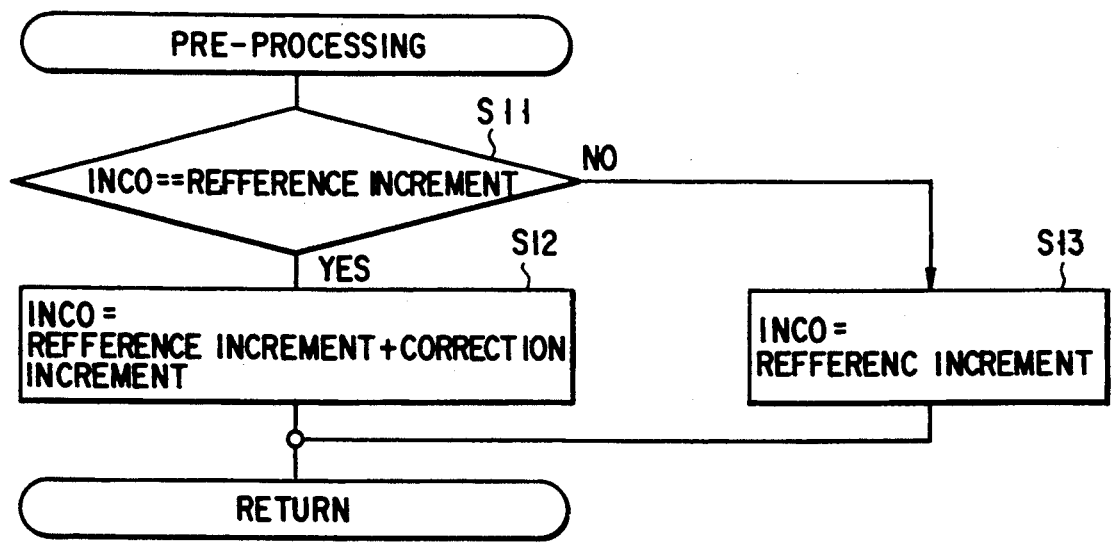
FIG. 5 is a flowchart for illustrating the preprocessing routine in FIG. 4.

Referring to the flowchart of FIG. 5, the preprocessing routine called in step S1 will now be explained.

It is judged whether the value of the variable INC0 is equal to a reference increment which represents a predetermined sensing interval (step S11). If the value is equal to the increment, the variable INC0 is reset to a value obtained by adding a correction increment to the reference increment (step S12). If the value is not equal to the increment, the value is reset to the reference increment (step S13). Hence, the value of the variable INC0 in the (odd number)th time control goes through the preprocessing routine in the large loop of the general flowchart in FIG. 4 differs from it in the (even number)th time. In FIG. 5, "==" represents "equal", and "=" represents "substitution." The value of the variable INC0 represents the sensing interval at the time the label is not sensed.

Figure 6:
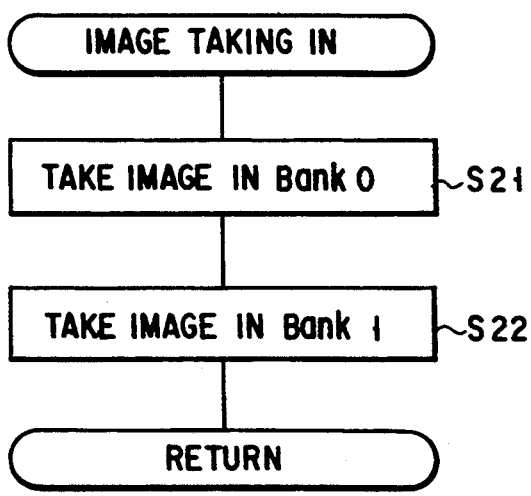
FIG. 6 is a flowchart for illustrating the image take-in routine in FIG. 4.

Referring to the flowchart of FIG. 6, the image take-in routine called in step S2 will be explained.

The image data from the two-dimensional imaging apparatus 5 is taken in Bank0 6A of the frame memory 6 (step S21). Then, another image data from the two-dimensional imaging apparatus 5 is taken in Bank1 6B of the frame memory 6 (step S22). This allows image data of two screens to be successively taken in.

Figure 7:
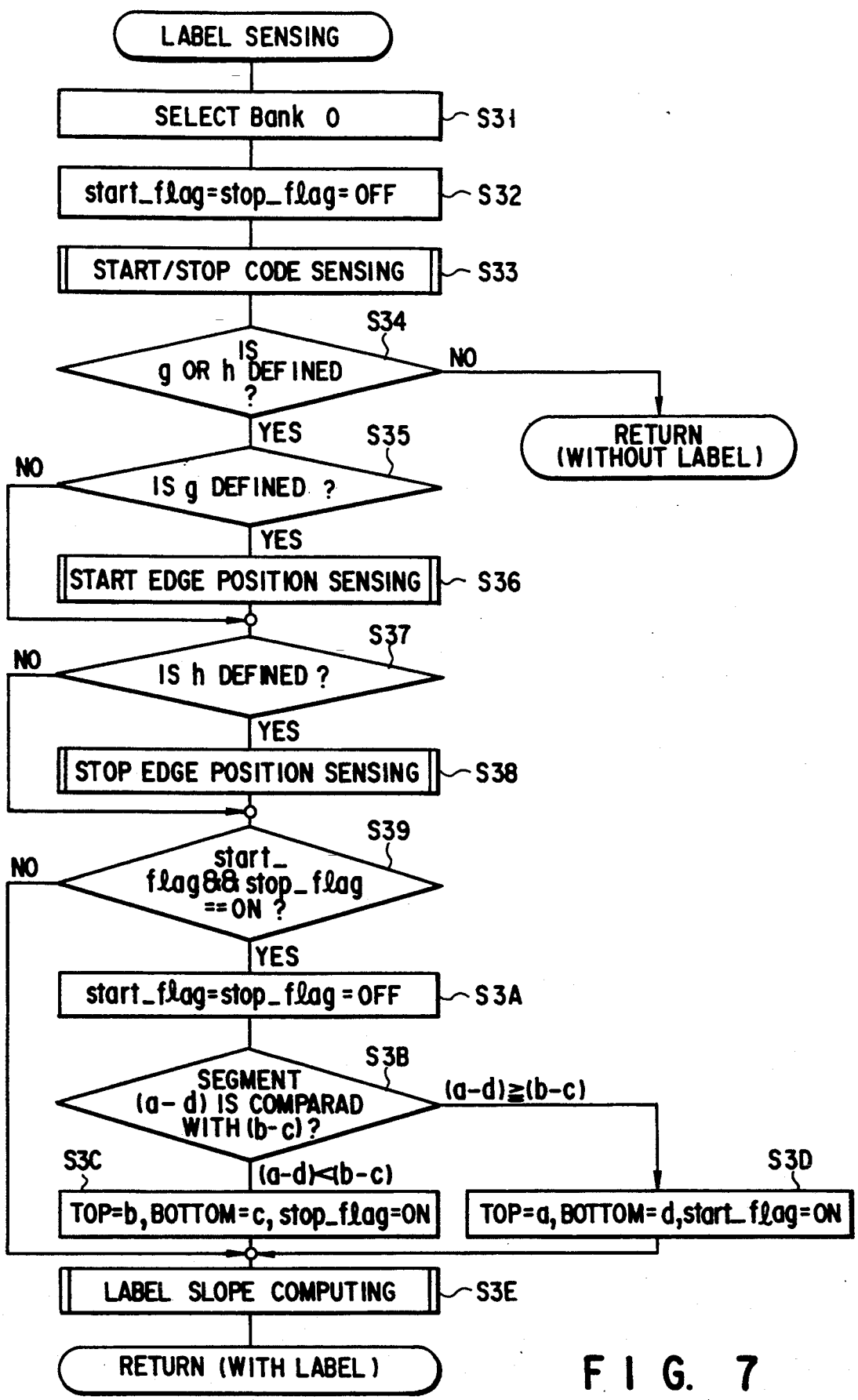
FIG. 7 is a flowchart for illustrating the label sensing routine in FIG. 4.

Next, the label sensing routine called in step S3 will be described with reference to the flowchart of FIG. 7 and the projected label image of FIG. 8 (this figure shows a bar code label having a 4×1 label matrix (the number of codes is therefore 4)). The label sensing routine includes two types of label sensing process: the sensing of the presence/absence of a label and the sensing of label position information, that is, the determining of an extracting range (variables TOP and BOTTOM) for extracting the image data from the frame memory 6 so as to be parallel to the label as well as the slope of the label (variable SLOPE). Here, the contents of the variable TOP indicate the top coordinates of the label, the contents of the variable BOTTOM indicate the bottom coordinates of the label, and the contents of variable SLOPE represent the slope of the label.

In the label sensing routine, the image information in Bank0 6A of the frame memory 6 is selected as the image information to be processed (step S31). Then, the label sensing flag is initialized (step S32). The label sensing flag is composed of a start sensing flag "start_flag" and a stop sensing flag "stop_flag." These label sensing flags are used to indicate which of the start code 22 and the stop code 23 should be selected and processed in a process explained later. When both the start code 22 and the stop code 23 are sensed, the more reliable one of the two must be selected.

Next, a start/stop code sensing routine (explained later in detail) is called (step S33) to sense whether or not the image data stored in Bank0 6A of the frame memory 6 contains a start and/or a stop code. That is, coordinates e, f, g, and h in FIG. 8 are sensed (not all four coordinate variables are necessarily sensed; for example, in the case of FIG. 9, coordinate variables f and h may not be obtained). If a start and/or a stop code are sensed and determined by this routine, the coordinate variable g on the frame memory 6 in FIG. 8 is defined for the start code 22, and the coordinate variable h is defined for the stop code 23. Here, the coordinate variable e indicates the coordinates at which the start code 22 is first found, f indicates the coordinates at which the stop code 23 is first found, g indicates the coordinates at which the start code 22 is last found, and h indicates the coordinates at which the stop code 23 is last found.

Then, it is judged whether one of the coordinates g and h is defined (step S34), and if not, it is determined that there is no label and control escapes from this processing. That is, control returns with the information that there is no label. Although in this specification, the flowchart is drawn as shown in the figure because the flow is written according to the notational convention of the C language, the convention of FORTRAN could have been applied and would have produced a different flowchart in which return is made after a no-label flag is set up.

In the way described above, the presence or absence of a label is sensed.

Next to be performed is the sensing of label position information, that is, the computing of an extracting range (variables TOP and BOTTOM) for extracting the image data from the frame memory 6 so as to be parallel to the label, as well as to the slope of the label (variable SLOPE).

Specifically, in step S34, if it is judged that one of the coordinates g and h is defined, it is then judged whether or not the coordinate variable g is defined (step S35). If not, control proceeds to step S37. If the coordinate variable g is defined, a start edge position sensing routine (explained later in detail) is called (step S36) to sense the start edge position. The start edge sensing defines coordinate variables i and m as shown in FIG. 8 on the basis of the coordinate variables e and g (when coordinate variable g has been defined, then naturally the coordinate variable e has also been defined), and further defines coordinate variables a and d. In addition, "start_flag" is set and the coordinate variables TOP and BOTTOM are defined. Here, each of the coordinate variables a and d indicates one of the four corners of the label.

Next, it is judged whether or not the coordinate variable h is defined (step S37), and if not, control goes to step S39. If the coordinate variable h is defined, a stop edge position sensing routine (explained later in detail) is called (step S38) to sense the stop edge position. The stop edge sensing defines coordinate variables as shown in FIG. 8 on the basis of the coordinate variables f and h (when the coordinate variable h has been defined, then the coordinate variable f has also been defined), and further defines coordinate variables b and c. Additionally, "stop_flag" is set and the coordinate variables TOP and BOTTOM are defined. Here, each of the coordinate variables b and c indicates one of the four corners of the label.

Next, it is judged whether or not both "start_flag" and "stop_flag" are on (step S39). If neither is on, control proceeds to step S3E. Here, the symbol "&&" means logical product.

If both flags are on, both "start_flag" and "stop_flag" are reset (step S3A). Then, segment (a-d) is compared with segment (c-d) (step S3B), and either the start code 22 or the stop code 23, whichever has the longer segment, is selected as the one to be processed. The longer one is selected as a reference in processing since the main reason why one code becomes shorter than the other in normal operation is that the one code sometimes sticks out from the screen.

If segment (a-d) is shorter than segment (b-c), the value of the coordinate variable b is substituted into the coordinate variable TOP and the value of coordinate variable c is substituted into the coordinate variable BOTTOM to define the data for determining an extracting range of label information, and further, "stop_flag" is selected and turned on (step S3C).

Conversely, if segment (a-d) is equal to or longer than segment (b-c), the value of the coordinate variable a is substituted into the coordinate variable TOP and the value of the coordinate variable d is substituted into the coordinate variable BOTTOM to define the data for determining an extracting range of label information, and further, "start_flag" is selected and turned on (step S3D).

Then, the label slope computing routine is called (step S3E) to obtain the label slope (variable SLOPE) from those coordinate variables TOP and BOTTOM. Control then returns with the obtained variable and the information that a label is present.

Figure 10:
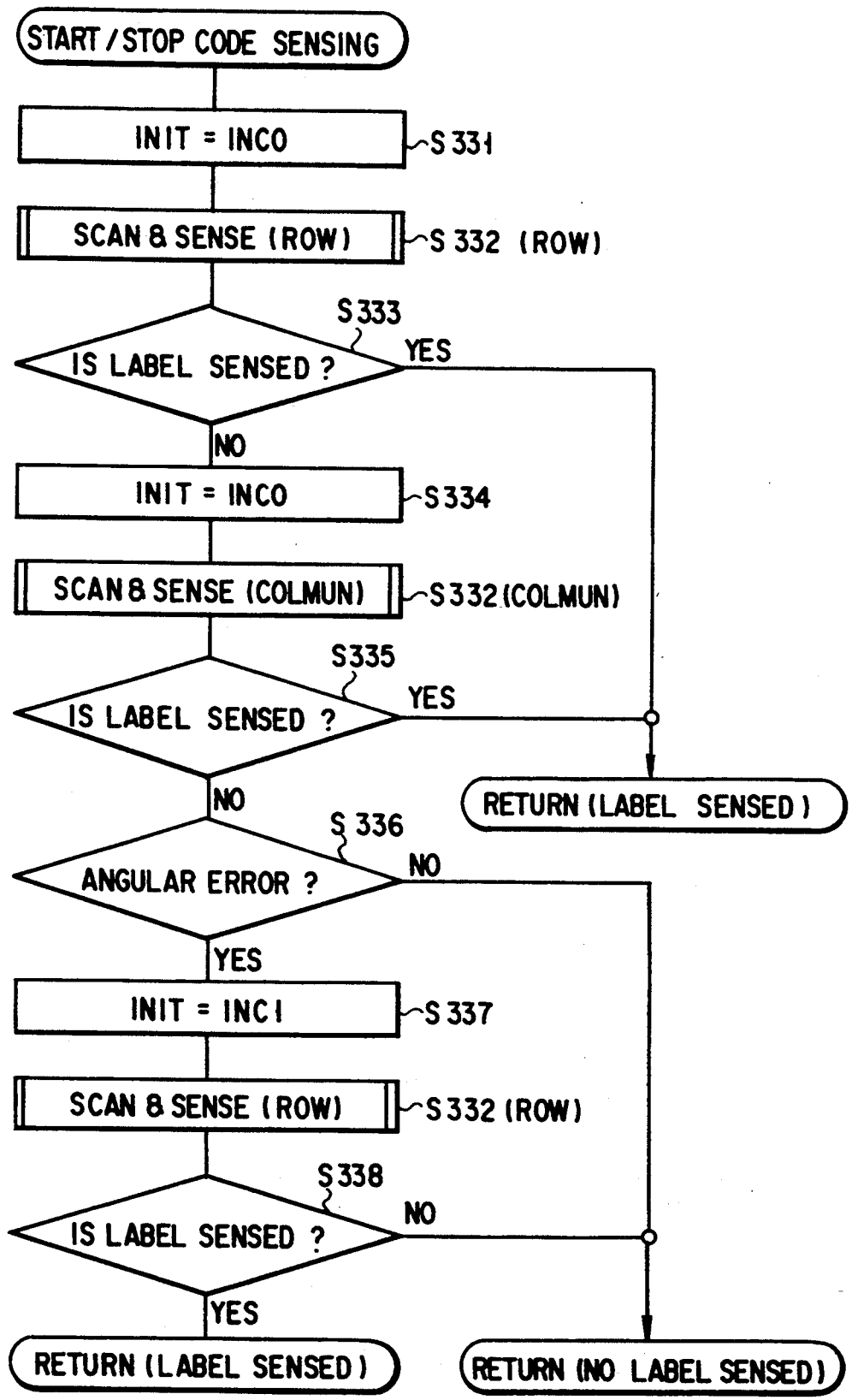
FIG. 10 is a flowchart for illustrating the start/stop code sensing routine in FIG. 7.

The start/stop code sensing routine called in step S33 in the label sensing routine will now be described with reference to the flowchart of FIG. 10. The start/stop code sensing routine senses at least one of a set of the coordinate variables e and g and a set of the coordinates f and h, as described above.

First, the value of the sensing interval variable INC0 at the time no a label is sensed, is substituted into a label sensing interval variable INIT (step S331). Next, a scanning & sensing (row) routine (explained later in detail) is called (step S332) to scan the image data in Bank0 6A of the frame memory 6 in the row direction to sense the start/stop codes. Here, scanning in the row direction means scanning in the longitudinal direction of the frame memory 6 as shown by row scanning in FIG. 8.

Based on the result of the scanning & sensing (row) routine, it is judged whether the start code 22 or the stop code 23 is sensed, or whether or no a label is sensed (step S333). If a label is sensed, control returns with the information that a label is present.

On the other hand, when no label is sensed, the value of the label sensing interval variable INC0 at the time no label is sensed, is substituted into the label sensing interval variable INIT (step S334). After this, the scanning & sensing (row) routine is called (step S332) to scan the image data in Bank0 6A of the frame memory 6 in the column direction to sense the start/stop codes. Here, scanning in the column direction means scanning in the lateral direction of the frame memory 6 as shown by column scanning in FIG. 8.

Based on the result of the scanning & sensing (column) routine, it is judged whether the start code 22 or the stop code 23 is sensed, or whether or not a label is sensed (step S335). If a label is sensed, control returns with the information that a label is present.

When no label is sensed this time either, however, it is determined whether the cause comes from angular errors (step S336). The judgment of angular errors in the label is made by referring to the return value of the scanning & sensing routine called in step S332. Specifically, the scanning & sensing routine always checks to see if an angular error has occurred. If an angular error has occurred, it sets up an angular error flag and a label unsensed flag in the return value, terminates the processing at this point and returns control to a higher-level routine. In the judgment of angular errors, the subsequent processing is carried out again only in the row direction. Thus, by judging the return value of scanning in the column direction in step S336, it is determined whether the no-label result obtained is due to angular errors or in fact no label has been sensed.

When it is judged that it is not due to angular errors in step S336, control returns with the information that no label is sensed.

On the other hand, when it is judged that it is due to angular errors, then the value of a label sensing interval INC1 at the time a label is sensed, is substituted into the label sensing interval variable INIT (step S337). For the size of the sensing interval variables INC0 and INC1, it is desirable that the least common multiple of both of them should basically exceed the screen range: for example, INC0=23 and INC1=17.

After that, the scanning & sensing (row) routine is called again (step S332) to scan the image data in Bank0 6A of the frame memory 6 in the row direction to sense the start/stop codes.

Then, it is judged whether or not the start/stop codes (or a label) are sensed (step S338). If it is found that they are sensed, control returns with the information that a label is sensed, and if not, control returns with the information that no label is sensed.

In this way, the scanning & sensing is first done in the row direction in the start/stop code sensing routine. If this scanning has failed to sense any label, then scanning is done in the column direction. If the scanning has further failed to sense any label, then it is judged whether it is due to angular errors (that is, the label is inclined too much). If it is found that it is due to an angular error, the label sensing interval is changed, and scanning is done again in the row direction. If this still fails to sense any label, it is determined that there is no label.

The reason why scanning is done only in the row direction in the case of angular errors is that the bar code label 2 is generally placed so that row scanning may find the label, that is, the column direction may agree with the longitudinal (lateral) direction of the frame memory 6, and that by making use of this human characteristic, column scanning can be omitted. Column scanning may, of course, be done. In which case, however, the execution would take more time.

Figure 11A:
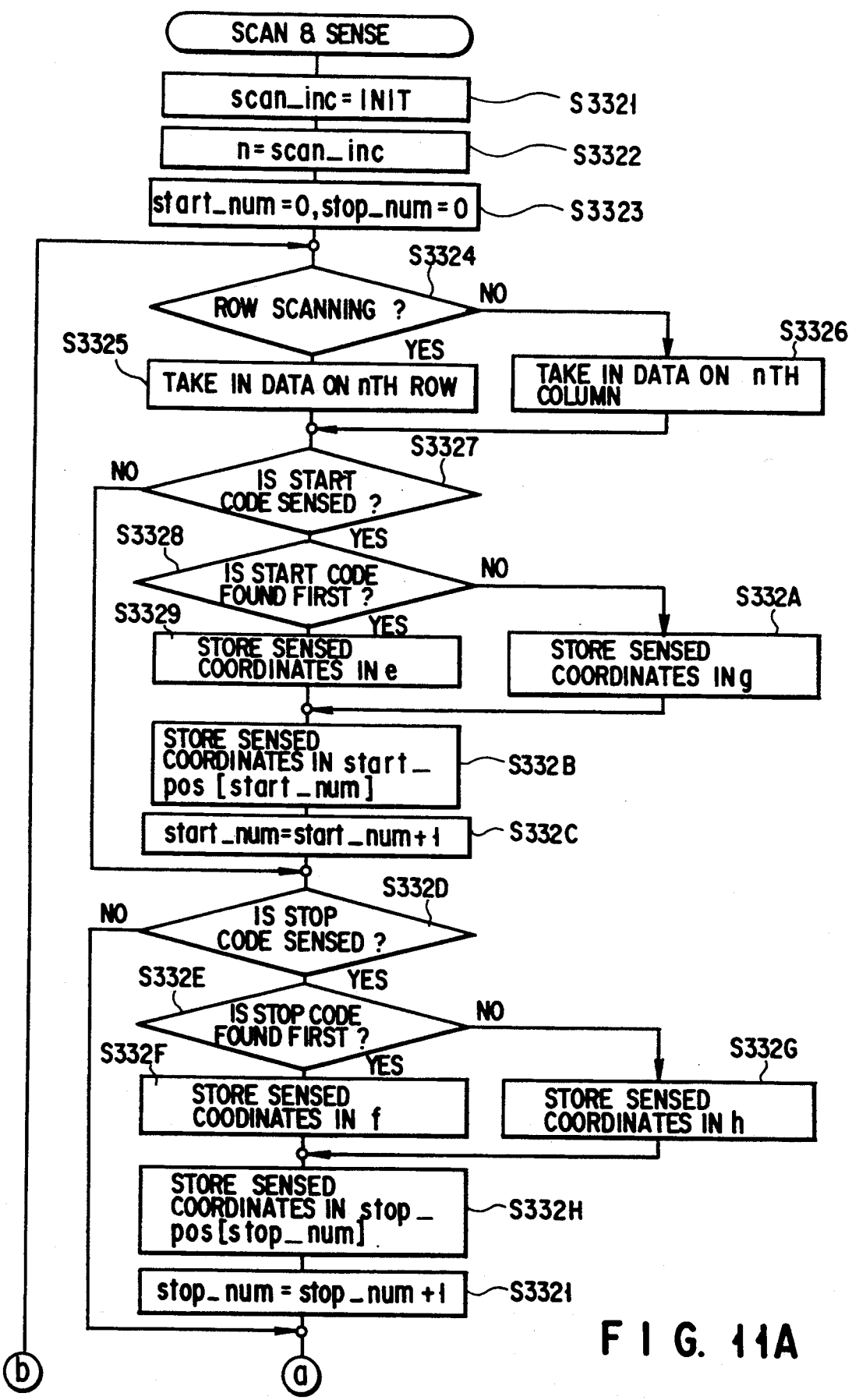
FIG. 11A through FIG. 11C are flowcharts for illustrating the scanning & sensing routine in FIG. 10.
Figure 11B:
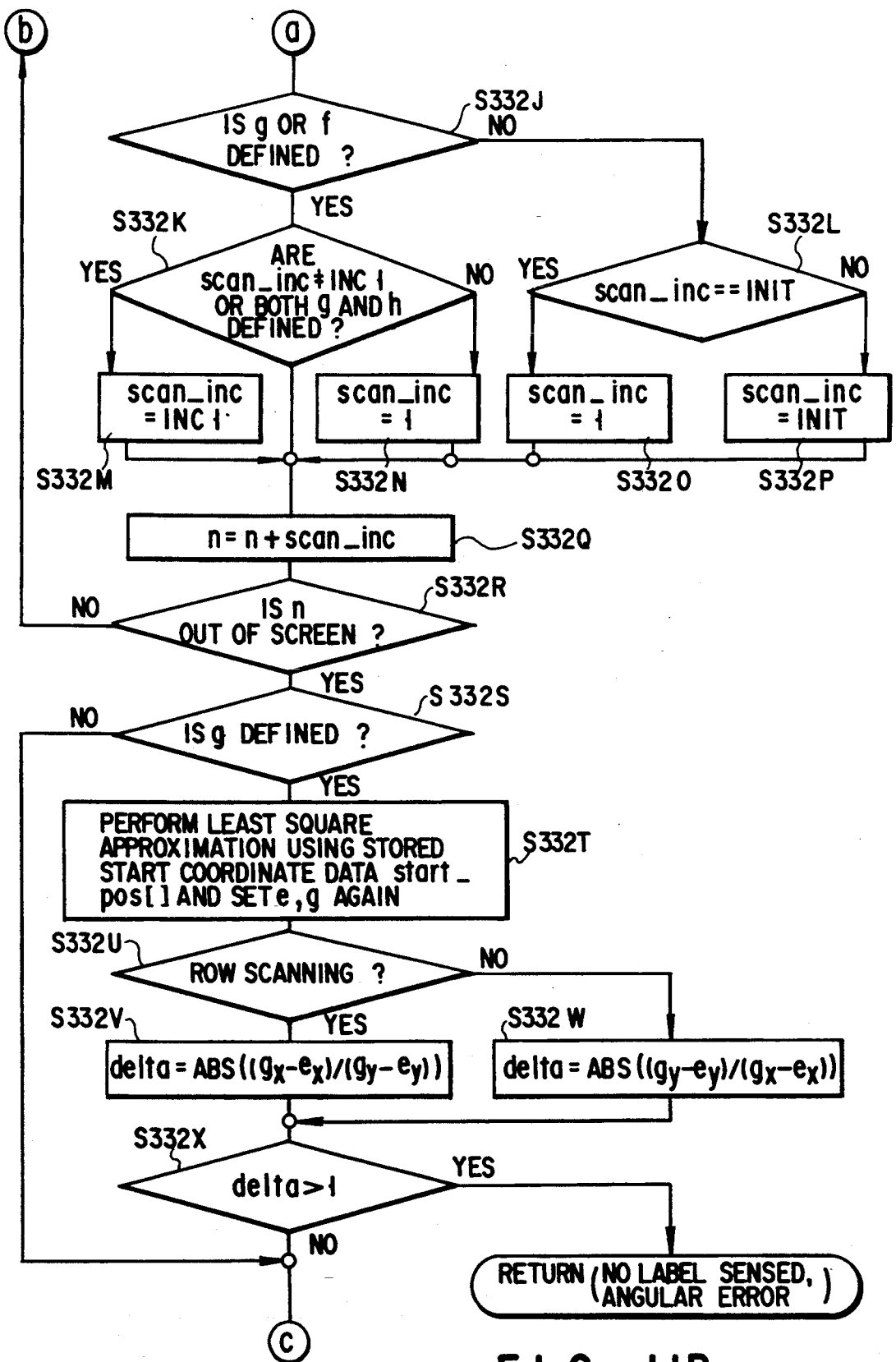
Figure 11C:
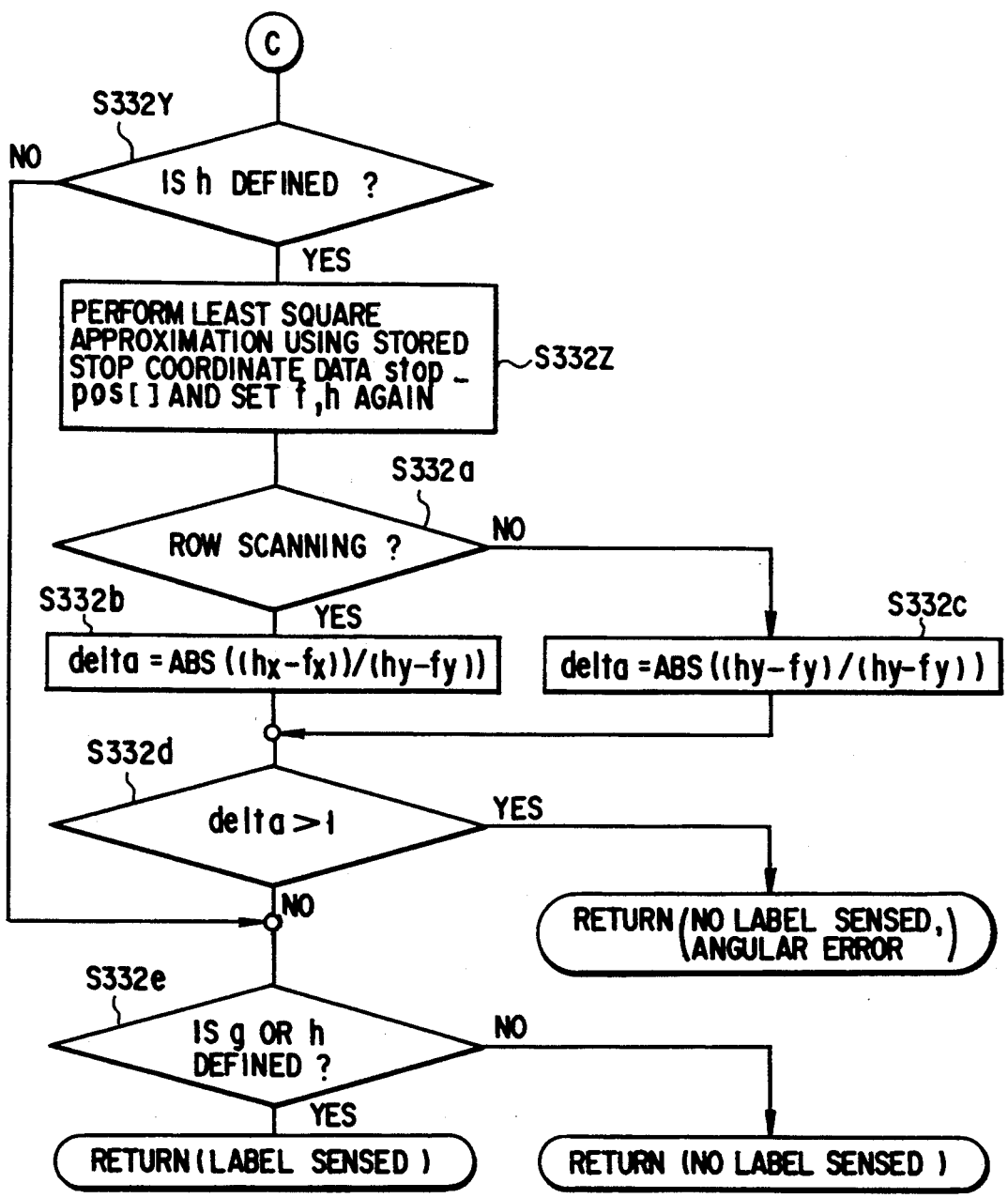

Referring to a series of flowcharts shown in FIGS. 11A through 11C, the scanning & sensing routine called in step S332 will be described. This routine scans the image data in Bank0 6A in the row or column direction at sensing intervals (varied under specified conditions) to determine at least one of a set of the coordinate variables e and g and a set of the coordinate variables f and h. The direction in which scanning is done is determined when the routine is called. When at least one of a set of the coordinate variables e and g and a set of the coordinate variables f and h has been determined and no angular error has occurred at that time, it is judged that a label has been sensed and control returns to a higher-level routine. When neither a set of the coordinate variables e and g nor a set of the coordinate variables f and h could be sensed, it is judged that there has been no label, and control returns to a higher-level routine. Even if a label has been sensed, when the label angle computed from the coordinate values shows that the label inclines more than 45° toward the scanning direction, it is judged that there has been no label and an angular error has occurred, so control returns to a higher-level routine.

Specifically, a parameter "scan_inc" is initially set in the sensing interval variable INIT (step S3321), and a parameter n is initially set in the parameter "scan_inc" (step S3322). Here, the parameter "scan_inc" indicates the label sensing (scanning) interval used in this routine, and the parameter n shows the position of a line to be sensed (scanned). Next, a number-of-sensed-start-codes variable "start_num" and a number-of-sensed-stop-codes variable "stop_num" are initialized to 0 (step S3323).

After this initial setting, it is judged whether row scanning or column scanning is performed (step S3324). If row scanning is performed, the image data on the nth row is taken in (step S3325), and if column scanning is performed, the image data on the nth column is taken in (step S3326).

Next, it is judged whether or not the image data taken in contains the start code 22 (step S3327). If not, control goes to step S332D. If the start code 22 is present, it is judged whether or not the start code 22 has been sensed for the first time (step S3328). If it is sensed for the first time, the sensed coordinates are stored in the coordinate variable e (step S3329). If not, the sensed coordinates are stored in the coordinate variable g (step S332A). The judgment of whether or not it is sensed for the first time is based on whether a value has been stored in the coordinate variable e. Next, the sensed coordinates of the start code are stored in the (start_num)th position (the position in the array specified by the value of variable "start_num") in the sensed start-code coordinate array start_pos [] (step S332B). The number-of-sensed-start-codes variable "start_num" is incremented (step S332C). Hence, all the coordinates of the position of each start code sensed one after another are stored in the sensed start code coordinate array start-pos [], and the number of codes sensed is stored in the number-of-sensed-start-codes variable "start_num."

Similarly, it is judged whether or not the image data taken in contains the stop code 23 (step S332D). If not, control goes to step S332J. If the stop code 23 is present, it is judged whether or not the stop code 23 has been sensed for the first time (step S332E). If it is sensed for the first time, the sensed coordinates are stored in the coordinate variable f (step S332F). If not, the coordinates are stored in the coordinate variable h (step S332G). The judgment of whether or not it is sensed for the first time is based on whether or not a value has been stored in coordinate variable f. Next, the sensed coordinates of the stop code has been stored in the (stop_num)th position (the position in the array specified by the value of variable "stop_num") in the sensed stop-code coordinate array stop_pos [] (step S332H). The number-of-sensed-stop-codes variable "stop_num" is incremented (step S332I). Hence, all the coordinates of the position of each stop code sensed one after another are stored in the sensed stop code coordinate array stop-pos [], and the number of codes sensed is stored in the number-of-sensed-stop-codes variable "stop_num."

Next, it is judged whether the coordinate variable e or f has been defined (stored) (step S332J). If the coordinate variable e or f has been defined, control goes to step S332K. If not, control goes to step S332L. In step S332K, it is judged whether the scanning interval "scan_inc" is not the sensing interval variable INC1 at the time a label is sensed, or both the coordinate variables g and h have been defined. If "scan_inc" is not INC1 or both g and h have been defined, the scanning interval "scan_inc" is set to the variable INC1 (step S332M), and, if "scan_inc" is INC1 or both g and h have not been defined, the "scan_inc" is set to 1 (step S332N). If it is judged in step S332J that either one of the coordinate e or f has not been defined, it is then judged whether the scanning interval "scan_inc" is the sensing interval variable INIT (step S332L). If "scan_inc" is INIT in step S332L, the scanning interval "scan_inc" is set to 1 (step S332O). If "scan¢inc" is not INIT in step S332L, "scan_inc" is set to INIT (step S332P).

The steps from S332J to S332P relate to the method of varying the data take-in interval. As long as the coordinate variables e and f are not defined, the scanning interval "scan_inc" takes the value of the sensing interval variable INIT and "1", alternately. When the coordinate variables e and f have been defined, the scanning interval "scan_inc" takes the value of the sensing interval variable INC1 at the time a label is sensed and "1", alternately, until both g and h are defined. If all the coordinate variables e, f, g, and h have been defined, the scanning interval "scan_inc" is set to the variable INC1.

More specifically, from the beginning of the sensing process to the time one of the start/stop codes has been sensed, the scan interval takes the value of INIT (=INC0, e.g. 23) and 1, alternately. From the time one of the start/stop codes has been sensed to the end of the screen, the scanning interval takes the value of INC1 (e.g. 17) and 1, alternately. The reason why the sensing line interval is varied in this manner is as follows. If the sensing line interval is made constant, there may be a label angle at which sensing is disabled; this angle is determined by a minimum line width of the label, an imaging magnification, and a two-dimensional imaging element pitch. In order to avoid presence of such a label angle, the interval is varied from the time the sensing process begins to the time one of the start/stop codes is sensed. In this case, it is also possible, depending on condition, that the label is not sensed ("oversight"), although the label is actually imaged. A first "oversight" may be acceptable, but a second "oversight" is prevented by varying the increment INIT (=INC0).

The scanning interval "scan_inc" is set to INC1 when the coordinate variables e, f, g, and h have been defined, because there is no need to compute new values of g and h once all the coordinates are computed, and it is more important to quickly complete this processing. If the increment is set to INC1 after all the coordinates have been computed, new values of g and h are normally computed successively.

Next, the value of the parameter n is increased by the value of "scan_inc" to update n (step S332Q) for determining the number of rows or columns to be taken in next time. Since the length and width of the frame memory 6 are known, it is judge from these factors whether the updated n is outside the screen or not (step S332R). If it is within the screen, control is returned to step S3324.

If it is outside the screen or the scanning is completed, then it is judged whether or not the coordinate variable g has been defined (step S332S). If not, control is returned to step S332Y.

If the coordinate variable g has been defined, the start code starting position is estimated linearly (least square approximation) using the sensed start code coordinate array start_pos [] previously stored. Using the estimated straight line, e and g are set again (step S332T). Setting e and g again on the basis of many start code starting positions results in more accurate estimation of the start code.

Then, it is judged whether row scanning or column scanning is performed (step S332U). If row scanning is performed, the difference between the x-coordinate value of the coordinate variable g and the x-coordinate value of the coordinate variable e is divided by the difference between the y-coordinate value of the coordinate variable g and the y-coordinate value of the coordinate variable e, and the absolute value of the result is computed (represented by "ABS" in the figure). The absolute value is substituted into variable "delta" that shows the value of the slope (step S332V).

If column scanning is performed, the difference between the y-coordinate value of the coordinate variable g and the y-coordinate value of the coordinate variable e is divided by the difference between the x-coordinate value of the coordinate variable g and the x-coordinate value of the coordinate variable e, and the absolute value of the result is computed. The absolute value is substituted into variable "delta" (step S332W).

By judging whether or not the absolute value "dalta" of the slope obtained is larger than 1 (step S332X), it is determined whether an angular error has occurred. If an angular error has occurred, control returns with the information that no label has been sensed and an angular error has occurred.

If an angular error has not occurred, or if it has been judged in step. S332S that the coordinate variable g has not been defined, then it is judged whether or not the coordinate variable h has been defined (step S332Y). If not, control is re turned to step S332e.

If the coordinate variable h has been defined, the stop code starting position is estimated linearly using the sensed stop code coordinate array stop_pos [] previously stored. Using the estimated straight line, f and h are set again (step S332Z). Setting f and h again on the basis of many stop code starting positions results in more accurate estimation of the stop code.

Then, it is judged whether row scanning or column scanning is performed (step S332a). If row scanning is performed, the difference between the x-coordinate value of the coordinate variable h and the x-coordinate value of the coordinate variable f is divided by the difference between the y-coordinate value of the coordinate variable h and the y-coordinate value of the coordinate variable f, and the absolute value of the result is computed. The absolute value is substituted into the absolute value of the slope "delta" (step S332b).

If column scanning is performed, the difference between the y-coordinate value of the coordinate variable h and the y-coordinate value of the coordinate variable f is divided by the difference between the x-coordinate value of the coordinate variable h and the x-coordinate value of the coordinate variable f, and the absolute value of the result is computed. The absolute value is substituted into "delta" (step S332c).

By judging whether or not the absolute value "delta" of the slope obtained is larger than 1 (step S332d), it is determined whether an angular error has occurred. If an angular error has occurred, control returns with the information that no label has been sensed and an angular error has occurred.

If no angular error has occurred, or if it has been judged in step S332Y that the coordinate variable h has not been defined, then it is judged whether or not the coordinate variable g or h has been defined (step S332e). If it has been defined, control returns with the information that a label has been sensed, and if it has not, control returns with the information that no label has been sensed.

In this way, in steps S332S through S332W or in steps S332Y through S332C, the slope of the entire label is obtained by computing the slope of the start/stop codes. In step S332X or S332d, it is judged whether or not the absolute value "delta" of the slope exceeds 1. If it exceeds 1, it is judged that an angular error has occurred and no label is sensed, and control is returned. If the absolute value "delta" of the slope has not exceeded 1, it is judged in step S332e whether or not the coordinate variable g or h has been defined. If it is defined, it is judged that a label is sensed and control is returned. If not, it is judged that no label is sensed and control is returned.

The reason why the judgment of angular errors in steps S332X and S332d is made is that there is a possibility, though very small, that an oversight may have taken place in the extracting direction in which an error should be found, and the error is found in another direction. In this case, since an error will occur in a subsequent process, such sensing should be prevented. Further, the reason why a reference of an angular error is 1 is that "delta" becomes 1 at a label rotational angle of 45°.

Additionally, the reason why the values of coordinates are set again in steps S332T and S332Z is that the coordinates are not always sensed accurately due to such error factors as local contamination of the label, label printing inaccuracy, or the resolution of the imaging system. Even if such error factors have an adverse effect on the sensed coordinates (e and g or f and h), the sensed coordinates are very accurately corrected using least square approximation.

Figure 12:
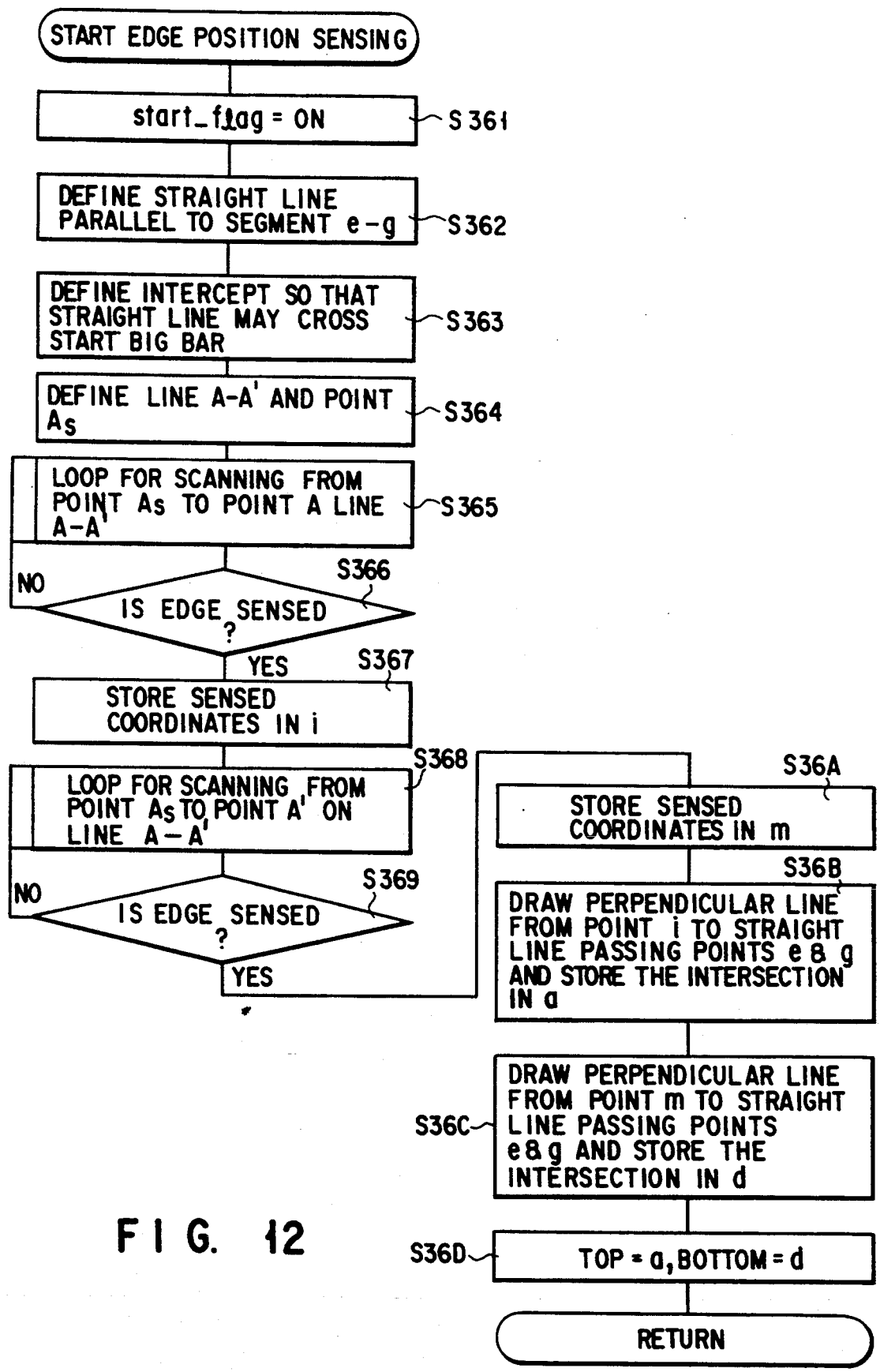
FIG. 12 is a flowchart for illustrating the start edge position sensing routine in FIG. 7.

The start edge position sensing routine called in step S36 in the label sensing routine will now be described with reference to the flowchart of FIG. 12.

First, the start sensing flag "start_flag" is turned on (step S361) and an equation for a straight line parallel to segment e-g is defined: for example, $y = ax + b$ is defined as an equation for the segment e-g (step S362). Next, an intercept b is defined so that the straight line may cross the start big bar 22A (step S363). The start code 22 is composed of, for example, the eight bars of the start big bar 22A, three pairs of white bars and black bars, and three white bars, that is, a total of 17 bars. The result of imaging the start code 22 is assumed to be N pixels. It is known that a straight line expressed by $y = ax + b$ moves parallel as the intercept b is varied. Thus, to obtain a straight line crossing the big bar 22A, the intercept b must be such that the segment e-g is moved $\{(17-8/2)/17\} \times N$ pixels to the left.

Figure 8:
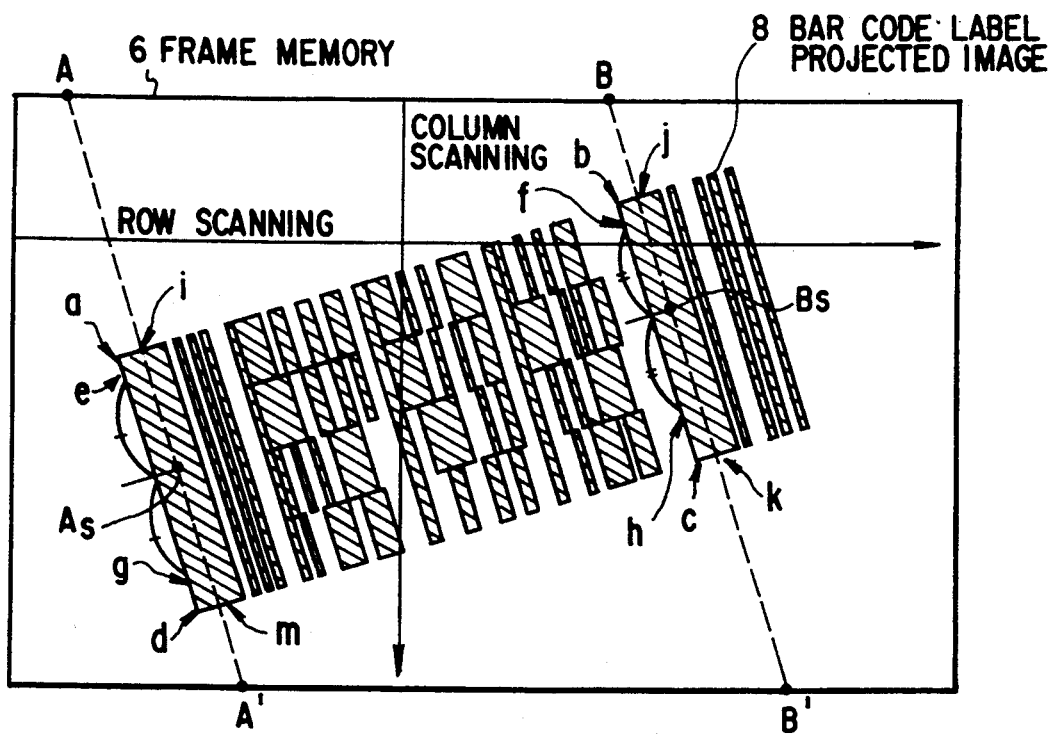

After a line crossing the start big bar 22A has been obtained, the intersections of the line and the equation defining the screen are defined as A and A' (see FIG. 8). Then, a perpendicular line is drawn from the mid-point of the coordinates e and g to line A-A' and the intersection is defined as $A_s$ (step S364).

Next, the image data is examined sequentially, starting at point $A_s$ to point A on line A-A' (step S365), to check to see if there is an edge (step S366). This check can be made by, for example, comparison of intensity to examine the change of luminance, differential, or quadratic differential. When an edge is sensed this way, the sensed coordinates are stored in a coordinate variable i (step S367), i.e, the sensed coordinates are defined as point i.

The image data is again examined sequentially, starting this time at point $A_s$ to point A' on line A-A' (step S368), to check to see if there is an edge (step S369). When an edge is sensed this way, the sensed coordinates are stored in a coordinate variable m (step S36A), i.e, the sensed coordinates are defined as point m.

Following, a perpendicular line is drawn from point i indicated by the coordinate variable i to the line passing points e and g indicated by the coordinate variables e and g, and the coordinates of the intersection are stored in a coordinate variable a (step S36B). That is, an equation for a straight line meeting at right angles with line A-A' passing point i is determined, and the intersection of this line and the line passing points e and g is obtained. The intersection is then defined as point a.

Similarly, a perpendicular line is drawn from point m indicated by the coordinate variable m to the line passing points e and g indicated by the coordinate variables e and g, and the coordinates of the intersection are stored in a coordinate variable d (step S36C). That is, an equation for a straight line meeting at right angles with line A-A' passing point m is determined, and the intersection of this line and the line passing points e and g is obtained. The intersection is then defined as point d.

After the value of the coordinate variable a thus obtained is stored in the coordinate variable TOP and the value of the coordinate variable d is stored in the coordinate variable BOTTOM (step S36D), control is returned to a higher-level routine.

Figure 13:
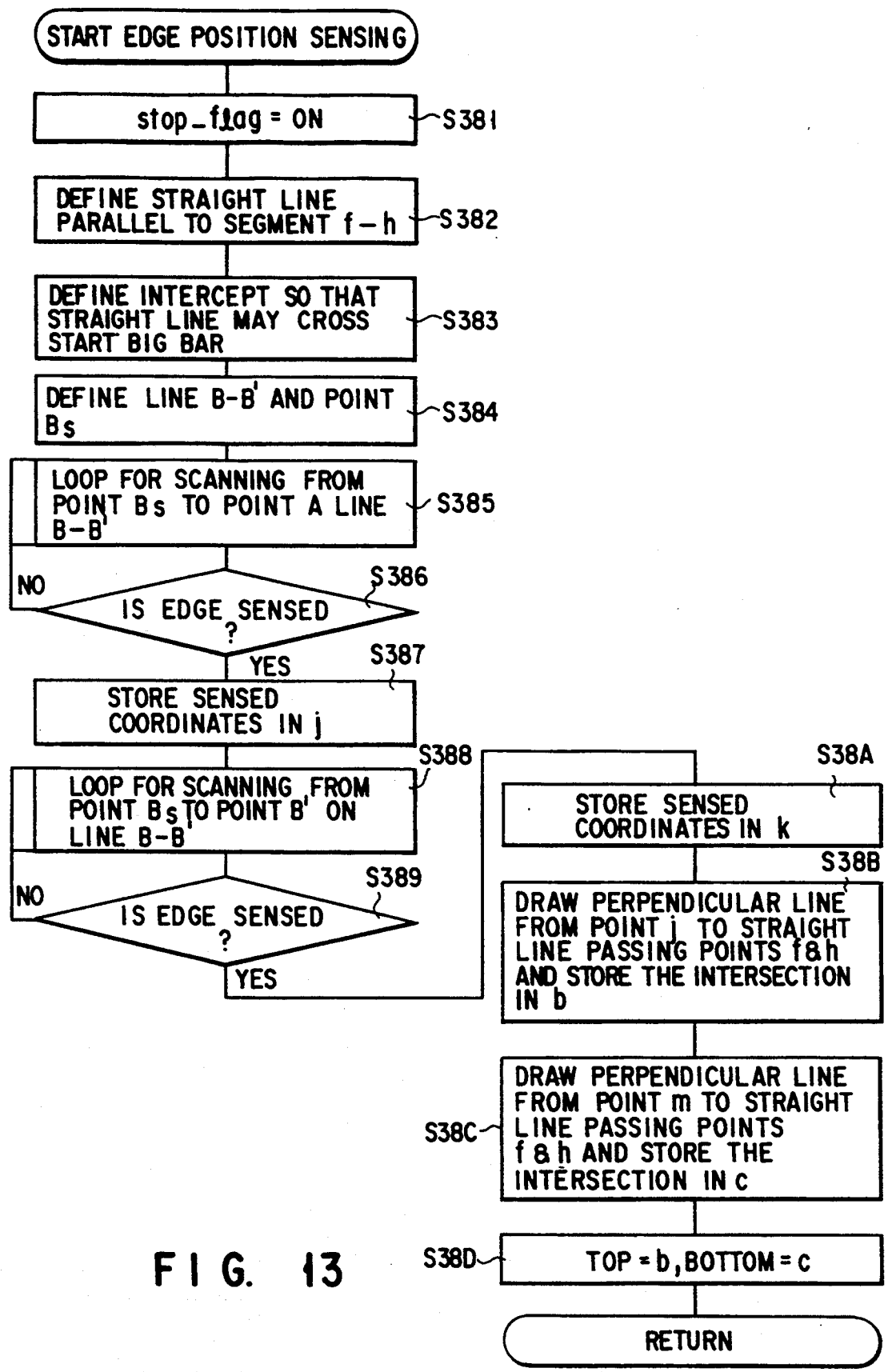
FIG. 13 is a flowchart for illustrating the stop edge position sensing routine in FIG. 7.

The stop edge position sensing routine called in step S38 in the label sensing routine is executed in almost the same manner as the start edge position sensing routine. FIG. 13 is a flowchart for the stop edge position sensing routine.

First, the stop sensing flag "stop_" is turned on (step S381) and an equation for a straight line parallel to segment f-h is defined: for example, $y = ax + b$ is defined as an equation for segment f-h (step S382). Next, the intercept b is defined so that the straight line may cross the stop big bar 23A (step S383). After a line crossing the stop big bar 23A has been obtained, the intersections of the line and the equation defining the screen are defined as B and B' (see FIG. 8). Then, a perpendicular line is drawn from the mid-point of coordinates f and h to line B-B' and the intersection is defined as B s (step S384).

Then, the image data is examined sequentially, starting at point $B_s$ to point B on line B-B' (step S385) to check to see if there is an edge (step S386). When an edge is sensed this way, the sensed coordinates are stored in a coordinate variable j (step S387), i.e., the sensed coordinates are defined as point j.

Next, the image data is examined sequentially, starting this at point $B_s$ to point B' on line B-B' (step S388) to check to see if there is an edge (step S389). When an edge is sensed this way, the sensed coordinates are stored in a coordinate variable k (step S38A), i.e., the sensed coordinates are defined as point k.

Following, a perpendicular line is drawn from point j indicated by the coordinate variable j to the line passing points f and h indicated by the coordinate variables f and h, and the coordinates of the intersection are stored in the coordinate variable b (step S38B). That is, an equation for a straight line meeting at right angles with line B-B' passing point j is determined, and the intersection of this line and the line passing points f and h is obtained. The intersection is then defined as point b.

Similarly, a perpendicular line is drawn from point k indicated by the coordinate variable k to the line passing points f and h indicated by the coordinate variables f and h, and the coordinates of the intersection are stored in a coordinate variable c (step S38C). That is, an equation for a straight line meeting at right angles with line B-B' passing point k is determined, and the intersection of this line and the line passing points f and h is determined. The inter section is then defined as point c.

After the value of the coordinate variable b thus obtained is stored in the coordinate variable TOP and the value of the coordinate variable c is stored in the coordinate variable BOTTOM (step S38D), control is returned to a higher-level routine.

Figure 9:
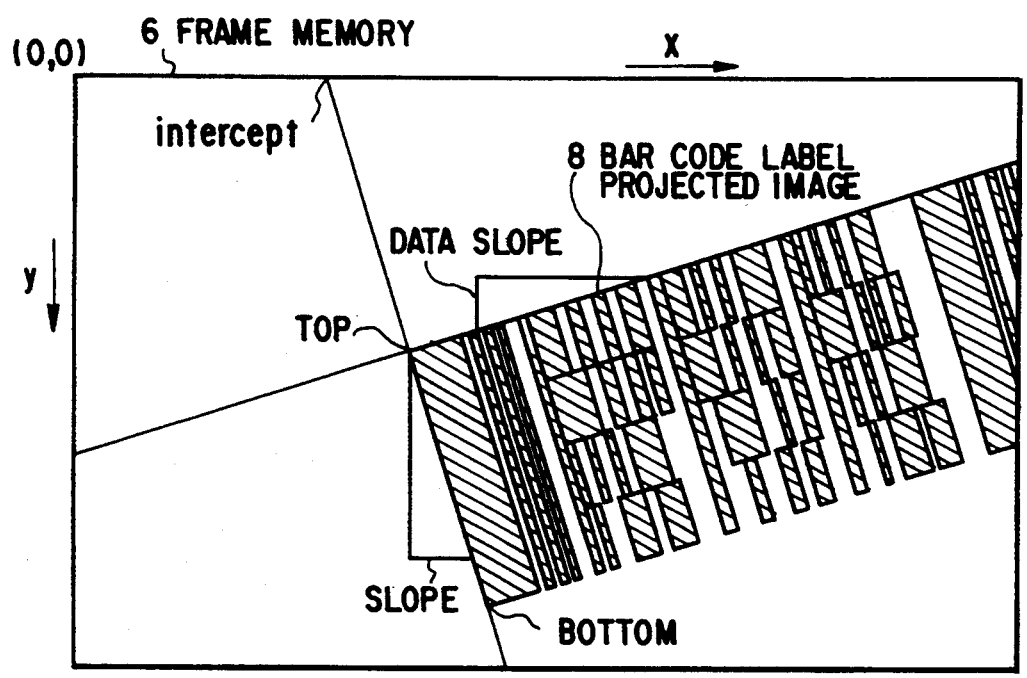
Figure 14:
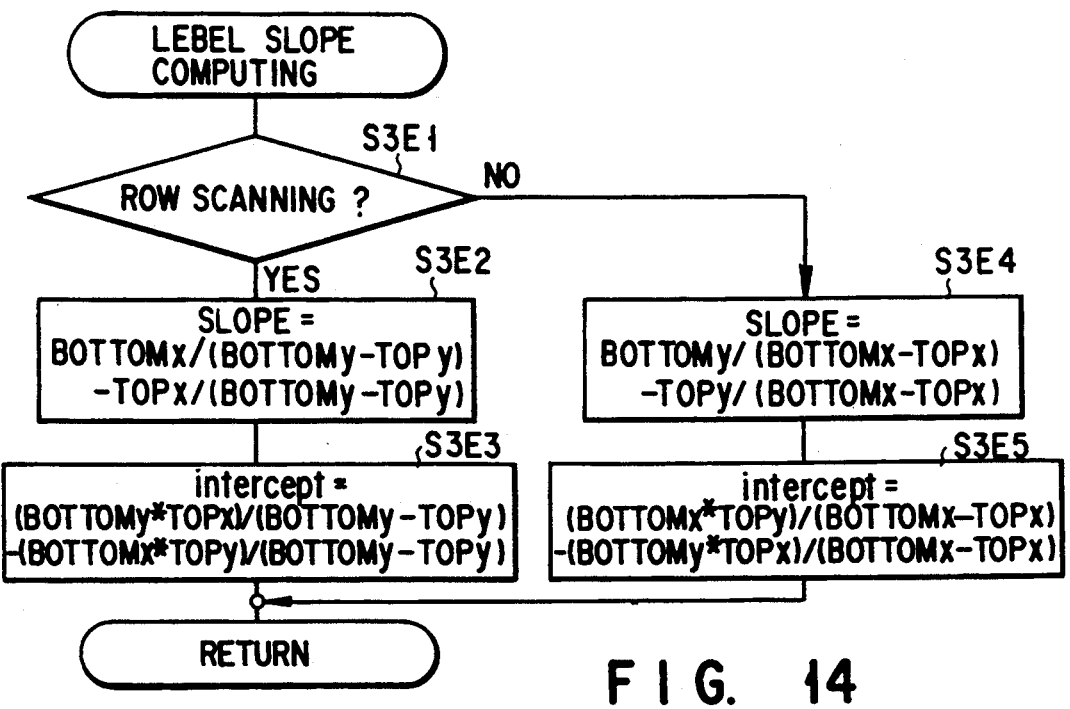
FIG. 14 is a flowchart for illustrating the routine for finding the slope of the label in FIG. 7.

The label slope computing routine called in step S3E in the label sensing routine will now be described with reference to the flowchart of FIG. 14 and the explanatory diagram of FIG. 9 for obtaining the slope of the label in row scanning. FIG. 9 shows a bar code label having a 4×1 label matrix (the number of codes is therefore 4) when the start code 22 is selected as a reference in row scanning.

First, it is judged whether row scanning or column scanning is performed (step S3E1). If row scanning is performed, control goes to step S3E2. If column scanning is performed, control proceeds to step S3E4.

If row scanning is performed, the x-coordinate value of the coordinate variable BOTTOM is divided by the result of subtracting the y-coordinate value of the coordinate variable TOP from the y-coordinate value of the coordinate variable BOTTOM, and the x-coordinate value of the coordinate variable TOP is divided by the result of subtracting the y-coordinate value of the coordinate variable TOP from the y-coordinate value of the coordinate variable BOTTOM, and then the difference between these two quotients is stored in the slope variable SLOPE (step S3E2). Next, the result of multiplying y-coordinate of the coordinate variable BOTTOM by x-coordinate of the coordinate variable TOP is divided by the result of subtracting the y-coordinate value of the coordinate variable TOP from the y-coordinate value of the coordinate variable BOTTOM, and the result of multiplying x-coordinate of the coordinate variable BOTTOM by y-coordinate of the coordinate variable TOP is divided by the result of subtracting the y-coordinate value of the coordinate variable TOP from the y-coordinate value of the coordinate variable BOTTOM. Then, the difference of these two quotients is stored in an intercept variable "intercept" (step S3E3). In FIG. 14, the superscript asterisk (*) means multiplication sign ×.

If column scanning is performed, the y-coordinate value of the coordinate variable BOTTOM is divided by the result of subtracting the x-coordinate value of the coordinate variable TOP from the x-coordinate value of the coordinate variable BOTTOM, and the y-coordinate value of the coordinate variable TOP is divided by the result of subtracting the x-coordinate value of the coordinate variable TOP from the x-coordinate value of the coordinate variable BOTTOM, and then the difference between these two quotients is stored in the slope variable SLOPE (step S3E4). Next, the result of multiplying x-coordinate of the coordinate variable BOTTOM by y-coordinate of the coordinate variable TOP is divided by the result of subtracting the x-coordinate value of the coordinate variable TOP from the x-coordinate value of the coordinate variable BOTTOM, and the result of multiplying y-coordinate of the coordinate variable BOTTOM by x-coordinate of the coordinate variable TOP is divided by the result of subtracting the x-coordinate value of the coordinate variable TOP from the x-coordinate value of the coordinate variable BOTTOM. Then, the difference of these two quotients is stored in the intercept variable "intercept" (step S3E5).

Figure 15:
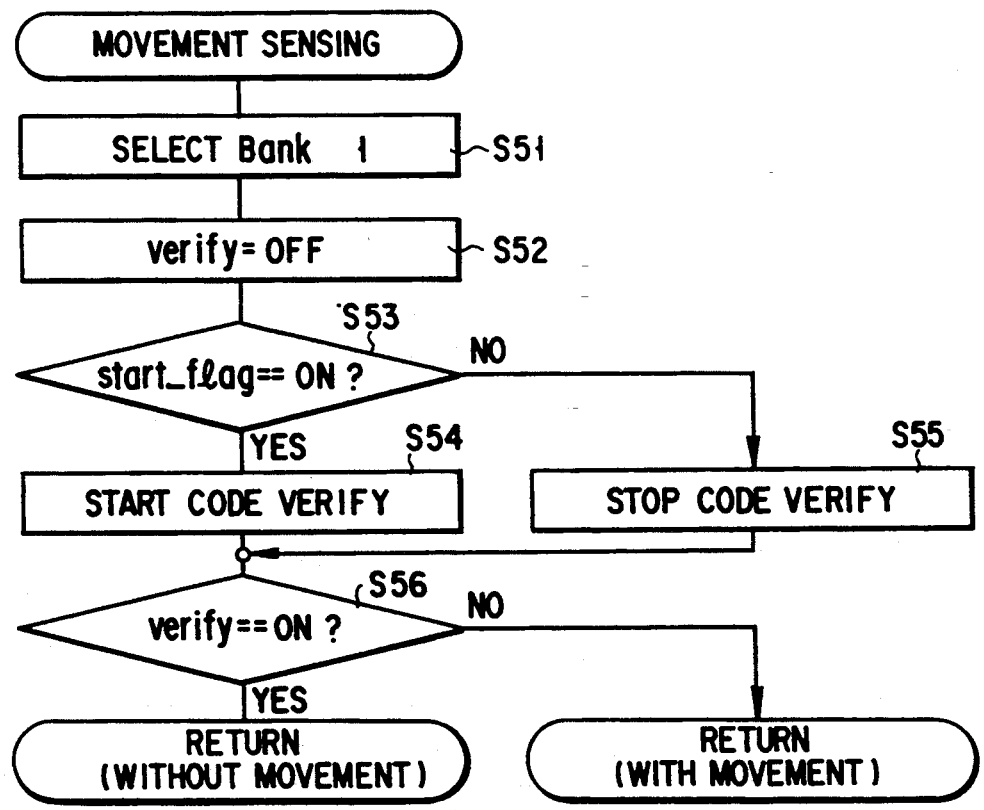
FIG. 15 is a flowchart for illustrating the movement sensing routine in FIG. 4.

The movement sensing routine called in step S5 will now be described with reference to the flowchart of FIG. 15.

This time, Bank1 6B of the frame memory 6 is selected for the image information to be processed (step S51), and an image movement sensing flag "verify" is initialized to the off state (step S52). Then, it is judged whether the start sensing flag "start_flag" is on or not (step S53). If it is on, a start code verify routine (explained later in detail) is called (step S54) to verify the start code 22. If it is off, a stop code verifying routine explained later is called (step S55) to verify the stop code 23. Then, by determining whether the image movement sensing flag "verify" is on or not (step S56), the verify result is judged. If the image movement sensing flag "verify" is on, control returns with the information that no sensing movement has occurred, and if "verify" is off, control returns with the information that a movement has occurred.

Figure 16B:
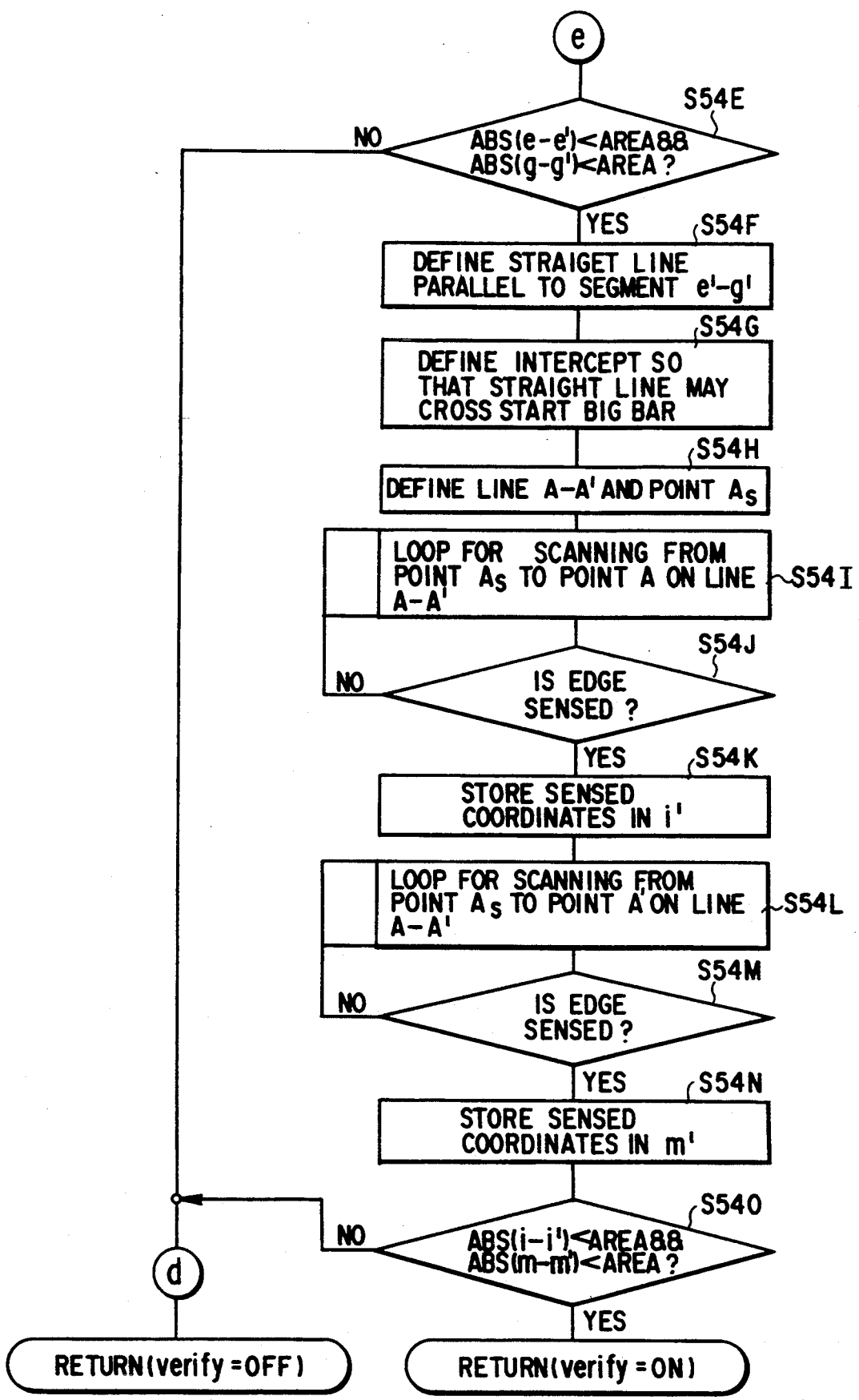

The start code verify routine called in step S54 in the movement sensing routine will now be described with reference to the flowcharts of FIG. 16A and 16B. In the figure, the coordinate marked with (') indicates the position sensed in image 1 (Bank1 6B). Specifically, the coordinates of e are assumed to be obtained by the label sensing routine called in step S3. They are the coordinates at which the start code 22 sensed in image 0 (Bank0 6A) is found for the first time. On the other hand, the coordinates of e' are obtained by scanning image 1 (Bank1 6B) under the same conditions (the scanning direction and scanning position) as the case of finding the coordinates of e. Therefore, if there is no label movement between image 0 and image 1, then the coordinates of e and e' will be the same. If the value of image movement error range AREA is set to, e.g. 2, it will be judged that the image has not moved, provided that the difference in the coordinates of e between images is within ±1 pixel in the x- and y-directions.

Next, it is judged whether row scanning or column scanning is performed (step S541). If row scanning is performed, control goes to step S542, and if column scanning is performed, control proceeds to step S548.

If row scanning is performed, the image data on the line indicated by the y-coordinate value of the coordinate variable e sensed in Bank0 6A is first taken in from Bank1 6B (step S542), and then it is judged whether or not the start code 22 is sensed (step S543). If the start code is not sensed, control returns to a higher-level routine, carrying the information on image movement sensing flag "verify"=OFF. If the start code 22 is sensed, the sensed coordinates are stored in the coordinate variable e' (step S544). Then, this time, the image data on the line indicated by the y-coordinate value of the coordinate variable g sensed in Bank0 6A is taken in from Bank1 6B (step S545), and it is judged whether or not the start code 22 is sensed (step S546). If the start code is not sensed, control returns to a higher-level routine, carrying the information on movement sensing flag "verify"=OFF. If the start code 22 is sensed, the sensed coordinates are stored in the coordinate variable g' (step S547), and then control proceeds to step S54E.

On the other hand, if column scanning is performed, the image data on the line indicated by the x-coordinate value of the coordinate variable e sensed in Bank0 6A is first taken in from Bank1 6B (step S548), and then it is judged whether or not the start code 22 is sensed (step S549). If the start code is not sensed, control returns to a higher-level routine, carrying the information on movement sensing flag "verify"=OFF. If the start code 22 is sensed, the sensed coordinates are stored in the coordinate variable e' (step S54A). Then, the image data on the line indicated by the x-coordinate value of the coordinate variable g sensed in Bank0 6A is taken in from Bank1 6B (step S54B), and it is judged whether or not the start code 22 is sensed (step S54C). If the start code is not sensed, control returns to a higher-level routine, carrying the information on movement sensing flag "verify"=OFF. If the start code 22 is sensed, the sensed coordinates are stored in the coordinate variable g' (step S54D).

The absolute value of the difference between coordinate variables e and e' and that of the difference between coordinate variables g and g' are then computed. Next, it is judged whether these absolute values are within the movement error range AREA (step S54E). If they are not within the movement error range AREA, then control returns to a higher-level routine, carrying the information on movement sensing flag "verify"=OFF.

As described above, in steps S541 through S54E, it is judged whether the coordinates e and g sensed in Bank0 6A are within the permissible error range in Bank1 6B.

If it is judged that they are within the permissible error range, an equation for a straight line parallel to segment e'-g' is defined: for example, $y=ax+b$ is defined as an equation for segment e'-g' (step S54F). Next, the intercept b is defined so that the straight line may cross the start big bar 22A (step S54G). After a line crossing the start big bar 22A has been obtained, the intersections of the line and the equation defining the screen are defined as A and A'. Then, a perpendicular line is drawn from the mid-point of the coordinates e' and g' to line A-A' and the intersection is defined as $A_s$ (step S54H).

Next, the image data is examined sequentially, starting at point $A_s$ to point A on line A-A' (step S54I) to check to see if there is an edge (step S54J). When an edge is sensed this way, the sensed coordinates are stored in a coordinate variable i' (step S54K), i.e, the sensed coordinates are defined as point i'.

The image data is again examined sequentially, starting this time at point $A_s$ to point A' on line A-A' (step S54L) to check to see if there is an edge (step S54M). When an edge is sensed this way, the sensed coordinates are stored in a coordinate variable m' (step S54N), i.e, the sensed coordinates are defined as point m'.

Then, the absolute value of the difference between the coordinate variables i and i' and that of the difference between the coordinate variables m and m' are computed. It is judged whether these absolute values are within the movement error range AREA (step S540). If they are not within the movement error range AREA, then control returns to a higher-level routine, carrying the information on movement sensing flag "verify"=OFF. If they are within the movement error range AREA, control returns to a higher-level routine, carrying the information on image movement sensing flag "verify"=ON.

As described above, in steps S54F through S540, it is judged whether or not the coordinates i and m sensed in Bank0 6A are within the permissible error range in Bank1 6B. If all are within the permissible error range, the movement flag "verify" is turned on and control is returned. If any one is outside the permissible error range, the image movement sensing flag "verify" is turned off and control is returned.

Figure 17B:
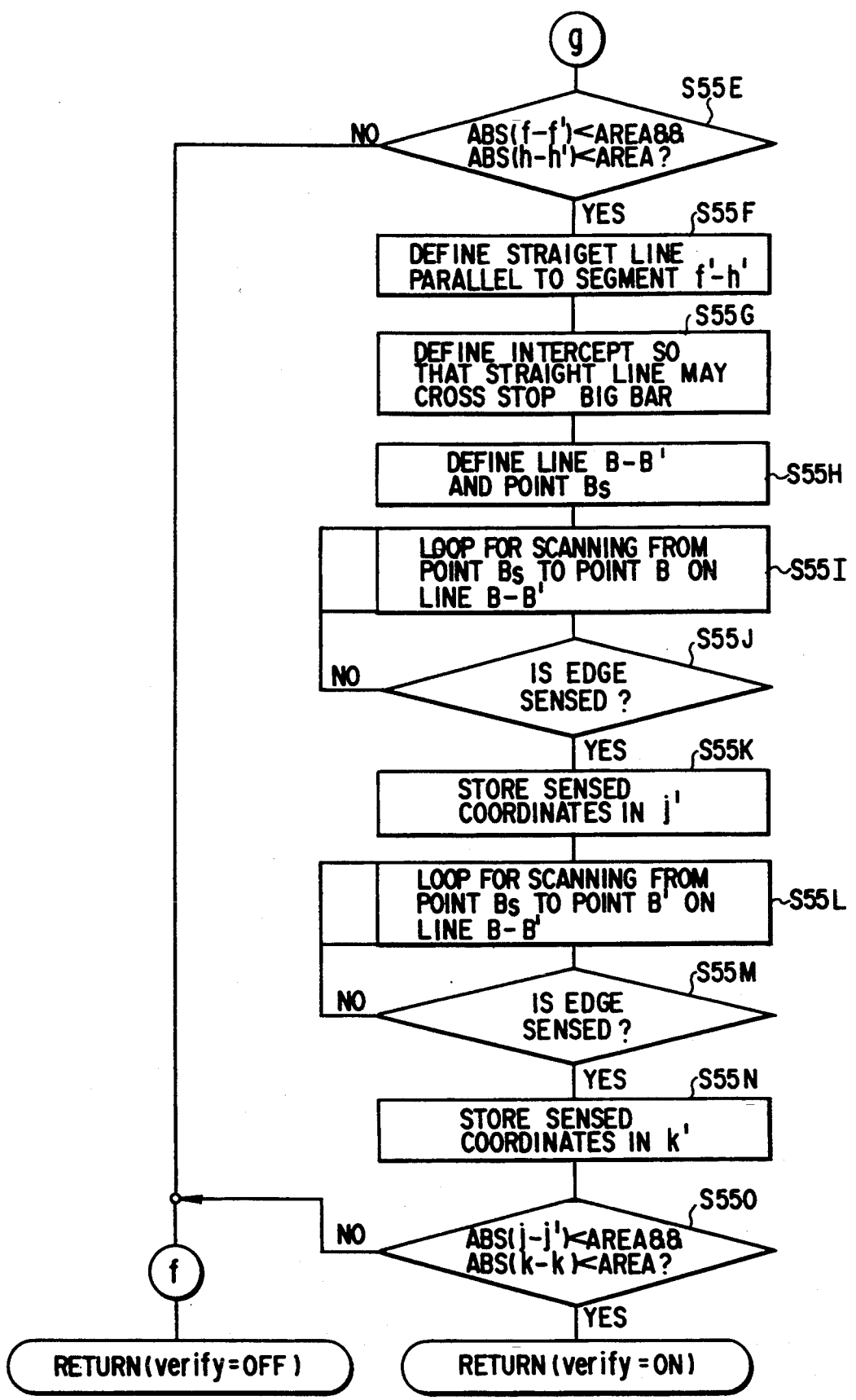

The stop code verifying routine called in step S55 in the movement sensing routine will now be described with reference to the flowchart of FIGS. 17A and 17B. This stop code verifying routine is almost the same as the start code verifying routine.

It is judged whether row scanning or column scanning is performed (step S551). If row scanning is performed, control goes to step S552, and if column scanning is performed, control proceeds to step S558.

If row scanning is performed, the image data on the line indicated by the y-coordinate value of the coordinate variable f sensed in Bank0 6A is first taken in from Bank1 6B (step S552), and then it is judged whether or not the stop code 23 is sensed (step S553). If the stop code is not sensed, control returns to a higher-level routine, carrying the information on movement sensing flag "verify"=OFF. If the stop code 23 is sensed, the sensed coordinates are stored in a coordinate variable f' (step S554). Then, this time, the image data on the line indicated by the y-coordinate value of the coordinate variable h sensed in Bank0 6A is taken in from Bank1 6B (step S555), and it is judged whether or not the stop code 23 is sensed (step S556). If the stop code is not sensed, control returns to a higher-level routine, carrying the information on image movement sensing flag "verify"=OFF. If the stop code 23 is sensed, the sensed coordinates are stored in a coordinate variable h' (step S557) and then control proceeds to step S55E.

On the other hand, if column scanning is performed, the image data on the line indicated by the x-coordinate value of the coordinate variable f sensed in Bank0 6A is first taken in from Bank1 6B (step S558), and then it is judged whether or not the stop code 23 is sensed (step S559). If the stop code is not sensed, control returns to a higher-level routine, carrying the information on movement sensing flag "verify"=OFF. If the stop code 23 is sensed, the sensed coordinates are stored in the coordinate variable f' (step S55A). Then, the image data on the line indicated by the x-coordinate value of the coordinate variable h sensed in Bank0 6A is taken in from Bank1 6B (step S55B), and it is judged whether or not the stop code 23 is sensed (step S55C). If the stop code is not sensed, control returns to a higher-level routine, carrying the information on image movement sensing flag "verify"=OFF. If the stop code 23 is sensed, the sensed coordinates are stored in the coordinate variable h' (step S55D).

Then, the absolute value of the difference between the coordinate variables f and f' and that of the difference between the coordinate variables h and h' are computed. It is judged whether or not these absolute values are within the movement error range AREA (step S55E). If they are not within the movement error range AREA, then control returns to a higher-level routine, carrying the information on movement sensing flag "verify"=OFF.

If it is judged that they are within the permissible error range, an equation for a straight line parallel to segment f'-h' is defined: for example, $y=ax+b$ is defined as an equation for segment f'-h' (step S55F). Next, the intercept b is defined so that the straight line may cross the stop big bar 23A (step S55G). After a line crossing the start big bar 23A has been obtained, the intersections of the line and the equation defining the screen are defined as B and B'. Then, a perpendicular line is drawn from the mid-point of the coordinates f' and h' to line B-B' and the intersection is defined as $B_s$ (step S55H).

Next, the image information is examined sequentially, starting at point $B_s$ to point B on line B-B' (step S55I) to check to see if there is an edge (step S55J). When an edge is sensed this way, the second coordinates are stored in a coordinate variable j' (step S55K), i.e., the sensed coordinates are defined as point j'.

The image data is again examined sequentially, starting this time at point $B_s$ to point B' on line B-B' (step S55L) to check to see if there is an edge (step S55M). When an edge is sensed this way, the sensed coordinates are stored in a coordinate variable k' (step S55N), i.e, the sensed coordinates are defined as point k'.

Then, the absolute value of the difference between the coordinate variables j and j' and that of the difference between the coordinate variables k and k' are computed. It is judged whether or not these absolute values are within the movement error range AREA (step S550). If they are not within the movement error range AREA, control returns to a higher-level routine, carrying the information on movement sensing flag "verify"=OFF. If they are within the movement error range AREA, control returns to a higher-level routine, carrying the information on movement sensing flag "verify"=ON.

Figure 18:
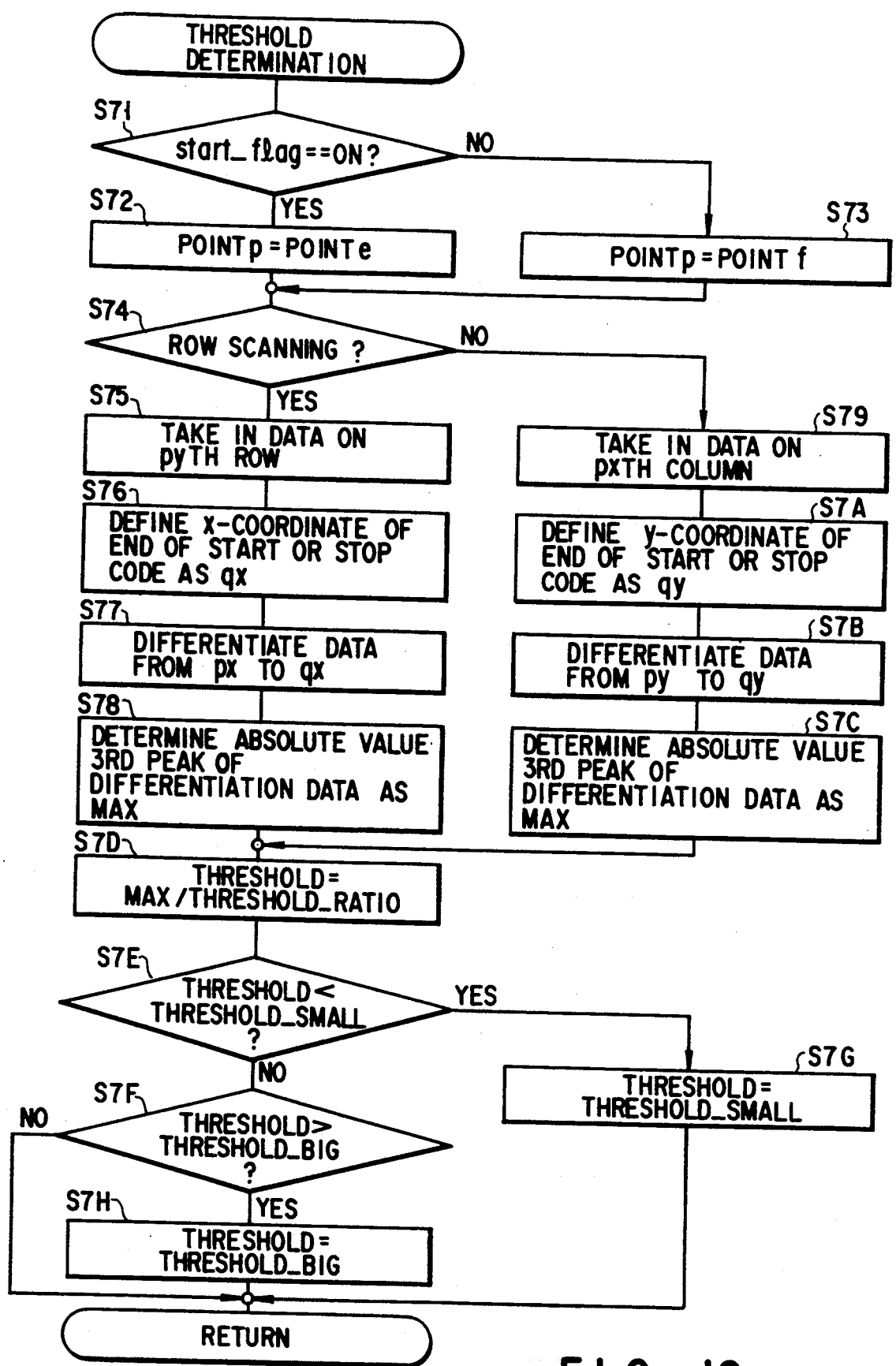
FIG. 18 is a flowchart for illustrating the threshold determining routine in FIG. 4.

The threshold determining routine called in step S7 will now be described with reference to the flowchart of FIG. 18 and the diagrams of FIGS. 19 and 20 for describing the calculation of the threshold.

It is judged whether or not the start sensing flag "start_flag" is ON, i.e., whether the start code 22 or stop code 23 has been selected as a code to be processed in the label sensing routine called in step S3 (step S71). If the start code 22 is selected, the value of point e is substituted into point p (step S72). If the stop code 23 is selected, the value of point f is substituted into point p (step S73). That is, the coordinates of the start point of the data sequence for determining the threshold value are stored in the coordinate variable p. Hence, the coordinates of the start point in the case of, e.g. the start code 22, are determined as shown in FIG. 19.

Next, it is judged whether row scanning or column scanning is performed (step S74). If row scanning is performed, control goes to step S75. If column scanning is performed, control goes to step S79. Specifically, in step S74, it is judged whether row scanning is performed or not, i.e. whether the direction in which the coordinate variables e, f, g, and h were searched, has been found. If row scanning is performed, the processing in steps S75 to S78 is carried out. If column scanning is performed, the processing in steps S79 to S7C is executed.

Figure 19:
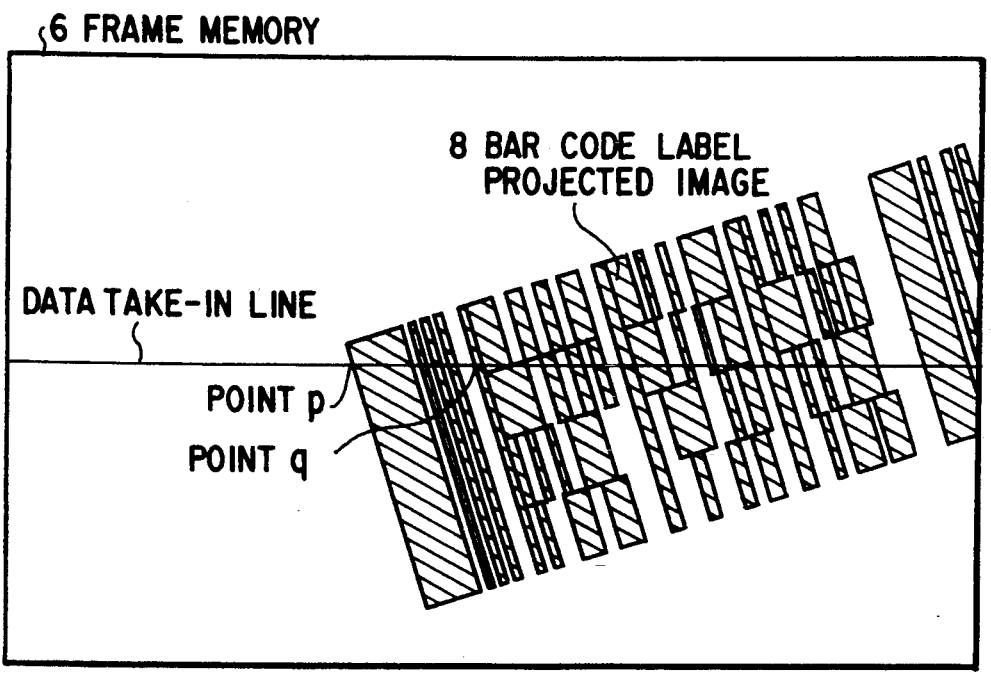
Figure 20:
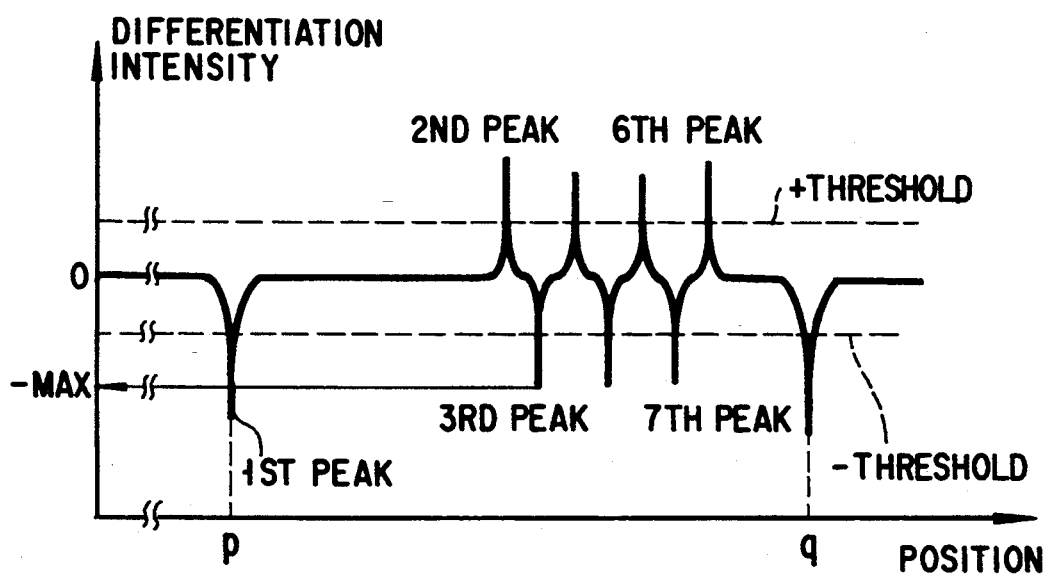
FIG. 20 is a differential waveform of a start code.

Specifically, if row scanning is performed, the data on the line indicated by the y-coordinate value of the coordinate variable p, i.e. the data on the data take-in line as shown in FIG. 19, is taken in from Bank0 6A of the frame memory 6 (step S75), and the x-coordinate of the end of the start code 22 or stop code 23 is defined as the x-coordinate of point q (step S76). Then, the data from point p to point q is differentiated (step S77). Thus, for example, in the case of the data take-in line shown in FIG. 19, a differential waveform of the start code 22, as shown in FIG. 20, is obtained. The absolute value of the third peak of the differentiated data is defined as variable MAX (step S78).

On the other hand, if column scanning is performed, the data on the line indicated by the x-coordinate value of the coordinate variable p is taken in from Bank0 6A of the frame memory 6 (step S79), and the y-coordinate of the end of the start code 22 or stop code 23 is defined as the y-coordinate of point q (step S7A). Then, the data from point p to point q is differentiated (step S7B). Thus, the absolute value of the third peak of the differentiated data is defined as a variable MAX (step S7C).

The reason why the third peak of differentiated data is observed is as follows. It is theoretically desirable to determine the threshold at a point with the lowest contrast (i.e. with the lowest differential peak of an edge) within a bar code area. Thus, the third edge of the start code or stop code, at which the distance between the bar and space of the label is the narrowest, is selected. Stable decoding is, therefore, possible, irrespective of the label size or label illumination condition.

The value of the variable MAX thus obtained is divided by a constant THRESHOLD_RATIO, and the resultant value is substituted into a threshold variable THRESHOLD (step S7D). In other words, a threshold is temporarily obtained from the obtained data. The constant THRESHOLD_RATIO is a value by which the peak value is divided to obtain a threshold, and it is normally 2 or 3.

The temporarily obtained threshold THRESHOLD is judged whether or not it is greater than a minimum threshold constant THRESHOLD_SMALL (step S7E) and whether or not it is less than a maximum threshold constant THRESHOLD_BIG (step S7F). That is, it is determined whether the temporarily obtained threshold is acceptable. If it is greater than THRESHOLD_BIG, the maximum value indicated by THRESHOLD_BIG is substituted into the threshold variable THRESHOLD, i.e., the threshold is set at the maximum value (step S7H). If the temporarily obtained threshold is less than THRESHOLD_SMALL, the minimum value represented by THRESHOLD_SMALL is substituted into the threshold variable THRESHOLD, i.e., the threshold is set at the minimum value.

Figure 21:
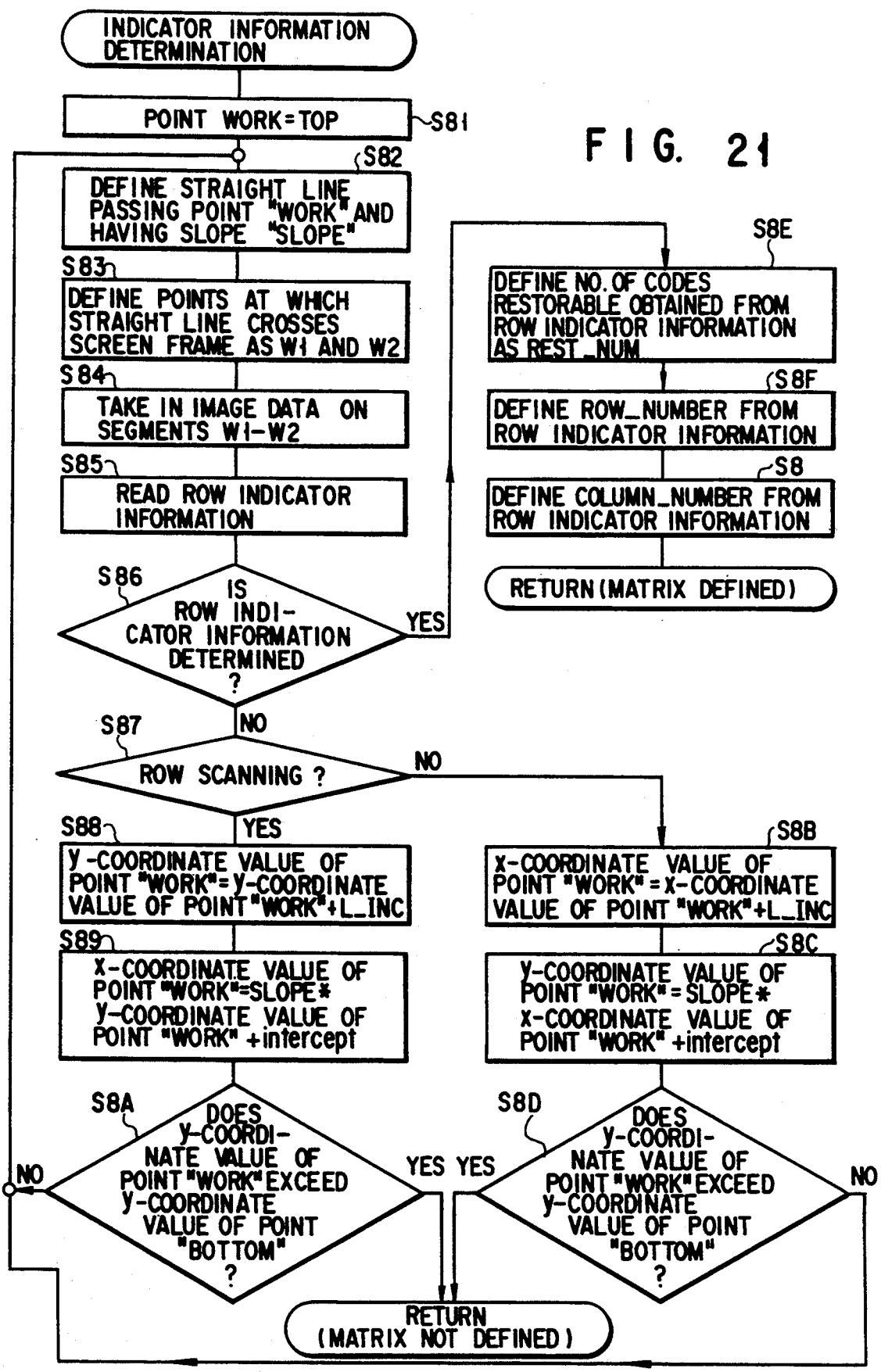
FIG. 21 is a flowchart for illustrating the indicator information determining routine in FIG. 4.

The indicator information determining routine called in step S8 will now be described with reference to the flowchart of FIG. 21 and the view shown in FIG. 22 of an image projected onto the frame memory 6. FIG. 22 shows a bar code label having a 4×1 label matrix (the number of codes is therefore 4) when the start code 22 is selected as a reference in row scanning.

The value of label top coordinates TOP is stored in a coordinate variable WORK as a start point of reference coordinates for reading row indicator information (step S81). A straight line 1 passing the coordinate variable WORK and having a slope specified by the label slope variable SLOPE is defined (step S82), and the points at which the line crosses the screen frame are defined as W1 and W2 (step S83). The image data on segment W1-W2 is taken in (step S84) and the row indicator information contained therein is read (step S85).

The row indicator information is read as follows. An edge is sensed from the image data on the line obtained in step S84, i.e., the monochromatic pixel value, and the edge is converted to width information. On the basis of the width information, the start code 22 is sensed. Since it is known that the code next to the start code 22 is the row indicator 21A, the row indicator 21A, the row indicator 21A is taken in. Similarly, the stop code 23 is sensed. Since it is known that the code just before the stop code 23 is the row indicator 21A, the row indicator 21A is read. Once the row indicator 21A has been read, it is compared with the bar code table (not shown) and a portion coinciding with the table is converted to codes, i.e., information on the number of rows, the number of columns, the security level, etc. There are several methods of converting to width information, for example, by calling a conversion-to-width-information routine described later in detail.

Next, a check is made to see if the row indicator information has been determined (step S86). If it has been determined, control goes to step SSE. If it has not been determined, control goes to step S87. In this context, "determined" means that the row indicator 21A is read several times and the reliability of information is enhanced sufficiently. For example, when the information (the number of row, the number of column, the security level) written in the row indicator 21A has been read ten times, and the same information is obtained in all ten times, the row indicator information has been "determined."

If the row indicator information has not been determined, it is judged whether row scanning or column scanning is performed (step S87). If row scanning is performed, control goes to step S88, and if column scanning is performed, control goes to step S8B.

Specifically, if row scanning is performed, a predetermined increment L_INC is added to the y-coordinate value of the coordinate variable WORK, and the result is substituted into the y-coordinate value of the new coordinate variable WORK (step S88). Further, the value of the label slope variable SLOPE is multiplied by the y-coordinate value of the coordinate variable WORK, and the label intercept variable "intercept" is added to the multiplication result, and then the result is substituted into the x-coordinate value of the new coordinate variable WORK (step S89). In this way, the reference coordinates for new scanning are reset in the coordinate variable WORK. Then, it is judged whether the y-coordinate value of the reset coordinate variable WORK has exceeded the y-coordinate value of the label bottom coordinate variable BOTTOM, i.e., whether the former is within the label area (step S8A). If it is within the label area, the processing is repeated from step S82. If it is not within the label area, control returns to a higher-level routine, carrying the information that a matrix is not defined.

Similarly, if column scanning is performed, a predetermined increment $L_{13}$ INC is added to the x-coordinate value of the coordinate variable WORK, and the result is substituted into the x-coordinate value of the new coordinate variable WORK (step S8B). Further, the value of the label slope variable SLOPE is multiplied by the x-coordinate value of the coordinate variable WORK, and the label intercept variable "intercept" is added to the multiplication result, and then the addition result is substituted into the y-coordinate value of the new coordinate variable WORK (step S8C). In this way, the reference coordinates for new scanning are reset in the coordinate variable WORK. Then, it is judged whether the y-coordinate value of the reset coordinate variable WORK has exceeded the y-coordinate value of the label bottom coordinate variable BOTTOM, i.e., whether the former is within the label area (step S8D). If it is within the label area, the processing is repeated from step S82. If it is not within the label area, control returns to a higher-level routine, carrying the information that a matrix is not defined.

If it is judged that row indicator 21A is determined in step S86, the number of codes restorable is computed from the security level obtained from the row indicator information, and the computation result is stored in REST_NUM (step S8E). Further, the number of rows in the label obtained from the row indicator information is stored in a number-of-rows value ROW_NUMBER (step S8F). Then, the number of columns in the label is extracted from the row indicator information and stored in a number-of-columns variable COLUMN_NUMBR (step S8G). After this, control returns to a higher-level routine, carrying the information that a matrix is defined.

Figure 23A:
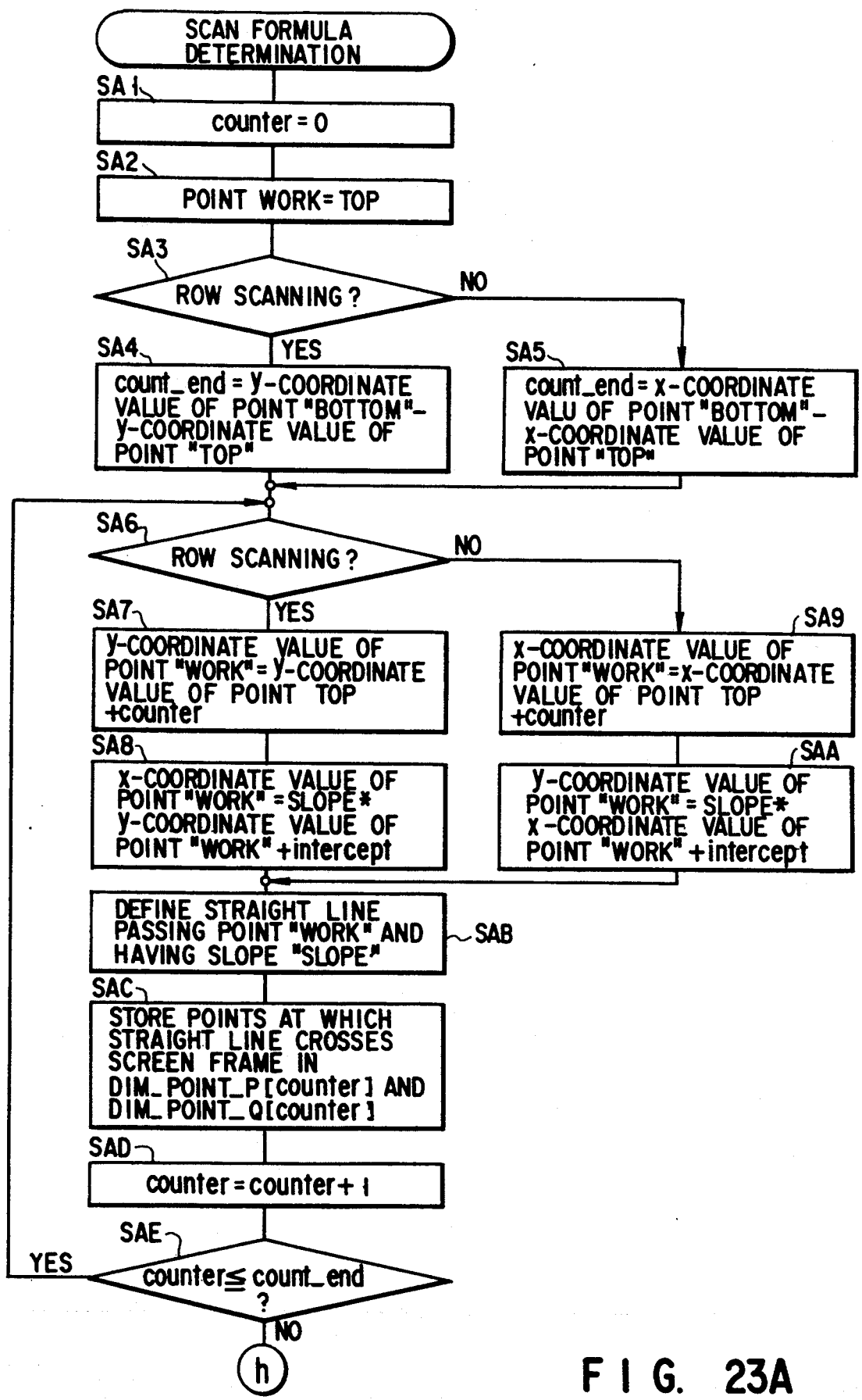
FIG. 23A and FIG. 23B are flowcharts for illustrating the scan formula determining routine in FIG. 4.
Figure 23B:
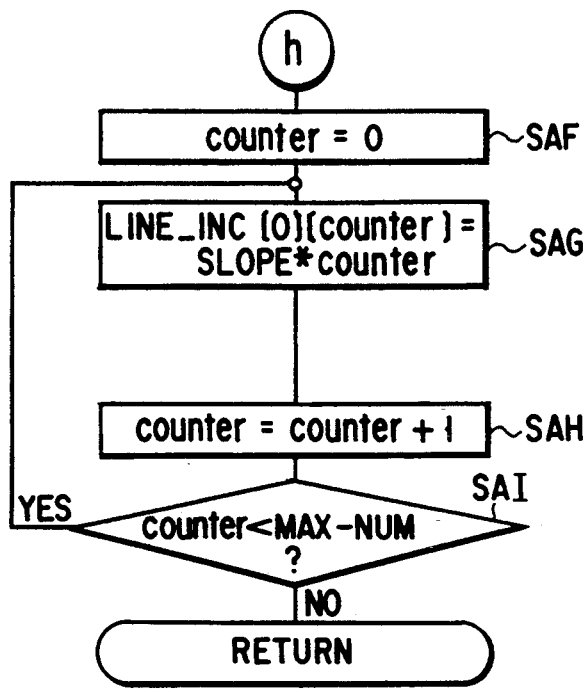

The scan formula determining routine called in step SA will now be described with reference to the flowcharts of FIGS. 23A and 23B and the view shown in FIG. 24 of an image projected onto the frame memory. FIG. 24 shows a bar code label having a 4×1 label matrix (the number of codes is therefore 4) when the start code 22 is selected as a reference in row scanning.

Specifically, the variable "counter" is initialized to 0 (step SA1) and the reference coordinate variable WORK is initialized to the value of the label top coordinate variable TOP (step SA2).

It is judged whether row scanning or column scanning is performed (step SA3). If row scanning is performed, the difference between the y-coordinate value of the label bottom coordinate variable BOTTOM and the y-coordinate value of the label top coordinate variable TOP is substituted into a variable "count_end" (step SA4). That is, the number of patterns to be determined (i.e., the number of pixels in the column direction of the label in FIG. 24) is computed and stored in the variable "count_end." In other words, the number of patterns is used in scanning the entire label.

Similarly, if column scanning is performed, the difference between the x-coordinate value of the label bottom coordinate variable BOTTOM and the x-coordinate value of the label top coordinate variable TOP is substituted into the variable "count_end" (step SA5).

Again, it is judged whether row scanning or column scanning is performed (step SA6). If row scanning is performed, the value of a variable "counter" is added to the y-coordinate value of the label top coordinate variable TOP and the result is substituted into the y-coordinate value of the reference coordinate variable WORK (step SA7). Further, the value of the label slope variable SLOPE is multiplied by the y-coordinate value of the reference coordinate variable WORK, and the label intercept variable "intercept" is added to the multiplication result, and the addition result is substituted into the x-coordinate value of the new reference coordinate variable WORK (step SA8). In this way, the reference coordinate variable WORK is reset as the value of the variable "counter" increases.

Similarly, if column scanning is performed, the value of the variable "counter" is added to the x-coordinate value of the label top coordinate variable TOP and the result is substituted into the x-coordinate value of the reference coordinate variable WORK (step SA9). Further, the value of the label slope variable SLOPE is multiplied by the x-coordinate value of the reference coordinate variable WORK, and the label intercept variable "intercept" is added to the multiplication result, and the addition result is substituted into the y-coordinate value of the new reference coordinate variable WORK (step SAA).

Next, a straight line l passing the reset coordinate variable WORK and having a slope indicated by the label slope variable SLOPE is defined (step SAB). The two points at which the straight line l crosses the screen frame are computed and stored in the (counter)th position in each of coordinate variable arrays DIM_POINT_P and DIM_POINT_Q (the position in the array specified by the value of variable "counter") (step SAC).

Thereafter, the value of the variable "counter" is increased (step SAD) and it is judged whether the value of the reset variable "counter" has reached the necessary number, i.e., variable "counter_end" (step SAE). If the necessary number has not been reached, control returns to step SA6. If the necessary number has been reached, control goes to step SAF. By the above operation, a combination of the start and end points for sequentially scanning the label is defined.

Subsequently, the variable "counter" is initialized to 0 again (step SAF). The value of the label slope variable SLOPE is multiplied by the variable "counter", so that the increment with respect to the position of the computed label slope SLOPE is computed. The computation result is stored in a predetermined location (indicated by the variable "counter") in a variable array LINE_INC (step SAG).

Thereafter, the variable "counter" is incremented (step SAH) and it is judged whether the reset variable "counter" has reached the maximum array size constant MAX_NUM (step SAI). If it has not been reached, control returns to step SAG. If it has been reached, control returns to a higher-level routine.

By the loop in steps SAF to SAI, a slope pattern for taking in a line of label information is obtained.

A maximum array size constant MAX_NUM indicates the size of a variable determined at the time of forming a program. For example, when the size of frame memory 6 is assumed to be 640×480 pixels, the constant MAX_NUM may be about 1000.

Figure 26:
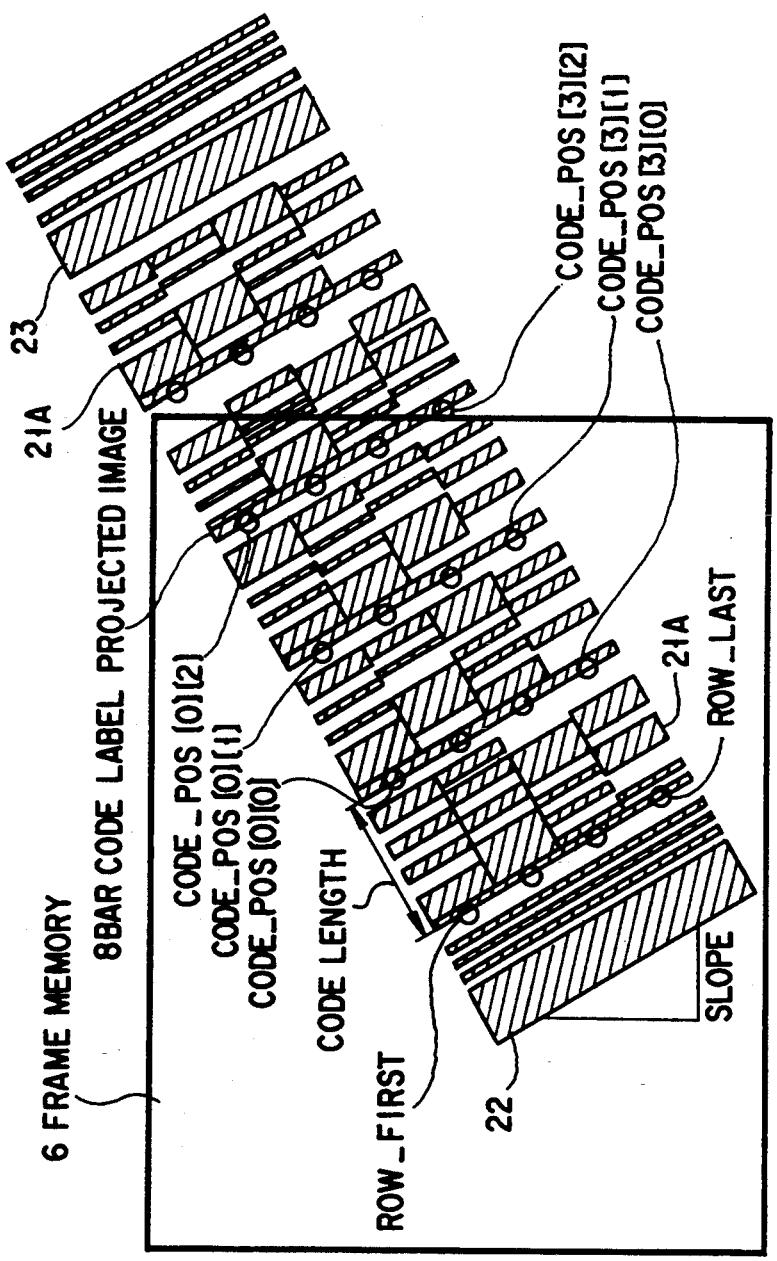
FIG. 26, for describing the embedding check routine, shows an image of a bar code projected onto a frame memory.

The embedding check routine called in step SB will be described with reference to the flowchart of FIG. 25 and the view shown in FIG. 26 of an image projected on the frame memory. FIG. 26 shows a bar code label having a 4×3 label matrix (the number of codes is therefore 12) when the start code 22 is selected as a reference in row scanning. In this context, the act of determining the data on each code in the label matrix is called "embedding", and "embedding check" means checking to see if it is possible to perform decoding while defining the embedded pattern. That is, this routine estimates the coordinate position of each code in the label and judges whether or not the number of codes appearing on the screen is within the number of codes restorable on the basis of the information on the estimated coordinate positions.

Specifically, if a ROW sensing routine (described later in detail) is called (step SB1) and the label is scanned, various information items (including the sense line number, the code length, the row number, and the sensed position) on the first and last found rows are sensed. The sensed information items are stored in variables ROW_FIRST and ROW_LAST, respectively.

Then, a check is made to see if both the variables ROW_FIRST and ROW_LAST have been determined (step SB2). If they have been determined, control goes to step SB3. If they have not been determined, it is judged that decoding is impossible and control is returned to a higher-level routine.

In this way, if it is judged that both the variables ROW_FIRST and ROW_LAST have been determined, the coordinates of the head position of each code in the code matrix are computed for estimation. The results thus obtained are stored in the position of (row number, column number) of each code in a two-dimensional array variable CODE_POS (step SB3). Here, for example, the coordinates of the head position of each code can be estimated as follows. First, the position of each row indicator 21A must be sensed. The coordinate positions of four points marked with the symbol "o" indicating the head of row indicator 21A in the direction of the start code 22 as shown in FIG. 26, are obtained normally only by interpolation using the row number of the variable ROW_FIRST and its sensed position, the row number of the variable ROW_LAST and its sensed position, and ROW_NUMBER in the matrix size. Integer multiples of the code length are calculated in the column direction extending from the four points toward the stop code 23, starting at the position of row indicator 21A at a slope of 90° rotation in the relationship between the label's slope SLOPE and the label. In this way, the coordinates of the head position (marked with the symbol "o" in FIG. 26) of each code are obtained in the order of CODS_POS [0][0], CODE_POS [0][1], CODE_POS [0][2], . . . .

Further, estimation can be made by combining suitable ones of the following data items as required: the slope of the label (SLOPE), the sensed line numbers of the rows first and last found, the code length, the row number, the sensed position, and the matrix size (ROW_NUMBER X COLUMN_NUMBER).

Next, the number of codes outside the screen among those whose coordinates are estimated in the above step is calculated and the calculation result is stored in a variable "error_num" (step SB4). Whether or not a code is outside the screen is judged on the basis of whether or not both the coordinates of the head of a code and those of the head of a subsequent code are inside the screen in the decoding direction (the column direction). It is possible that codes outside the screen cannot be decoded. In the example of FIG. 26, five codes at (row number, column number)=(0, 2), (1, 2), (2, 2), (3, 1), and (3, 2) are judged to be outside the screen, and 5 is stored in the variable "error_num".

Then, "error_num" is compared with a variable REST_NUM of the number of codes restorable obtained in step S8E. If "error_num" is equal to or smaller than REST_NUM, it is judged that decoding is possible because error correction enables decoding, and control is returned to a higher-level routine. In contrast, if "error_num" has exceeded REST_NUM, decoding can never be done, so that it is judged that decoding is impossible, and control is returned to a higher-level routine.

Since the embedding routine can estimate the position of each code and count the number of codes estimated to be outside the screen, it is possible in this stage to judge whether decoding is possible or not. This reduces the worst pattern in which decoding cannot be done even after a long time of processing.

Figure 27:
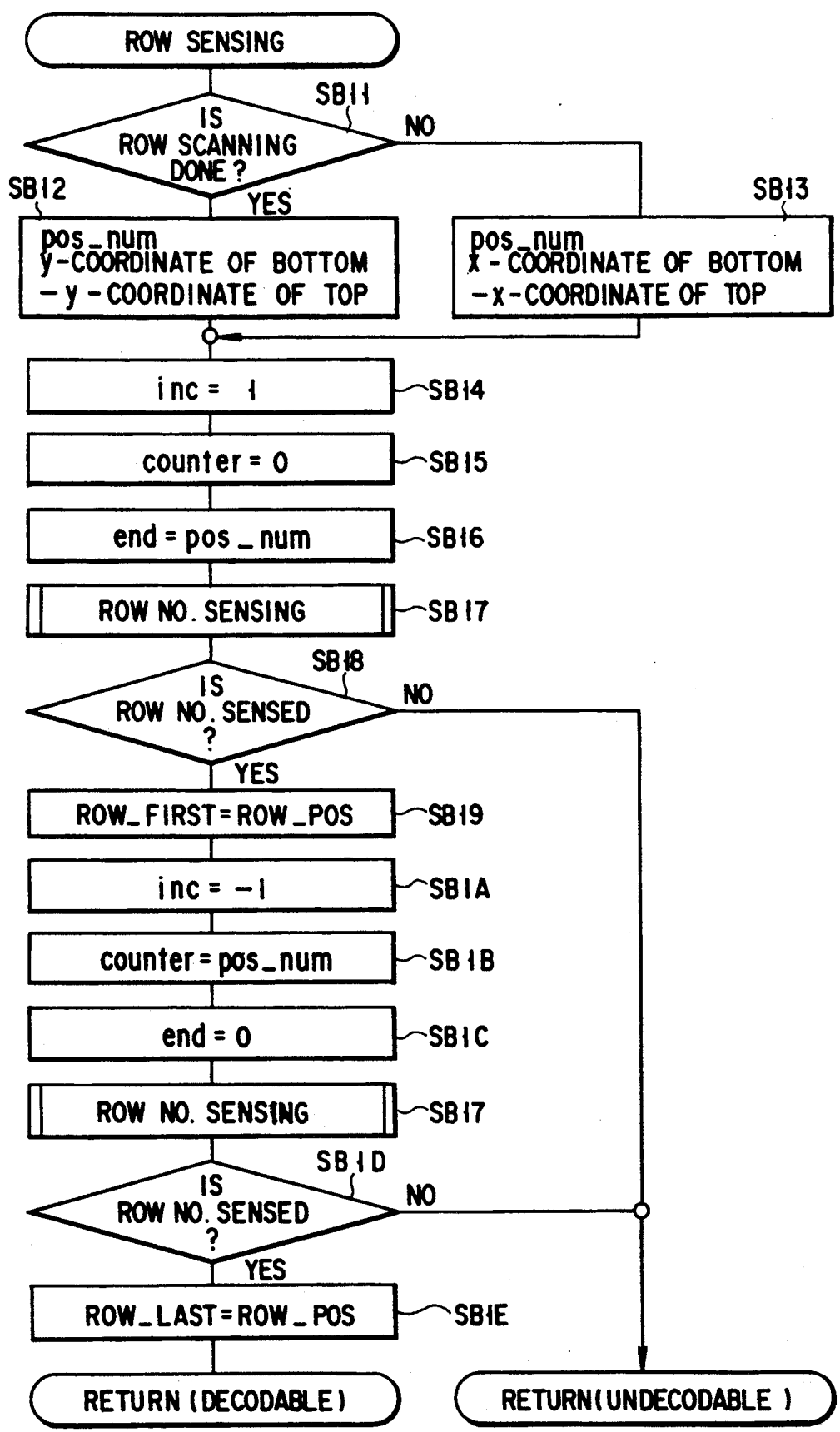
FIG. 27 is a flowchart for illustrating the ROW sensing routine in FIG. 25.

The ROW sensing routine called in step SB1 will now be described with reference to the flowchart of FIG. 27 and the view shown in FIG. 24 of an image projected on the frame memory 6. FIG. 24 shows an example of selecting the start code 22 as a reference in row scanning. For simplification, explanation is given in connection with row scanning. In the case of a mode other than row scanning, a process in step SB12 (described later) is executed in step SB13.

Specifically, if row scanning is performed (step SB11), the difference between the y-coordinate value of the label bottom coordinate variable BOTTOM and the y-coordinate value of the label top coordinate variable TOP, i.e., the number of pixels in the y-direction of the label, is computed, and the computation result is stored in a variable "pos_num" (step SB12).

Next, the value of a variable "inc" is set to 1 (step SB14) and the value of the variable "counter" is set to 0 (step S15). Further, "pos_num" obtained in step SB12 or SB13 is set to the value of variable "end" (step SB16).

Then, using each variable (the initial value "counter", the increment "inc", the end position "end") obtained in steps SB14 through SB16, a ROW number sensing routine (described later in detail) is called (step SB17). If a row number is sensed properly from the indicator information, the sensed line number, the code length, the row number, and information on the sensed position are stored in a variable ROW_POS.

Specifically, a check is made to see if the row number has been sensed properly from the indicator information in the above routine (step SB18). If it has been sensed properly, control goes to step SB19, and if not, it is judged that decoding is impossible and control is returned to a higher-level routine.

Next, in step SB19, the data ROW_POS obtained in step SB17 is stored in ROW_FIRST. Specifically, scanned lines are set one after another, starting at TOP to BOTTOM of the label in steps SB14 through SB19. The first sensed indicator position is stored in ROW_FIRST.

Further, in steps SB1A through SB1E, scanned lines are set one after another, starting at BOTTOM to TOP of the label. The first sensed indicator position is stored in ROW_LAST.

The ROW number sensing routine called in step SB17 will now be described with reference to the flowchart of FIG. 28. For simplification, explanation will be given in connection with row scanning. In the case of a mode other than row scanning, a process in step SB172 (described later) is executed in place of step SB173.

Specifically, if row scanning is performed (step SB171), the scanning start point and end point at the present value of variable "counter" are calculated from the coordinate variable arrays DIM_POINT_P and DIM_POINT_Q, and a line of image data is taken out from Bank0 6A of the frame memory 6 at an x-direction increment of 1 and a y-direction increment of the slope increment array LINE_INC. The line of image data taken out is stored in the take-in buffer array "scan_line" and the number of the data items is stored in a variable "num" (step SB172).

Then, a conversion-to-width-information routine (explained later in detail) is called (step SB174) and the taken-out data is converted into width information. On the basis of the width information, a portion agreeing with a bar code table (not shown) is converted into intermediate information, from which indicator information is extracted and then stored (step SB175). It is judged whether or not the indicator information has been read (step SB176). If the indicator information has not been read, control proceeds to step SB177, and if it has been read, control goes to step SB179.

After that, variable "counter" is reset to an increment, or the value of interval variable "inc" (step SB177). A check is made to see if the value of the reset variable "counter" exceeds a variable "end" or the label field (step SB178). If the value does not exceed the label field, control is passed to step SB171. If the value exceeds the label field, it is judged that decoding is impossible and control is returned to a higher-level routine.

On the other hand, if it is judged in step SB176 that the indicator information has been read, the sensed line number, the code length, the row number, and the sensed position at that time are stored in the variable ROW_POS (step SB179). Then, it is judged that decoding is possible and control is returned to a higher-level routine. That is, various data items on indicator 21A sensed first after this routine has been executed are stored in ROW_POS. What is obtained from the data items stored in the variable ROW_POS is only the row number; the other data items, i.e., the sensed line number, the code length, and the sensed position are calculated from each coordinate position on the frame memory 6 of the line from which the indicator information has been read.

Figure 30:
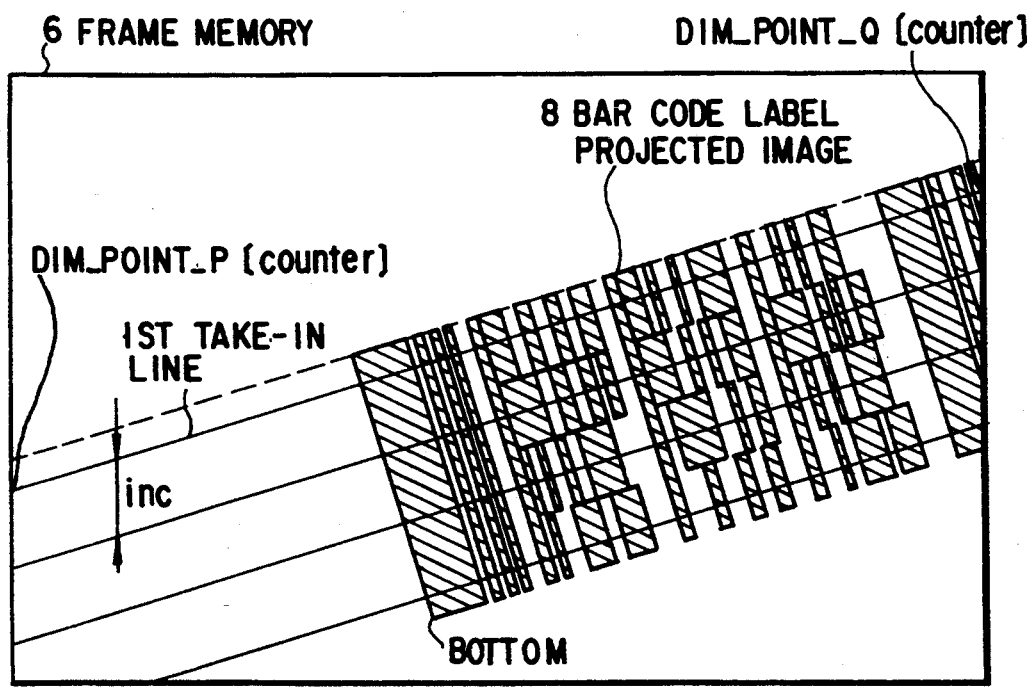
Figure 29:
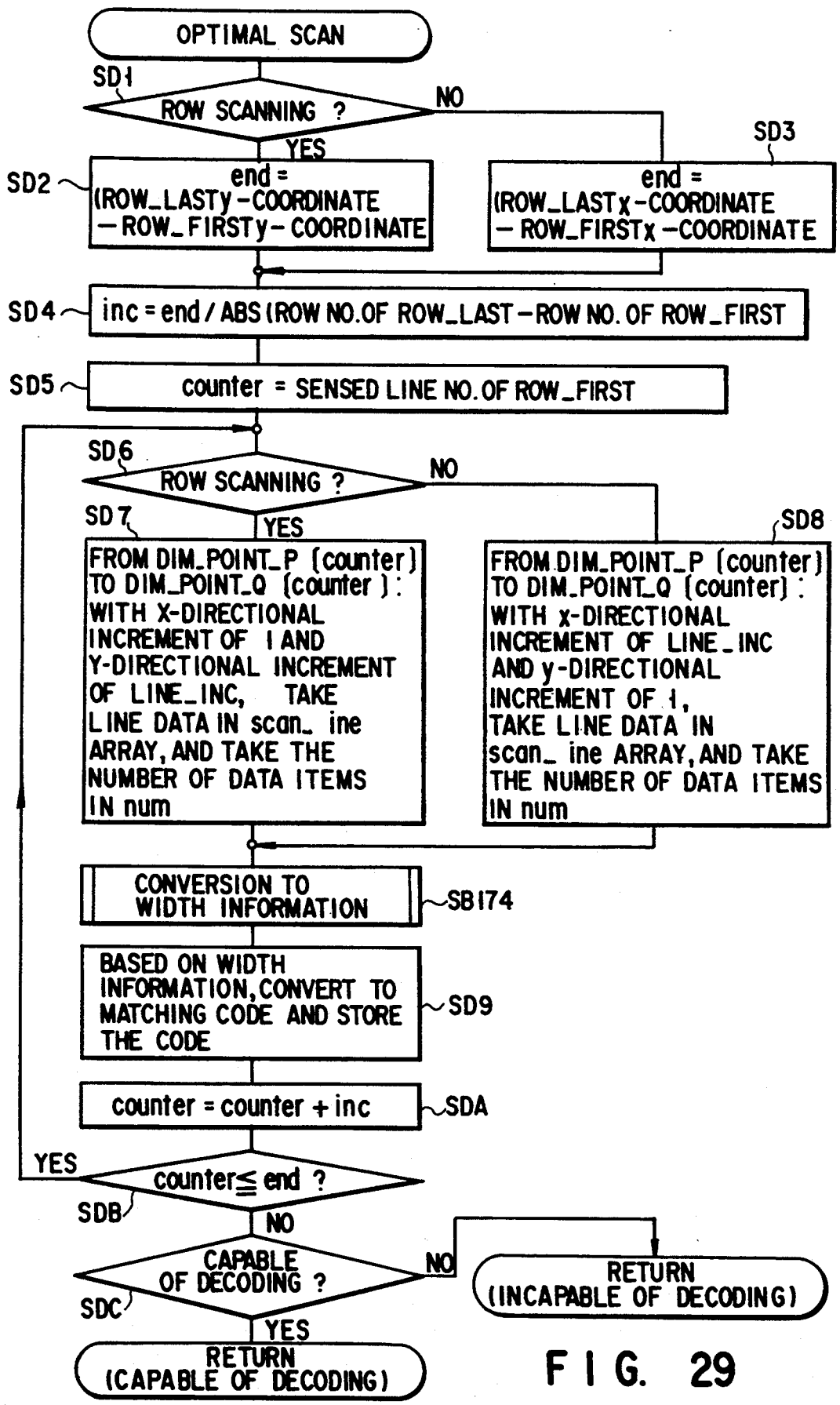
FIG. 29 is a flowchart for illustrating the optimal scanning routine in FIG. 4.

Referring to the flowchart of FIG. 29 and the view in FIG. 30 of an image projected onto the frame memory, the optimal scanning routine called in step SD will now be described. FIG. 30 shows a bar code label having a 4×1 label matrix (the number of codes is therefore 4) when the start code 22 is selected as a reference in row scanning. For simplification, explanation will be given in connection with row scanning. Thus, in the case of a mode other than row scanning, a process in step SD2 (described later) is executed in place of step SD3 and a process in step SD7 is executed in place of step SD8.

If row scanning is performed (step SD1), the difference between the y-coordinate value of the sensed position of the label's indicator information variable ROW_LAST and the y-coordinate value of the sensed position of ROW_FIRST, or the number of pixels in the y-direction of the label is computed, and the computation result is stored in the variable "end" (step SD2). Next, an interval for scanning the center of each line only once as shown in FIG. 30 is calculated by dividing the value of variable "end" by the number of row in the label (i.e., the absolute value of (row number of variable ROW_LAST)−(row number of variable ROW_FIRST)) and the calculation result is stored in the variable "inc" (step SD4). Then, the sensed line number in the variable ROW_FIRST is set to the initial value in the variable "counter" (step SD5).

If row scanning is performed (step SD6), the scanning start point and end point at the present value of the variable "counter" are calculated from the coordinate variable arrays DIM_POINT_P and DIM_POINT_Q, and a line of image data is taken out from Bank0 6A of the frame memory 6 at an x-direction increment of 1 and a y-direction increment of the slope increment array LINE_INC. The line of image data taken out is stored in the take-in buffer array "scan_line" and the number of the data items is stored in the variable "num" (step SD7).

Then, a conversion-to-width-information routine (described later in detail) is called (step SB174) and the taken-out data is converted into width information. On the basis of the width information, a portion agreeing with the bar code table (not shown) is converted into a code, which is then stored (step SD9). After that, the variable "counter" is reset to an increment or to the value of interval variable "inc" (step SDA). A check is made to see if the value of the reset variable "counter" exceeds the variable "end" or the label field (step SDB). If the value does not exceed the label field, control is passed to step SD6. If the value exceeds the label field, control is returned to the next step SDC. Specifically, a check is made to see if it is possible to completely restore the information where the stored code information is written in the label (step SDC). If the restoration is possible, control is returned to a higher-level routine, carrying the information that decoding is possible, and if the restoration is impossible, control is returned to a higher-level routine, carrying the information that decoding is impossible.

Figure 31:
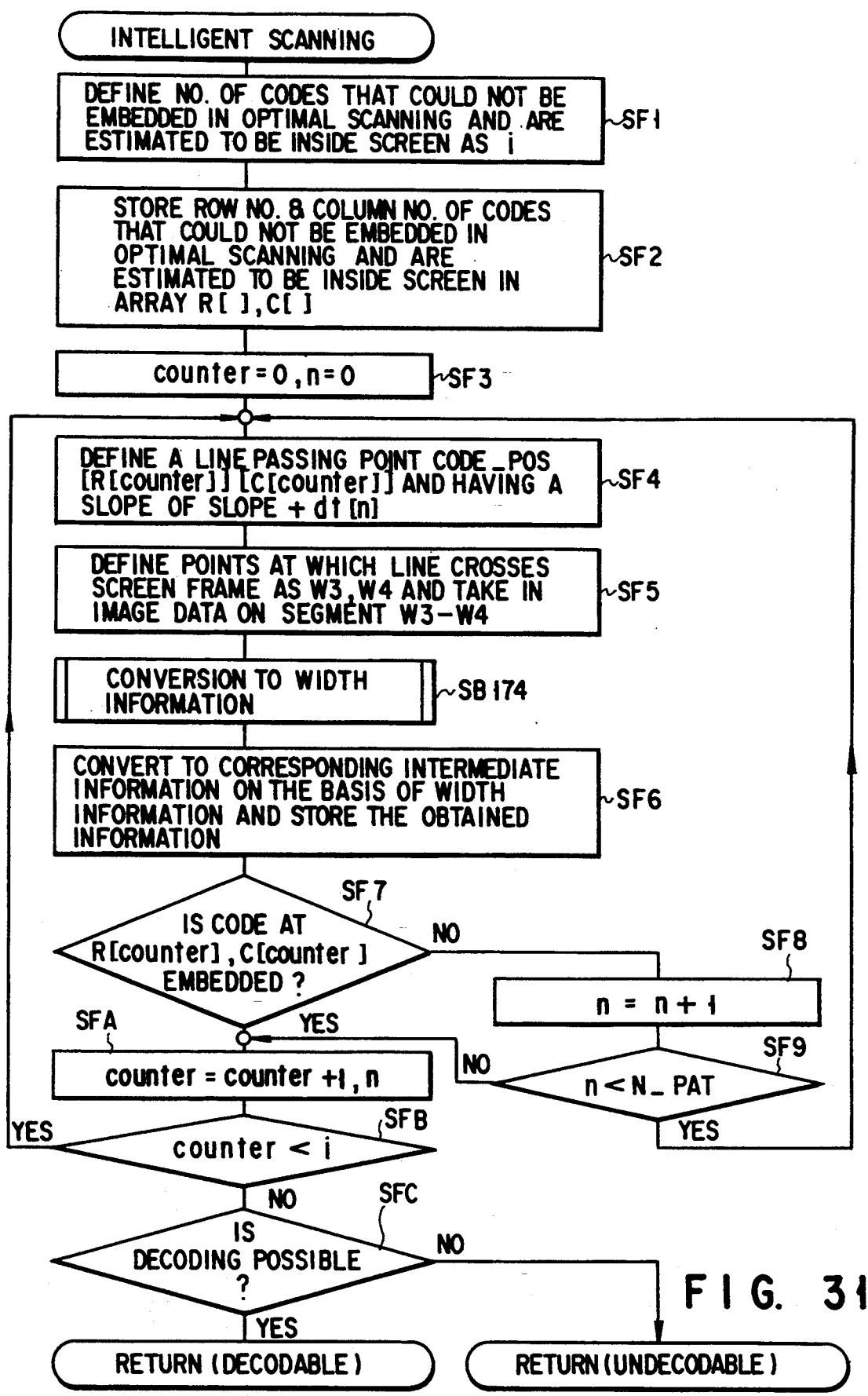
FIG. 31 is a flowchart for illustrating the intelligent scanning routine in FIG. 4.

The intelligent scanning routine called in step SF will now be described. The intelligent scanning routine scans only code positions that have not been taken in by the optimal scanning. The explanation will follow, with reference to the flowchart of FIG. 31.

As for the codes that could not be embedded in the optimal scanning, the number of codes estimated to be inside the screen is defined as i (step SF1). That is, i=(-the total number of codes)−(error_num)−(the number of codes embedded in the optimal scanning). Then, the row number and the column number of each code are stored in arrays R and C, respectively (step SF2). In this way, the number of codes that could not be embedded in the optimal scanning and their positions can be determined (if the column number and the row number of a code are known, its coordinates can be determined from CODE_POS obtained in step SB, as described later).

Next, the variable "counter" and the pattern counter "n" are initialized to 0 (step SF3).

Then, a straight line l passing coordinate CODE_POS [[R(counter)]][C[counter]] of the (counter)th position unsensed and having a slope of SLOPE+dt[n] (step SF4). Points W3 and W4 at which this straight line l crosses the screen frame are defined, and the image data on segment W3-W4 are taken in (step SF5).

Then, a conversion-to-width-information routine (described later in detail) is called (step SB174) and the taken-out data is converted into width information. On the basis of the width information, a portion agreeing with the bar code table (not shown) previously determined according to the use of the bar code is converted into intermediate information, which is then stored (step SF6). Then, it is judged whether or not the code at the position aimed at in steps SF4 through SF6 has been embedded (step SF7). If the code has been embedded, control goes to step SFA, and if the code has not been embedded, control proceeds to step SF8.

If it is judged that the code has not been embedded, the slope pattern counter "n" is incremented (step SF8). A check is made to see if the resulting value of the slope pattern counter "n" is less than the number of slope patterns N_PAT (if ten types of slope are previously stored in array "dt", N_PAT is 10) (step SF9). If "n" is less than N PAT, control proceeds to step SF4, and if "n" is equal to or larger than N_PAT, control goes to step SFA.

If it is judged that the code has been embedded in step SF7, or if the slope pattern counter "n" is equal to or larger than the number of slope patterns N_PAT, the variable "counter" is incremented, and the slope pattern "n" is reset to 0 (step SFA). A check is made to see if the value of the reset variable "counter" exceeds the variable "i", that is, the number of codes estimated to be inside the screen among the codes that could not be embedded in the optimal scanning (step SFB). If the value does not exceed the variable "i", control proceeds to step SF4, and if the value exceeds the variable "i", control goes to the next step SFC.

If it is judged that the value exceeds the variable "i" in step SFB, a check is made to see if the information where the stored code data is written on the label can be decoded completely (step SFC). If the information can be decoded completely, control is returned to a higher-level routine, carrying the information that decoding is possible. If the information cannot be decoded, control is returned to a higher-level routine, carrying the information that decoding is impossible.

Specifically, image data is taken in at several values types of slope for each code estimated to be inside the screen among the codes that could not be embedded in the optimal scanning in steps SF4 through SFB, and the code is determined. This allows only the necessary portions to be taken in, thereby determining a code matrix with the smallest number of trials.

Although in the above example, when a code could not be embedded, scanning is done by changing the slope of straight line 1, scanning may be performed by moving straight line 1 in parallel. The intersection positions of several straight lines 1 of different slopes may be set for the head position or the central position of the bar code label, as required.

Figure 32A:
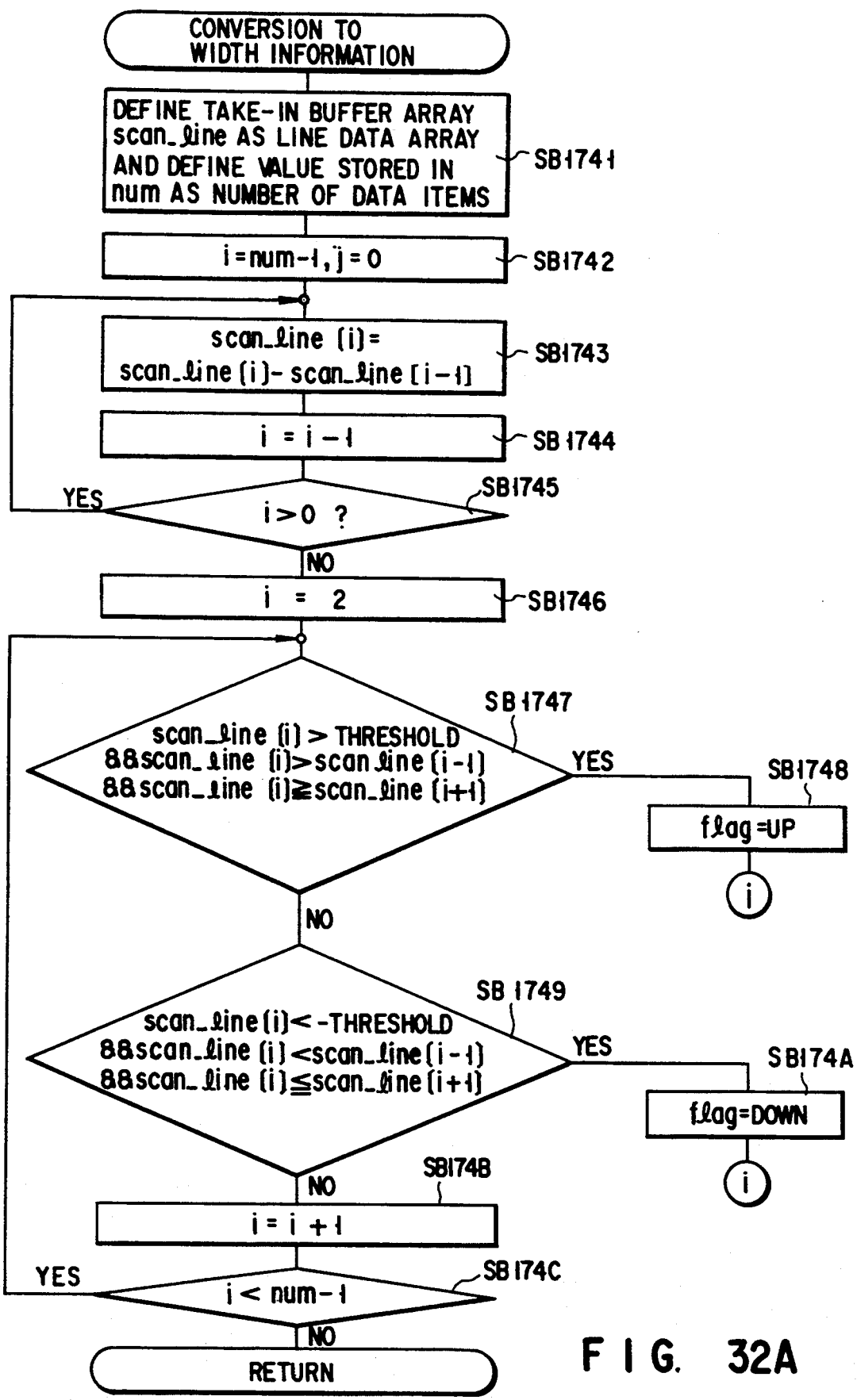
FIG. 32A and FIG. 32B are flowcharts for illustrating the conversion-to-width information routine in FIGS. 28, 39, and 31.
Figure 32B:
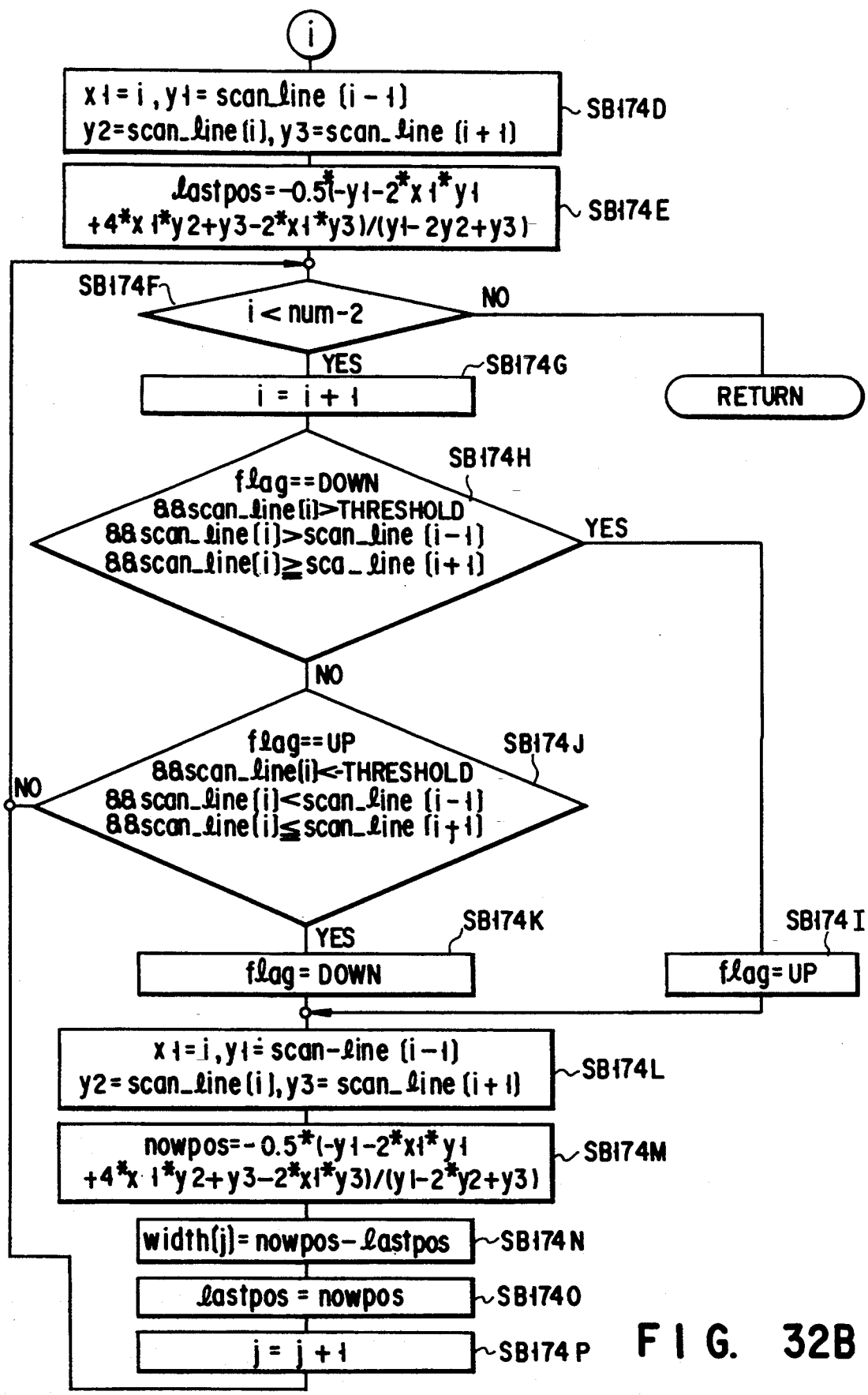

The conversion-to-width-information routine called in step SB174 will now be described with reference to the flowcharts of FIGS. 32A and 32. The essential purpose of this routine is to compute the width between the bar and the space in the label. A boundary between the bar and the space is determined by a differential signal. In this case, a data peak is obtained by approximation to a quadratic curve. Peak positions are then determined sequentially. By computing the difference between the positions, the width is obtained. At this time, the star code 22 and the row indicator 21A are also converted into width information.

Specifically, the buffer array "scan_line" taken in by a higher-level routine is defined as a line data array, and the value taken in and stored in the variable "num" is defined as the number of data items (step SB1741). Next, the result of decrementing the value of the variable "num" is stored in the position indicator counter "i", and the variable "j" is initialized to 0 (step SB1742). The value of the (i−1)st position of the take-in buffer array "scan_line" is subtracted from the value of the ith position (specified by position indicator counter "i") of the take-in buffer array "scan_line." The resulting value is then reset in the ith position of the take-in buffer "scan_line" (step SB1743). After this, the position indicator counter "i" is decremented (step SB1744) and it is judged whether or not the result is larger than 0 (step SB1745). If the result is not larger than 0, control returns to step SB1743. That is, line data is differentiated linearly in steps SB1741 through SB1745.

Next, the position indicator "i" is initialized to 2 (step SB1746). It is judged whether or not the value of the ith position of the take-in buffer array "scan_line" is larger than both the value of the threshold variable THRESHOLD and the value of the (i−1)st position of the take-in buffer array "scan_line" and equal to or larger than the value of the (i+1)st position of the take-in buffer array "scan_line" (step SB1747). If true, a code index "flag" is set "UP" (step SB1748 ).

If false, it is judged whether or not the value of the ith position of the take-in buffer array "scan_line" is smaller than both the value (−THRESHOLD) obtained by making the sign of the threshold variable THRESHOLD negative and the value of the (i−1)st position of the take-in buffer array "scan_line" and equal to or smaller than the value of the (i+1)st position of the take-in buffer array "scan_line" (step SB1749). If true, the code index "flag" is set "DOWN" (step SB174A).

If false, the position indicator counter "i" is incremented ( step SB174B ) and it is judged whether or not the result is less than the value obtained by subtracting 1 from the value of variable "num" (step SB174C). If the result is less than the value of "num", control goes to step SB1747, and if the result is not less than the value of "num", control is returned to a higher-level routine.

Figure 33:
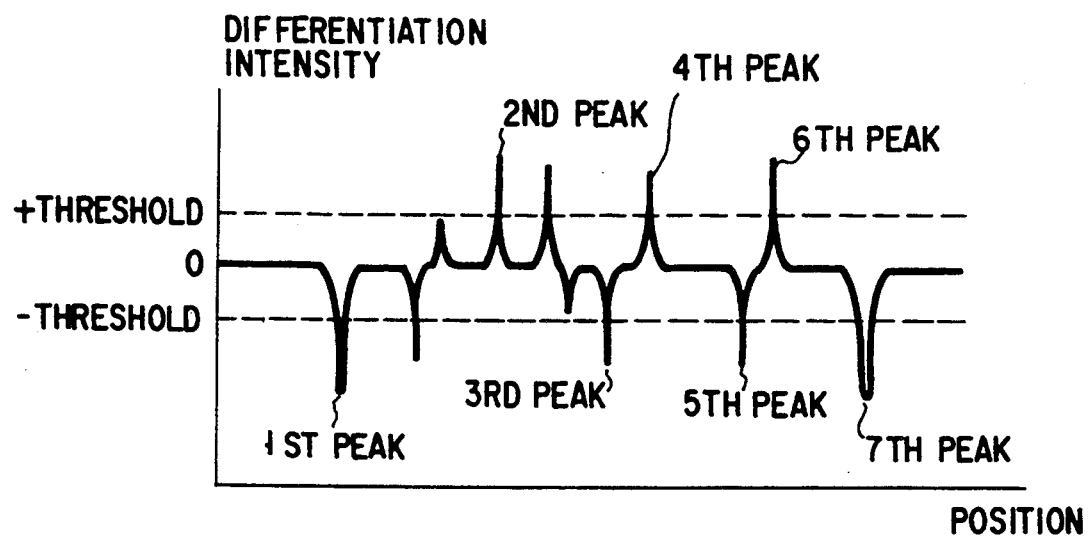
FIG. 33 is a view for describing the peak selection rule for converting to width information.

Specifically, in steps SB1747 through SB174C, the first peak exceeding the value of the threshold variable THRESHOLD, i.e., the first peak in FIG. 33, is sensed. If the sign of the sensed peak is positive (+), the code index "flag" is set "UP" and control advances to step SB174D. If the sign of the sensed peak is negative (−), the code index "flag" is set "DOWN" and control goes to step SB174D. If no peak is sensed even by line data scanning, control is returned to a higher-level routine.

After the code index "flag" has been set in this way, the value of the position indicator counter "i" is set to $x_1$, the value of the (i−1)st position of the take-in buffer array "scan_line" is set to $y_1$, the value of the ith position of take-in buffer array "scan_line" is set to $y_2$, and the value of the (i+1)st position of take-in buffer array "scan_line" is set to $y_3$. By setting the values this way, the sensed peak position and adjacent data items on both sides are fitted with each other on a quadratic curve (step SB174D). Then, the following expression is calculated to obtain the peak position of the quadratic curve:

$$\frac{-0.5(-y_1 - 2x_1 y_1 + 4x_1 y_2 + y_3 - 2x_1 y_3)}{y_1 - 2y_2 + y_3}$$

Then, the peak position obtained is stored in a variable "last pos" (step SB174E).

After that, it is judged whether or not the value of the position indicator counter "i" is less than the value obtained by subtracting 2 from the value of the variable "num" (step SB174F). If the former is not less than the latter, control is returned to a higher-level routine.

If the former is less than the latter, the position indicator counter "i" is incremented (step SB174G). Then, it is judged whether or not the code index "flag" is "DOWN", and the value of the ith position of the take-in buffer array "scan_line" is larger than both the value of the threshold variable THRESHOLD and the value of the (i−1)st position of the take-in buffer array "scan_line" and is equal to or larger than the value of the (i+1)st position of the take-in buffer array "scan_ line" (step SB174H). If true, the code index "flag" is set "UP" (step SB174I).

If false, it is judged whether or not the code index "flag" is "UP", and the value of the ith position of the take-in buffer array "scan_line" is less than both the value of −THRESHOLD obtained by making the sign of the threshold variable THRESHOLD negative and the value of the (i−1)st position of the take-in buffer array "scan_line" and is equal to or less than the value of the (i+1)st position of the take-in buffer array "scan_line" (step SB174J). If false, control is passed to step SB174F, and if true, the code index "flag" is set "DOWN" (step SB174K).

After the code index "flag" has been reset in this way, the value of the position indicator counter "i" is set to $x_1$, the value of the (i−1)st position of the take-in buffer array "scan_line" is set to $y_1$, the value of the ith position of the take-in buffer array "scan_line" is set to $y_2$, and the value of the (i+1)st position of the take-in buffer array "scan_line" is set to $y_3$. By setting the values this way, the sensed peak position and adjacent data items on both sides are fitted with each other on a quadratic curve (step SB174L). Then, the following expression is calculated to obtain the peak position of the quadratic curve:

$$\frac{-0.5(-y_1 - 2x_1y_1 + 4x_1y_2 + y_3 - 2x_1y_3)}{y_1 - 2y_2 + y_3}$$

Then, the peak position obtained is stored in a variable "nowpos" (step SB174M).

Figure 34:
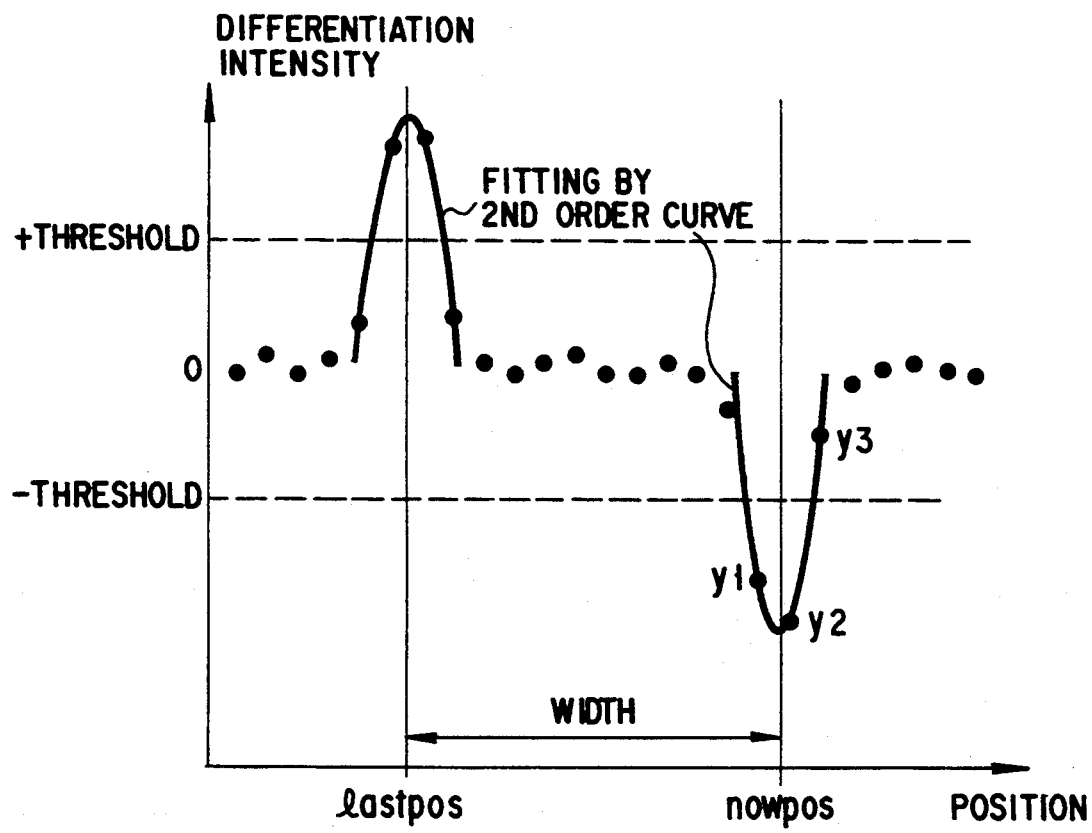
FIG. 34 shows two peak positions for calculating an inter-peak distance.

As shown in FIG. 34, the preceding peak position "lastpos" and the current peak position "nowpos" are thus obtained. From the difference between these two peak positions, the inter-peak distance is computed, and the computation result is stored in a position indicated by the variable "j" of width-information storage array variable "width" (step SB174N).

After that, the peak position variable "lastpos" is updated to the peak position variable "nowpos" (step SB174O), the variable "j" is incremented (step SB174P), and control is returned to step SB174F.

In steps SB174F through SB174P, the peaks are sensed successively this way, and the inter-peak distances are stored in the width-information storage array variable "width." The peak sensing in steps SB174F through SB174P differs from the first peak sensing in steps SB1747 through SB174C in that, for example, when the current code index "flag" is "DOWN", a peak to be found next is a positive (+) peak.

As seen from what has been described so far, even when the bar code label 2 has any rotational angle or is partially outside the screen, efficient reading can be achieved because each code position contained in the bar code is estimated and reading is done on the basis of the estimated positions. That is, the position of each code contained in the bar code is estimated and, on the basis of the estimated positions, it is determined whether scanning should be performed or not, so that an insufficiently read bar code image will not be processed, thereby eliminating the waste in time. While in this embodiment, whether the processing should be continued or not is determined on the basis of the judgment result, other methods may be used. For instance, when embedding is judged to be impossible, an approach other than normal scanning may be used.

The first embodiment further has the following advantages:

(1) Since in sensing the label position, the sensed position is reset using the method of least squares, it is possible to determine the position more accurately.

(2) Since in the optimal scanning routine, scanning is achieved in such a manner that the number of data take-out lines in each row is one according to the size (the number of rows and columns) readable within the label screen and the coordinates on the screen, it is possible to shorten the label reading time when decoding becomes possible in the optimal scanning.

(3) Further, since the intelligent scanning performs a sensing process by changing angles at code positions where codes could not be read in the optimal scanning and are estimated to be inside the screen, an increase in the label reading time can be minimized.

A second embodiment of the present invention will be explained.

FIG. 35 shows the general flowchart for the algorithm for the data processing apparatus 7 according to a second embodiment of the present invention. For simplification, explanation of the movement sensing etc. described in the first embodiment will be omitted.

First, an image is taken in the frame memory 6 (step SI).

Next, a label sensing routine (described later in detail) is called (step SJ). Using the taken-in image data, a check is made to see if a label is present. If the label is present, label information is sensed.

Then, the result of sensing a label in step SJ is judged (step SK). If there is no label, control is returned to step SI to take an image in the frame memory 6.

On the other hand, if a label is present, a scanning routine (described later in detail) is called (step SL). The entire surface of the label is scanned using the variables defined in step SJ to read label information.

Then, it is judged whether or not decoding is possible on the basis of the information read in the scanning in step SL (step SM). If decoding is possible, control is passed to the decoding process in step SN.

If decoding is impossible, control is returned to step SI to take an image in the frame memory 6.

In step SN, the information read in the scanning routine in step SL is decoded and the decode result is outputted to the host apparatus and related units (not shown).

The processing routines described above will be explained in detail below.

Figure 36:
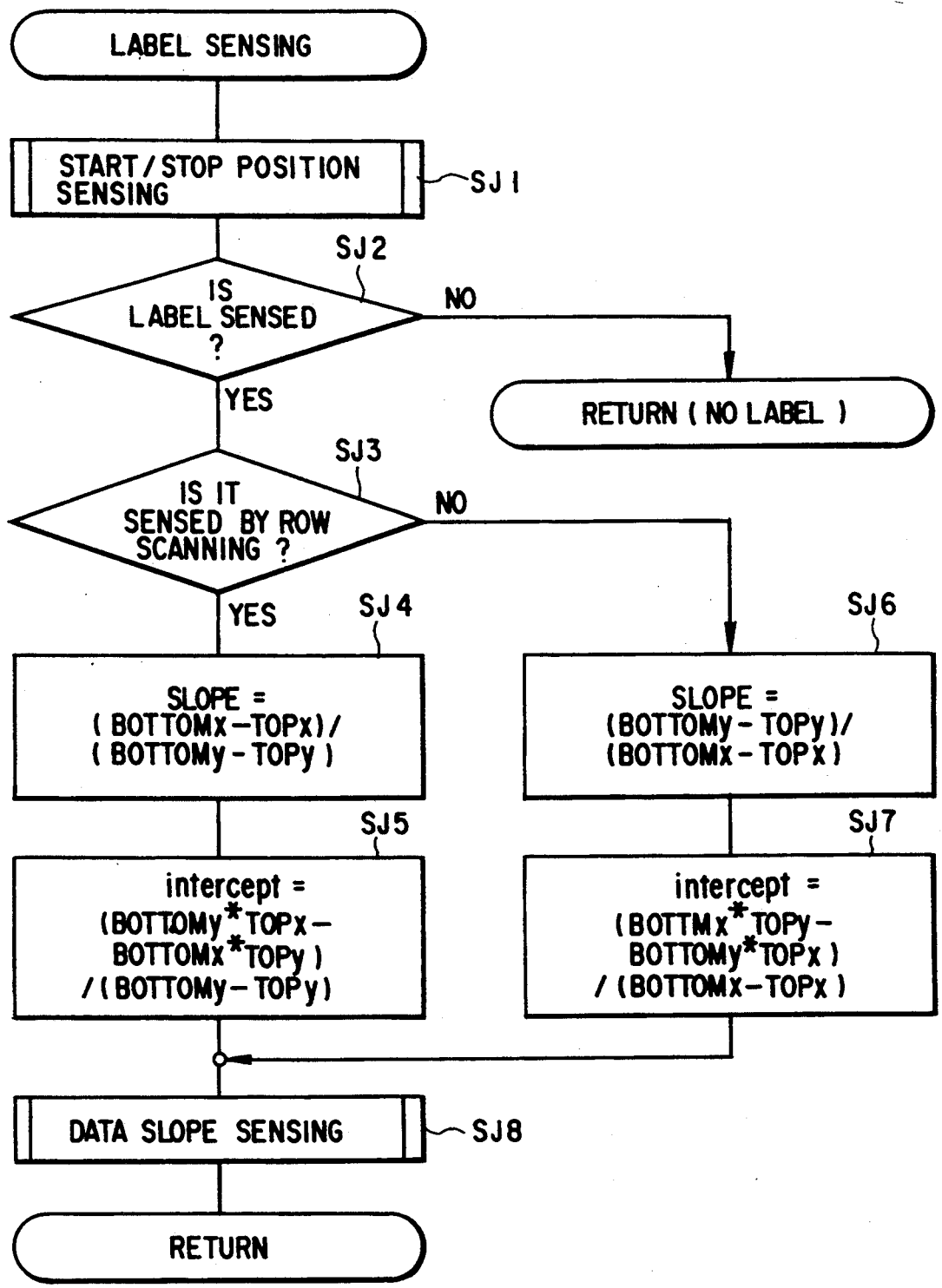
FIG. 36 is a flowchart for illustrating the symbol sensing routine in FIG. 35.

First, the label sensing routine will be described, referring to the flowchart of FIG. 36 and the explanatory diagram of various pieces of information of the label in FIG. 9 (this figure shows a bar code label having a 4×1 label matrix, with the number of codes being therefore 4). The label sensing routine includes two types of label sensing processes: the sensing of the presence/absence of a label and the sensing of label position information, that is, the determining of an extracting range (variables TOP and BOTTOM) for extracting the image data from the frame memory 6 so as to be parallel to the label as well as the slope of the big bar (variable SLOPE) and the slope of the label in the data direction (variable DATA_SLOPE). Here, the contents of the variable TOP indicate the top coordinates of the label and the contents of variable BOTTOM indicate the bottom coordinates of the label. The contents of variable SLOPE represent the slope of big bars 22A and 23A contained in the start code 22 or the stop code 23. Further, the contents of the variable DATA_SLOPE represent the slope of the label in the data direction. Thus, theoretically, SLOPE crosses DATA_SLOPE at right angles.

In the label sensing routine, first, a start/stop position sensing routine (explained later in detail) is called (step SJ1) to determine the presence/absence of a label and an extracting range (variables TOP and BOTTOM) for extracting the image data from the frame memory 6 so as to be parallel to the label.

Then, the result of sensing the start/stop position in step SJ1 is judged (step SJ2). If there is no label, it is judged that there is no label and this process is terminated. That is, control returns with the information that there is no label.

On the other hand, when a label is present, it is judged whether it has been sensed by row scanning or column scanning (step SJ3). If it has been sensed by row scanning, the slope x/y (SLOPE) of a straight line shown in FIG. 9 and an intercept at which the straight line crosses the screen frame at y=0 are calculated in steps SJ4 and SJ5.

Similarly, if it has been sensed by column scanning, the slope y/x (SLOPE) of the straight line and an intercept at which the straight line crosses the screen frame at x=0 are calculated in steps SJ6 and SJ7.

Next, on the basis of the data items thus obtained, the slope (variable DATA_SLOPE) of the label in the data direction is obtained in a data slope sensing routine (described later in detail), and control returns.

Figure 37:
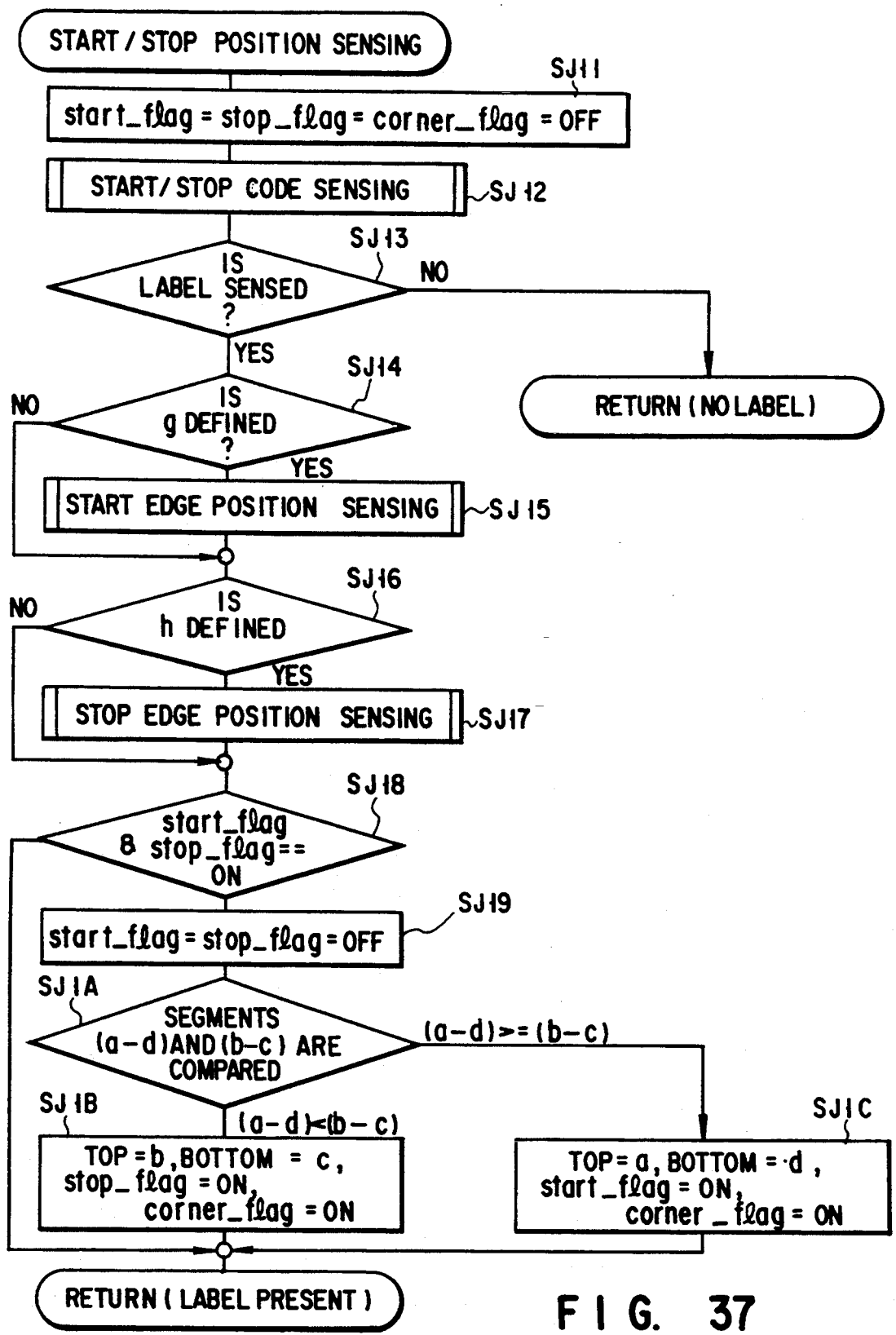
FIG. 37 is a flowchart for illustrating the start/stop position sensing routine in FIG. 36.

Next, referring to the view of FIG. 8 for describing the way of sensing the start/stop positions and the flowchart of FIG. 37, the start/stop position sensing routine will be explained. The start/stop position sensing routine includes two types of label sensing processes: the sensing of the presence/absence of a label and the sensing of label position information, that is, the determining of an extracting range (variables TOP and BOTTOM) for extracting the image data from the frame memory 6 so as to be parallel to the label.

In the start/stop position sensing routine, first a label sensing flag is initialized (step SJ11). The label sensing flag is composed of a start sensing_flag "start_flag", a stop sensing flag "stop_flag", and a 4-corner sensing flag "corner_flag." The "start_flag" and the "stop_flag" in these label sensing flags are used to indicate which of the start code 22 and the stop code 23 should be selected and processed in another process explained later. The reason is that when both the start code 22 and the stop code 23 have been sensed, it is necessary to select the more reliable one. Further, "corner_flag" indicates a possibility of calculating DATA_SLOPE in another process described later.

Next, a start/stop code sensing routine (described later in detail) is called (step SJ12) and it is judged whether or not the image data taken in the frame memory 6 contains the start code 22 and/or the stop code 23. That is, points e, f, g, and h in FIG. 8 are sensed (not all these four structure variables are necessarily sensed. For example, in a case as shown in FIG. 9, structure variables f nor h may not be sensed). After both the start code 22 and the stop code 23 have been sensed and determined in this routine, the structure variable g on the frame memory 6 of FIG. 8 is defined for the start code 22 and the structure variable h is defined for the stop code 23. Here, the structure variable e indicates the coordinates at which the start code 22 is first found and its code length, f represents the coordinates at which the stop code 23 is first found and its code length, g denotes the coordinates at which the start code 22 is last found and its code length, and h indicates the coordinates at which the stop code 23 is last found and its code length.

Then, it is judged whether or not a label is sensed (that is, one of the structure variables g and h has been defined) (step SJ13). If none of them has been defined, control returns with the information that there is no label.

Next, if it is judged that a label has been sensed in step SJ13, it is the judged whether the structure variable g has been defined (step SJ14). If it has not been defined, control goes to step SJ16. On the other hand, if the structure variable g has been defined, the start edge position sensing routine as explained referring to FIG. 12 is called (step SJ15) to sense the start edge position. The start edge sensing defines coordinate variables i and m as shown in FIG. 8 and further coordinate variables a and d on the basis of the structure variables e and g (if the structure variable g has been defined, the structure variable e has also been defined). Further, "start_flag" is set "ON" and the coordinate variables TOP and BOTTOM are defined. Here, the coordinate variables b and c represent two of the four corner coordinates of the label.

Next, it is judged whether the structure variable h has been defined (step SJ16). If it has not been defined, control goes to step SJ18. On the other hand, if the structure variable h has been defined, the stop edge position sensing routine as explained referring to FIG. 13 is called (step SJ17) to sense the stop edge position. The stop edge sensing defines the coordinate variables j and k as shown in FIG. 8 and then the coordinate variables b and c on the basis of the structure variables f and h (if the structure variable h has been defined, the structure variable f has also been defined). Further, "stop_flag" is set "ON" and the coordinate variables TOP and BOTTOM are defined. Here, the coordinate variables b and c represent two of the four corner coordinates of the label.

Then, it is judged whether or not both "start_flag" and "stop_flag" are "ON" (step SJ18). If neither is ON, control returns with the information that a label is present.

If both flags are "ON", both "start_flag" and "stop_flag" are reset once (step SJ19). Segment (a-d) is compared with segment (c-d) (step SJ1A), and the longer one of the segments of the start code 22 and the stop code 23 is selected as an object to be processed. The reason why the longer segment is selected as a reference for processing is that a major reason why one code becomes shorter than the other is that the one code sticks out from the screen.

If segment (a-d) is shorter than segment (b-c), the value of the coordinate variable b is substituted into the coordinate variable TOP and the value of the coordinate variable c is substituted into the coordinate variable BOTTOM to define data for determining an extracting range for label information. Further, "stop_flag" and "corner_flag" are set "ON" (step SJ1B).

Conversely, if segment (a-d) is equal to or longer than segment (b-c), the value of the coordinate variable "a" is substituted into the coordinate variable TOP and the value of the coordinate variable "d" is substituted into the coordinate variable BOTTOM to define data for determining an extracting range for label information. Further, "stop_flag" and "corner_flag" are set "ON" (step SJ1C).

Then, it is judged that a label is sensed and control returns.

Next, referring to the flowchart of FIG. 38, the start/stop code sensing routine called in step SJ12 of the start/stop position sensing routine will now be described. The start/stop code sensing routine senses at least one of a set of the structure variables e and g and a set of the structure variables f and h.

Specifically, a scanning & sensing (row) routine (explained later in detail) is called (step SJ121) to scan the image data in the frame memory 6 in the row direction to sense the start/stop codes 22 and 23. Here, scanning in the row direction means scanning in the longitudinal direction of the frame memory 6 as shown by row scanning in FIG. 8.

Based on the result of the scanning & sensing (row) routine, it is judged whether either of the structure variable g or h has been defined (that is, whether the start code 22 or the stop code 23 is sensed, or whether or not the label is sensed) (step SJ122). If a label is sensed, it is judged that a label is present and control returns.

On the other hand, when no label is sensed, the scanning & sensing (column) routine is called (step SJ123) to scan the image data in the frame memory 6 in the column direction to sense the start/stop codes 22 and 23. Here, scanning in the column direction means scanning in the lateral direction of the frame memory 6 as shown by column scanning in FIG. 8.

From the result of the scanning & sensing (column) routine, it is judged whether either of the structure variable g or h has been defined (that is, whether the start code 22 or the stop code 23 is sensed, or whether or not the label is sensed) (step SJ124). If a label is sensed, it is judge that a label is present and control returns.

When no label is sensed this time either, however, it is judged that there is no label and control returns.

Figure 39B:
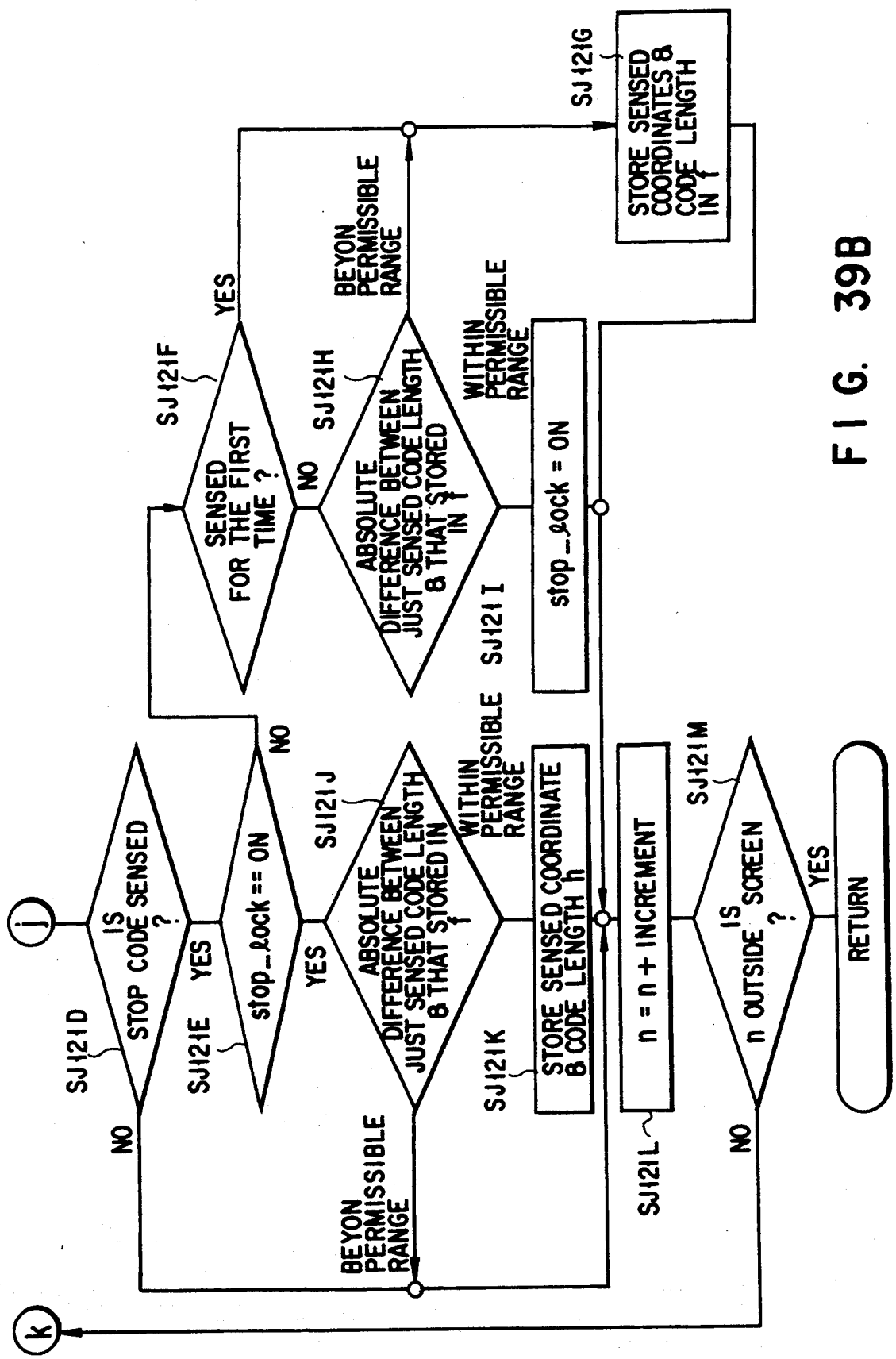

The scanning & sensing routine called in steps SJ121 and SJ123 will be explained with reference to the flowchart of FIG. 39. This routine scans the data in the frame memory 6 in the row direction and the column direction at predetermined sensing intervals to determine at least one of a set of the structure variables e and g and a set of the structure variables f and h. The direction of scanning is determined when this routine is called. If at least one of a set of the structure variables e and g and a set of the structure variables f and h has been determined, it is judged that a label has been sensed and control returns to a higher-level routine. If neither sets of the structure variables e and g and the structure variables f and h has been sensed, it is judged that there is no label and control returns to a higher-level routine.

In the scanning & sensing routine, a code determining flag is first initialized (step SJ1211). The code determining flag is composed of a start code determining flag "start_lock" and a stop code determining flag "stop_lock." These code determining flags are used to evaluate the reliability when the start code 22 and the stop code 23 are recognized.

After the initial setting, it is judged whether row scanning or column scanning is performed (step SJ1212). If row scanning is performed, the image data on the nth row is taken in (step SJ1213). If column scanning is performed, the image data on the nth column is taken in (step SJ1214).

Next, it is judged whether or not the taken-in image data contains the start code 22 (step SJ1215). If it does not contain, control proceeds to step SJ121D. If it contains the start code 22, it is judged whether "start_flag" is "ON" or not (step SJ1216). If "start_flag" is not "ON", it is judged whether or not the start code 22 is sensed for the first time (step SJ1217). If it is sensed for the first time, the sensed coordinates and its code length are stored in the structure variable e (step SJ1218). If it is not sensed for the first time, it is judged whether the absolute difference between the just sensed code length and the code length previously stored in e is within a permissible range or not (step SJ1219). If it is beyond the permissible range, the just sensed coordinates in step SJ1218 and its code length are stored in the structure variable e. If it is within the permissible range, "start_lock" is set "ON" (step SJ121A).

If "start_lock" is "ON" in step SJ1216 it is judged whether the absolute difference between the just sensed code length and the code length previously stored in e is within the permissible range (step SJ121B). If it is beyond the permissible range, control is passed to step SJ121D. If it is within the permissible range, the just sensed coordinates and its code length are stored in the structure variable g (step SJ121C).

Similarly, it is judged whether or not the taken-in image data contains the stop code 23 (step SJ121D). If it does not contain, control proceeds to step SJ121L. If it contains the stop code 23, it is judged whether "stop_flag" is "ON" or not (step SJ121E). If "stop_flag" is not "ON", it is judged whether or not the stop code 23 is sensed for the first time (step SJ121F). If it is sensed for the first time, the sensed coordinates and its code length are stored in the structure variable f (step SJ121G). If it is not sensed for the first time, it is judged whether the absolute difference between the just sensed code length and the code length previously stored in f is within the permissible range or not (step SJ121H). If it is beyond the permissible range, the just sensed coordinates in step SJ121G and its code length are stored in the structure variable e. If it is within the permissible range, "stop_lock" is set "ON" (step SJ121I).

If "stop_lock" is "ON" in step SJ121E, it is judged whether the absolute difference between the length of the just sensed code length and the code length previously stored in f is within the permissible range (step SJ121J). If it is beyond the permissible range, control is passed to step SJ121L. If it is within the permissible range, the just sensed coordinates and its code length are stored in the structure variable h (step SJ121K).

Next, the value of parameter n is increased by a specified amount to update n (step SJ121L) and the number of rows and columns to be taken in next time is determined. Because the length and width of the frame memory 6 are known, it is judged whether or not the updated n is within this known screen size (step SJ121M). If it is within the screen size, control is passed to step SJ1212.

If the updated n is beyond the screen size, or the scanning is completed, control returns.

When a bar code label 2 is put on an LSI package or the like, the package surface appears in the visual field of the camera. Our experiment shows that since the package surface generally has a granular pattern, the granular pattern is erroneously recognized as the start code 22 or the stop code 23. When such erroneous recognition takes place, it is difficult to read the image. To avoid this problem, the structure variables e and g are obtained in steps SJ1215 through SJ121C and the structure variables f and h are obtained in steps SJ121D through SJ121K. Specifically, the length of a start code first found is compared with that of a start code found next. If the difference between these lengths is within a permissible range, the start code 22 is recognized to be found properly. Further, the start code structure variable last found is compared with the determined start code length and only codes whose length difference is within the permissible range are stored. Similarly, the length of a stop code first found is compared with that of a stop code found next. If the difference between these lengths is within the permissible range, the stop code 23 is recognized to be found properly. Further, the stop code structure variable last found is compared with the determined stop code length and only codes whose length difference is within the permissible range are stored. By doing this, erroneous recognition can be prevented.

Figure 40:
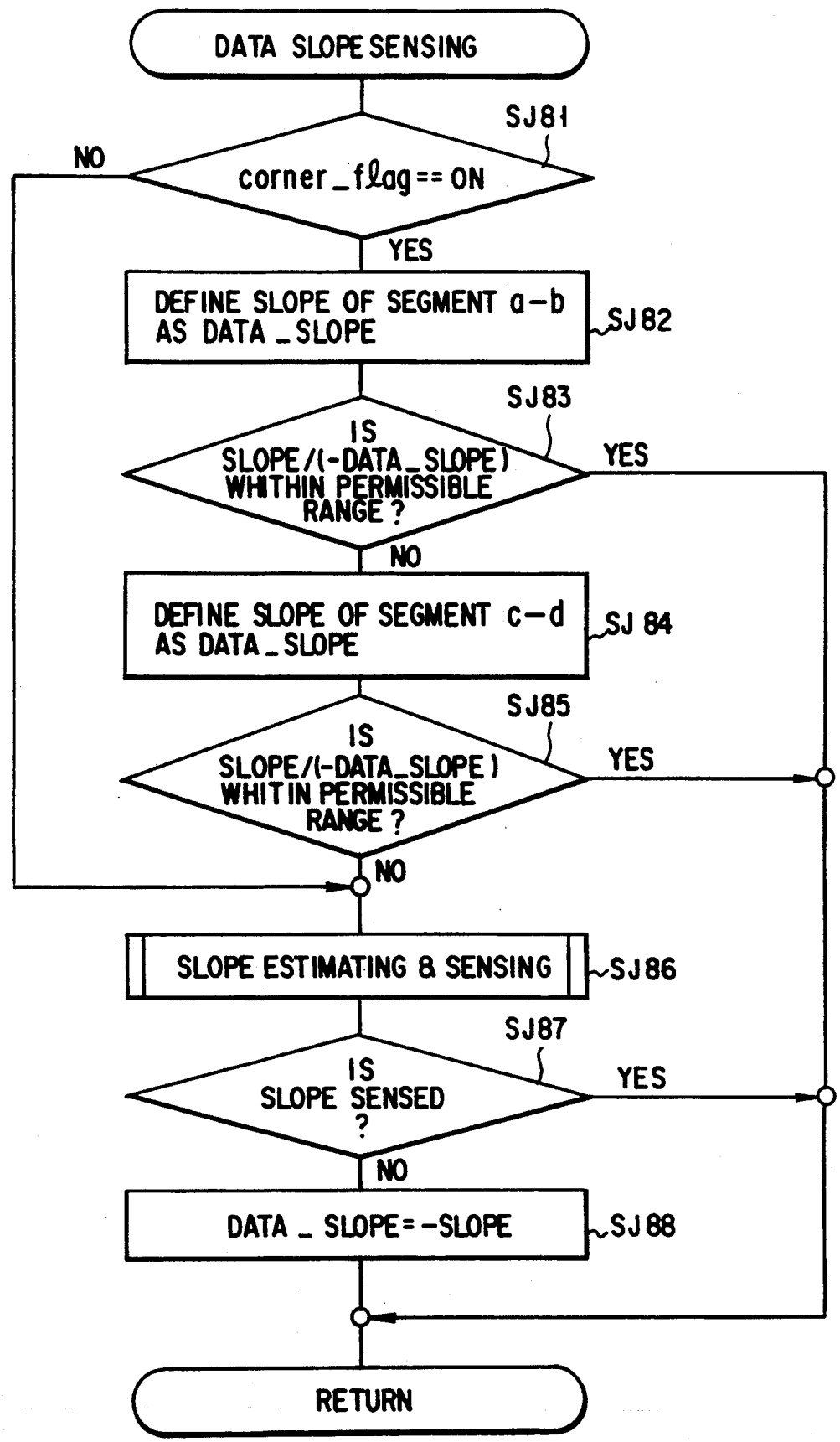
FIG. 40 is a flowchart for illustrating the data slope sensing routine in FIG. 36.

The data slope sensing routine called in step SJ8 of the label sensing routine will now be described, referring to the flowchart of FIG. 40, the view in FIG. 8 for describing the way of sensing the start/stop positions and the explanatory diagram of various pieces of information on the label in FIG. 9. This routine determines the slope DATA_SLOPE in the direction in which data items are arranged. As mentioned above, DATA_SLOPE is determined from SLOPE. When the label is oblong, such as the number of rows is larger than the number of columns in the label, it is impossible to estimate DATA_SLOPE accurately. As a result, the label information sometimes cannot be adequately read. For this reason, when four corners have been sensed, an attempt is made to calculate the slope from the corners. If the result is not acceptable, then the label boundary is estimated and the slope is estimated using the boundary. If the result is still unacceptable, then the slope is obtained from SLOPE.

Specifically, it is judged whether or not "corner_flag" is ON (step SJ81). If it is ON, control goes to step SJ82. If it is OFF, control proceeds to step SJ86.

If it is ON, that is, four corners have been determined at the time a label has been sensed, the slope of segment a-b is temporarily determined to be DATA_SLOPE (step SJ82). Next, the reliability of the obtained DATA_SLOPE is evaluated (that is, it is judged whether the error is within the permissible range or not) (step SJ83). Here, as shown in FIG. 9, theoretically, SLOPE crosses DATA_SLOPE at right angles (where SLOPE is expressed as x/y and DATA_SLOPE is expressed as y/x). Therefore, the following relationship is established between them: SLOPE = −DATA_SLOPE. Namely, evaluating the proximity of SLOPE/(−DATA_SLOPE) to 1 in step SJ83 is merely evaluating the reliability of the obtained DATA_SLOPE.

If the error is within the permissible range in step SJ83, control returns to a higher-level routine. On the other hand, if the error is beyond the permissible range, the slope of segment c-d is temporarily determined to be DATA_SLOPE (step SJ84). Next, the reliability of the obtained DATA_SLOPE is evaluated (that is, it is judged whether the error is within the permissible range or not) (step SJ85). If it is judged that the error is within the permissible range in step SJ85, control returns to a higher-level routine. On the other hand, if the error is beyond the permissible range, control is passed to step SJ86.

Next, a slope estimating and sensing routine (described later in detail) is called (step SJ86) to estimate the label boundary, and an attempt is made to estimate the slope using the boundary. If it is judged from the result that the slope has been sensed, control is returned to a higher-level routine. If it is judged that the slope has not been sensed, control is passed to step SJ88 (step SJ87). In step SJ88, −SLOPE is substituted into DATA_SLOPE because SLOPE crosses DATA_SLOPE at right angles. After this, control returns to a higher-level routine.

Figure 41:
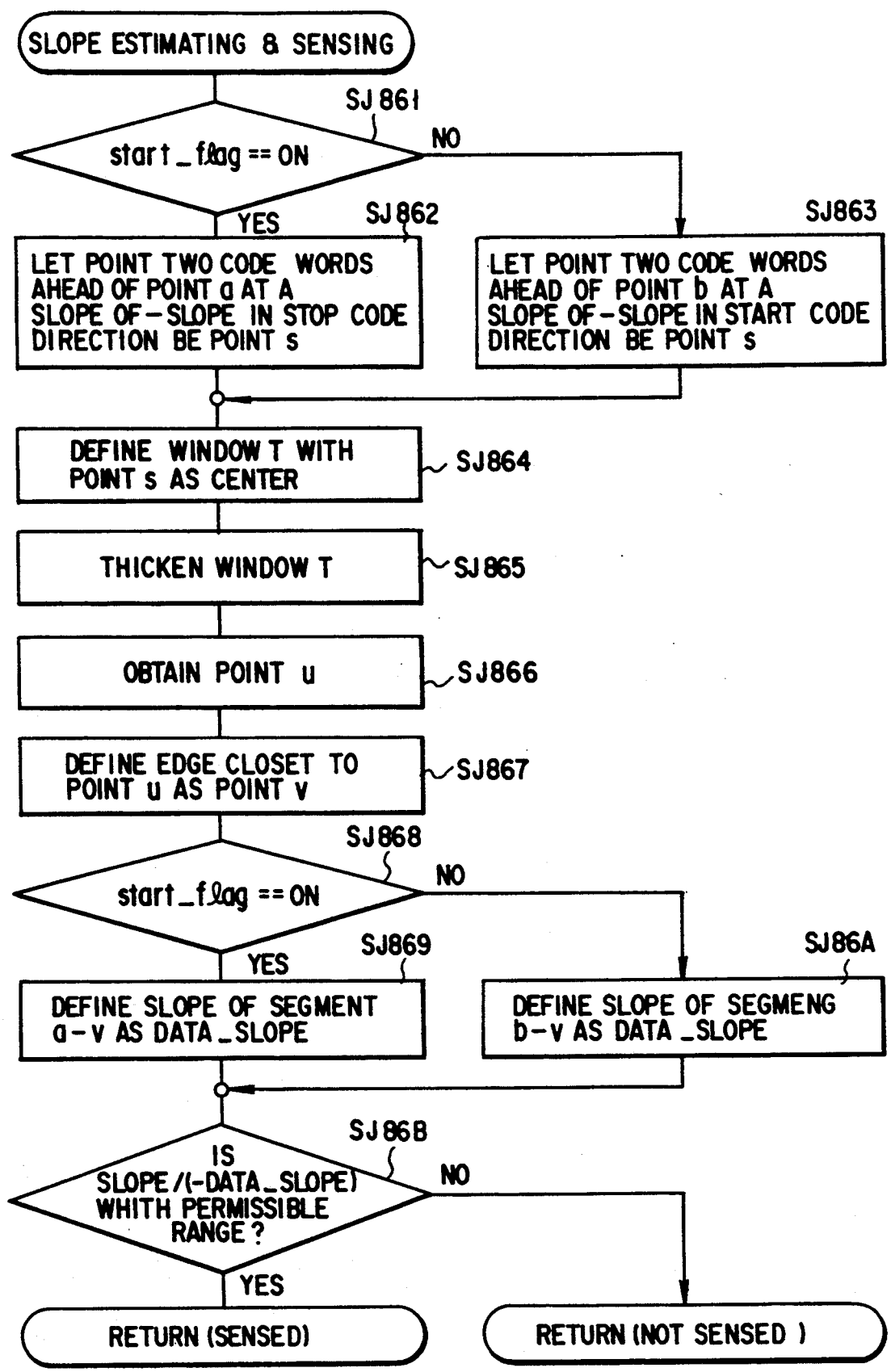
FIG. 41 is a flowchart for illustrating the slope estimating and sensing routine in FIG. 40.

The slope estimating and sensing routine called in step SJ86 of the data slope sensing routine will be explained, referring to the flowchart of FIG. 41 and the views of FIGS. 42A and 42B for describing the way of estimating and sensing the edge (an example where a label is determined by the start code, with "start_flag"="ON"). In this routine, the edge of the label's upper end is estimated and the slope (variable DATA_SLOPE) of the label in the data direction is obtained.

Specifically, it is judged whether the start code 22 or the stop code 23 is used as a reference (step SJ861). If the start code 22 is selected as a reference (that is, "start_flag"=ON and "stop_flag"=OFF) a point which is two code words ahead of point a at a slope of −SLOPE in the stop direction is determined to be point s (step SJ862). On the other hand, if the stop code 23 is selected as a reference (that is, "start_flag"=OFF and "stop_flag"=ON), a point which is two code words ahead of point b at a slope of −SLOPE in the start direction is determined to be point s (step SJ863).

Next, a window T (e.g., 32×32 pixels) with point s as its center is defined (step SJ864). A thickening process (by which black portions are made thicker and white portions are made thinner) is performed on the window T (step SJ865), producing the result containing the black portions of the original image as shown in FIG. 42B. A known thickening operator may be used for the thickening process.

Next, a straight line with a slope of −SLOPE is scanned, in this case, from the top left corner of the window T toward the bottom right corner. A point at which "black" is first found is defined as point u (step SJ866). At this time, the reference point is determined to be point a or point b. If −SLOPE is negative, scanning is done from the top left corner to the bottom right corner, and if −SLOPE is positive, scanning is achieved from the top right corner to the bottom left corner. On the other hand, the reference point is determined to be point c or point d. If −SLOPE is negative, scanning is done from the bottom right corner to the top left corner, and if −SLOPE is positive, scanning is performed from the bottom left corner to the top right corner.

Next, the edge closest to point u on the original image is obtained and determined to be point v (step SJ867). By the processes described above, the upper boundary of the label is obtained. Thus, it is judged whether or not "start_flag" is ON (that is start flag 22 is used as the reference, or the reference point is point a) (step SJ868). If "start_flag" is ON, the slope DATA_SLOPE is obtained from point a and point v (step SJ869). On the other hand, if "start_flag" is "OFF", the slope DATA_SLOPE is obtained from point b and point v (step SJ86A).

Next, the reliability of the obtained DATA¢SLOPE is evaluated (that is, it is judged whether the error is within the permissible range or not) (step SJ86B). If the error is within the permissible range in step SJ86B, it is judged that a slope has been sensed and control returns to a higher-level routine. On the other hand, if the error is beyond the permissible range, it is judged that no slope has been sensed, and control is passed to a higher-level routine.

While, for simplification, the flow is drawn only for points a and b in this embodiment, a similar process may be executed for points c and d.

Figure 43:
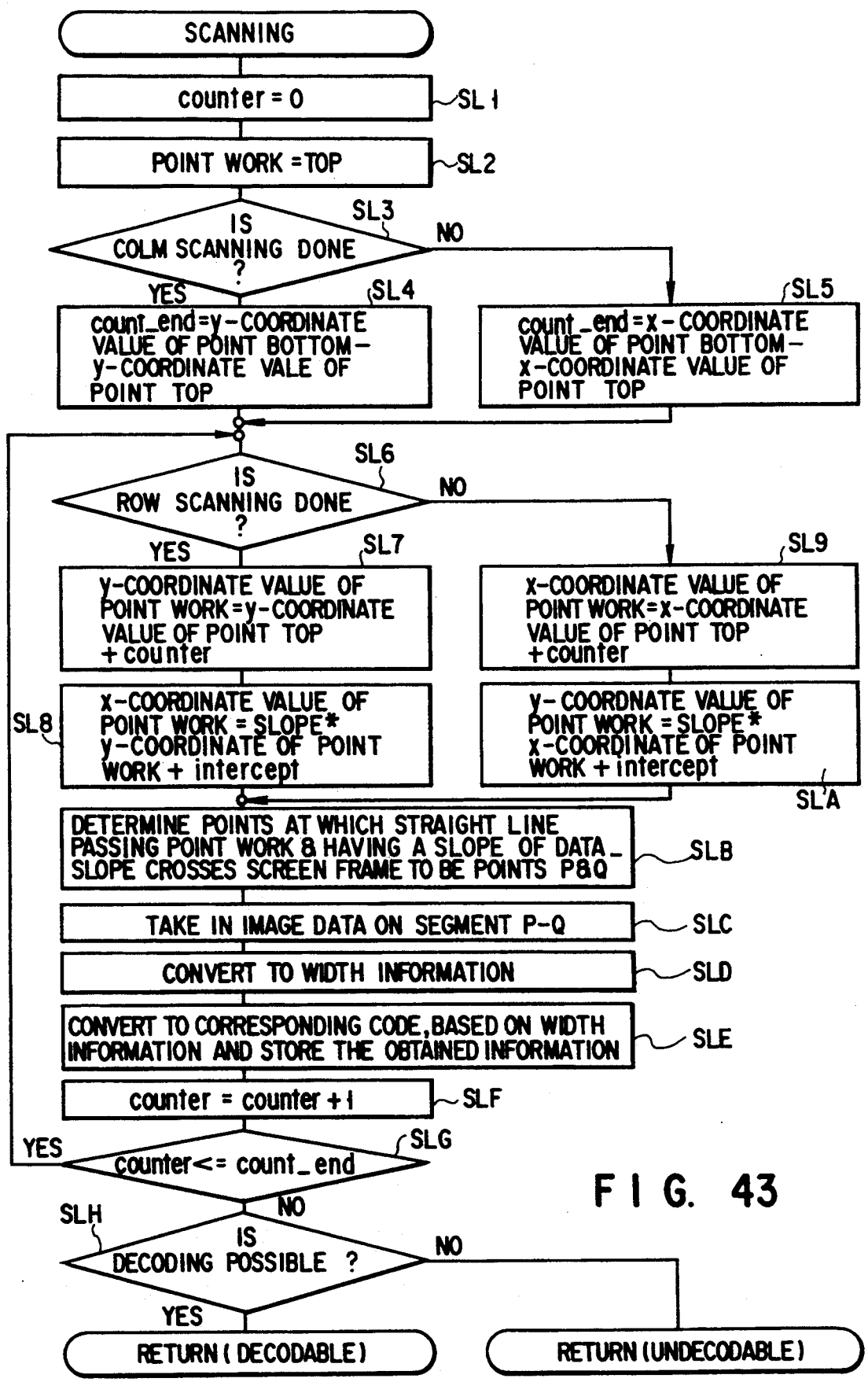
FIG. 43 is a flowchart for illustrating the scanning routine in FIG. 35.

The scanning routine called in step SL will now be described, referring to the flowchart of FIG. 43 and a view of an image projected on the frame memory 6 in FIG. 44.

FIG. 44 shows a bar code label having a 4×1 label matrix (the number of codes is therefore 4) when the start code 22 is selected as a reference in row scanning. For simplification, explanation will be given in connection with row scanning. In the case of a mode other than row scanning, a process in step SL4 (explained later) will be executed in place of step SL5, and processes in steps SL7 and SL8 will be carried out in place of steps SL9 and SLA, respectively.

Specifically, the variable "counter" is initialized to 0 (step SL1) and the reference coordinate variable WORK is initialized to the value of the label top coordinate variable TOP (step SL2).

It is judged whether row scanning or column scanning is performed (step SL3). If row scanning is performed, the difference between the y-coordinate value of the label bottom coordinate variable BOTTOM and the y-coordinate value of the label top coordinate variable TOP is substituted into the variable "count_end" (step SL4). That is, the number of patterns to be determined (the number of pixels in the column direction of the label in FIG. 44) is computed and stored in the variable "count_end." In other words, the number of patterns is used in scanning the entire label.

Similarly, if column scanning is performed, the difference between the x-coordinate value of the label bottom coordinate variable BOTTOM and the x-coordinate value of the label top coordinate variable TOP is substituted into the variable "count_end" (step SL5).

Again, it is judged whether row scanning or column scanning is performed (step SL6). If row scanning is performed, the value of variable "counter" is added to the y-coordinate value of the label top coordinate variable TOP and the result is substituted into the y-coordinate value of the reference coordinate variable WORK (step SL7). Further, the value of the label slope variable SLOPE is multiplied by the y-coordinate value of the reference coordinate variable WORK, and the label intercept variable "intercept" is added to the multiplication result, and the addition result is substituted into the x-coordinate value of the new reference coordinate variable WORK (step SL8). In this way, the reference coordinate variable WORK is reset as the value of the variable "counter" increases.

Similarly, if column scanning is performed, the value of variable "counter" is added to the x-coordinate value of the label top coordinate variable TOP and the result is substituted into the x-coordinate value of the reference coordinate variable WORK (step SL9). Further, the value of the label slope variable SLOPE is multiplied by the x-coordinate value of the reference coordinate variable WORK, and the label intercept variable "intercept" is added to the multiplication result, and the addition result is substituted into the y-coordinate value of the new reference coordinate variable WORK (step SLA).

Next, a straight line passing the reset coordinate variable WORK and having a slope indicated by the data slope variable DATA_SLOPE, is defined. The two points at which the straight line crosses the screen frame are computed and stored in coordinate variables P and Q (step SLB).

Then, a line of image data on segment P-Q is taken out from the frame memory 6 (step SLC).

Next, the taken-out data is converted into width information (step SLD). To obtain width information from the original image, a method of differentiating the original image and then calculating the inter-peak distance as in the first embodiment, may be used. A method of obtaining width information from the original image is not limited to differentiation. For example, a method of binarizing the original image and then counting the pixels may be used.

Then, on the basis of the width information, a portion agreeing with the bar code table (not shown) is converted into intermediate information, which is then stored (step SLE).

After that, the variable "counter" value is incremented (step SLF) and it is judged whether the value of the reset variable "counter" has reached the necessary number, i.e., the variable "counter_end" (step SLG). If the necessary number has not been reached, control returns to step SL6. If the number has been reached, control goes to step SLH. Specifically, a check is made to see if the information where the stored intermediate information is written on the label can be decoded completely (step SLH). If the information can be decoded, control returns to a higher-level routine, carrying the information that decoding is possible. If the information cannot be decoded, control returns to a higher-level routine, carrying the information that decoding is impossible.

As seen from what has been described above, even when a bar code label 2 is put on a very granular surface such as the surface of an LSI package, it is possible to prevent the granular pattern from being recognized as the start pattern or the stop pattern. As a result, decoding is assured even with a two-dimensional imaging apparatus, thereby enabling efficient reading. Further, the second embodiment has the following features:

(1) Since in obtaining the label data slope (DATA_SLOPE), if four corners have been determined, the slope is sensed using information on the four corners, and the slope is checked against the slope of the start/stop codes SLOPE, it is possible to determine the data slope more accurately.

(2) Since in obtaining the label data slope (DATA_SLOPE) under the condition where four corners have not been determined, the top and bottom edges of the label are estimated, the data slope is estimated using the edge position and the reference point, and the slope is checked against the slope of the start/stop codes SLOPE, it is possible to determine the data slope more accurately.

The present invention is not limited to the first and second embodiments, but may be practiced or embodied in still other ways.

For example, the two-dimensional imaging apparatus 5 is not restricted to an area sensor-based apparatus such as a two-dimensional CCD or a camera tube. It may be a combination of a one-dimensional imaging element and a one-dimensional scanning mechanism or a combination of a photoelectric sensor and a two-dimensional scanning mechanism.

Further, by using a solid-state imaging apparatus that uses a high-speed nondestructive-read charge modulation element (CMD imaging element) as the two-dimensional imaging apparatus 5, the frame memory 6 can be eliminated.

It is not necessary that the data processing apparatus 7 contains all of the position sensing section 7A, the slope sensing section 7B, the decode execute deciding section 7C, and the decoding section 7D. The decoding section 7D may be provided for the host apparatus (not shown) and the control signals including a decode start signal may be output to the host apparatus. Further, the entire data processing apparatus 7 may be incorporated in the host apparatus (now shown) and the information from the frame memory 6 or the output of the imaging apparatus may be taken in the host apparatus, which then processes the information. Further, the individual sections may be formed in various structures according to circumstances, such as in an integral structure, in a separate structure, or partly in a separate structure.

While in the above description, labels of PDF-417 format are used as bar code labels, other types of labels may be used. For instance, other stacked bar codes such as Code 49 or one-dimensional bar codes such as JAN may be used.

As described above in detail, it is possible with the present invention to provide a label information reading apparatus capable of eliminating wasted time in reading a bar code label, since the code position of the bar code is estimated on the basis of the bar code information stored in the frame memory, whether the bar code can be decoded or not is decided on the basis of the estimated code position, and decoding is performed only when the decision result shows that decoding is possible.

Further, it is possible to provide a label information reading apparatus capable of reading bar code label information even when a bar code label, particularly a stacked bar code label, is set in any direction on the label sensing plane of the reading apparatus or even when there is any defect in the image of a bar code label. Specifically, by estimating the label position on the basis of at least two points of the four corner positions of a projected image of the bar code label, and further, by estimating the code position contained in the label, efficient data extraction can be achieved practically parallel to the label, thereby enabling high-speed reading regardless of the bar code label direction. In other words, the slope of the label has no effect on the reading performance.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A symbol data reading apparatus, which estimates whether a bar code within a visual field can be decoded or not when a part of the bar code is outside the visual field, the apparatus comprising:
   imaging means, having a predetermined visual field, for imaging a bar code which is partly out of said visual field of said imaging means, the bar code comprising bars and spaces in the form of a two-dimensional image, and the bar code imaged by said imaging means including a plurality of codes, said imaging means producing information corresponding to the imaged bar code;
   memory means for storing information received from said imaging means, said received information corresponding to an imaged bar code;
   in-the-visual-field estimating means for estimating, on the basis of the information stored in said memory means, a possibility that a position of each code of said plurality of codes in said imaged bar code is within a visual field of said imaging means; and
   decodability estimating means for estimating that the imaged bar code can be decoded when said in-the-visual-field estimating means estimates that a number of code positions of said bar code within the visual field of said imaging means is at least a specified number.

2. The apparatus according to claim 1, wherein:
   the bar code imaged by said imaging means includes:
     a plurality of codes to be decoded,
     a plurality of codes for error sensing and correcting, the number of which determines said specified number, and
     a code indicating said specified number; and
   said apparatus further includes means for sensing the code indicating said specified number from the information stored in said memory means to determine said specified number.

3. The apparatus according to claim 2, wherein:
   the bar code imaged by said imaging means further includes a code indicating a positional relationship of said codes to be decoded and said codes for error sensing and correcting; and
   said apparatus includes means for sensing said code indicating the positional relationship from the information stored in said memory means.

4. The apparatus according to claim 1, further comprising decoding means for decoding the information stored in said memory means when said decodability estimating means has estimated that decoding is possible.

5. The apparatus according to claim 1, wherein said in-the-visual-field estimating means includes:
   pattern sensing means for sensing a unique pattern of said bar code from the information stored in said memory means;
   reliability estimating means for estimating a reliability of the unique pattern sensed by said pattern sensing means; and
   means for estimating a code position of the bar code from the information stored in said memory means using said unique pattern estimated to be highly reliable by said reliability estimating means.

* * * * *